(12) United States Patent
Fujiwara et al.

(10) Patent No.: US 12,706,907 B2
(45) Date of Patent: Aug. 11, 2026

(54) MANAGEMENT SERVER, MANAGEMENT METHOD, AND STORAGE MEDIUM

(71) Applicant: TOYOTA JIDOSHA KABUSHIKI KAISHA, Toyota (JP)

(72) Inventors: Teruyoshi Fujiwara, Toyota (JP); Iwao Nitta, Nagoya (JP); Ryota Suzuki, Ikeda (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 18/786,875

(22) Filed: Jul. 29, 2024

(65) Prior Publication Data

US 2025/0106204 A1 Mar. 27, 2025

(30) Foreign Application Priority Data

Sep. 22, 2023 (JP) ................................ 2023-159247

(51) Int. Cl.
*H04L 9/40* (2022.01)

(52) U.S. Cl.
CPC ........ *H04L 63/0869* (2013.01); *H04L 63/065* (2013.01); *H04L 63/104* (2013.01)

(58) Field of Classification Search
CPC ......... H04L 9/321–3213; H04L 63/065; H04L 63/08; H04L 63/0815; H04L 63/0853; H04L 63/0869–0892; H04L 63/104; H04W 12/06–069; H04W 12/50–55
See application file for complete search history.

(56) References Cited

U.S. PATENT DOCUMENTS 10,149,156 B1 * 12/2018 Tiku ...................... H04W 12/66
2020/0160335 A1 5/2020 Yasui et al.

FOREIGN PATENT DOCUMENTS

JP 2009-212619 A 9/2009
JP 2022-140747 A 9/2022

* cited by examiner

*Primary Examiner* — Kevin Bechtel
(74) *Attorney, Agent, or Firm* — Oliff PLC

(57) ABSTRACT

A management server according to one aspect of the present disclosure includes at least one processor. The processor receives a first identifier, first unique information, a second identifier, and second unique information in response to occurrence of a use relationship between a first target and a second target, requests authentication of the first target by transmitting the received first identifier and the received first unique information to a first server, requests authentication of the second target by transmitting the received second identifier and the received second unique information to a second server, and sets a correspondence between the first identifier and the second identifier when both the first target and the second target have successfully been authenticated.

20 Claims, 15 Drawing Sheets

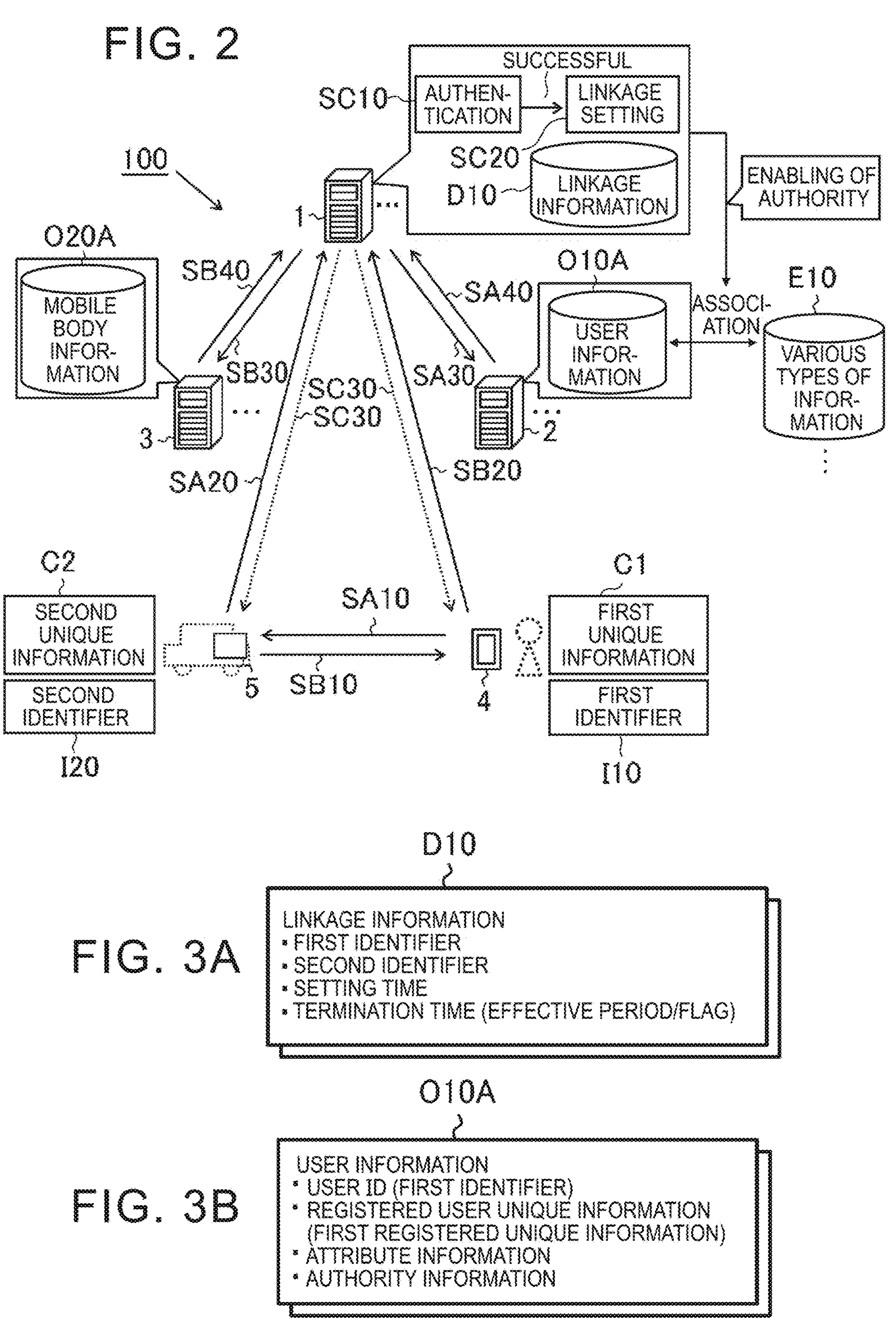

FIG. 2
SUCCESSFUL
SC10
AUTHEN-TICATION
LINKAGE SETTING
SC20
LINKAGE INFORMATION
D10
100
1
ENABLING OF AUTHORITY
O20A
MOBILE BODY INFOR-MATION
SB40
SB30
SA40
O10A
USER INFOR-MATION
ASSOCI-ATION
E10
VARIOUS TYPES OF INFOR-MATION
SC30
SC30
SA30
3
2
SA20
SB20
C2
SECOND UNIQUE INFORMATION
SECOND IDENTIFIER
I20
SA10
SB10
5
4
C1
FIRST UNIQUE INFORMATION
FIRST IDENTIFIER
I10
FIG. 3A
D10
LINKAGE INFORMATION
• FIRST IDENTIFIER
• SECOND IDENTIFIER
• SETTING TIME
• TERMINATION TIME (EFFECTIVE PERIOD/FLAG)
FIG. 3B
O10A
USER INFORMATION
• USER ID (FIRST IDENTIFIER)
• REGISTERED USER UNIQUE INFORMATION (FIRST REGISTERED UNIQUE INFORMATION)
• ATTRIBUTE INFORMATION
• AUTHORITY INFORMATION

O20A

MOBILE BODY INFORMATION
- ·MOBILE BODY ID (SECOND IDENTIFIER)
- ·REGISTERED MOBILE BODY UNIQUE INFORMATION (SECOND REGISTERED UNIQUE INFORMATION)
- ·ATTRIBUTE INFORMATION
  - – NUMBER
  - – TYPE
  - – OWNER INFORMATION

1
MANAGEMENT SERVER
12 STORAGE UNIT
81 MANAGEMENT PROGRAM
D10 LINKAGE INFORMATION
CONTROL UNIT
CPU
RAM
ROM
11
14 INPUT DEVICE
15 OUTPUT DEVICE
COMMUNICATION I/F
13
DRIVE
16
STORAGE MEDIUM 91

FIG. 8B

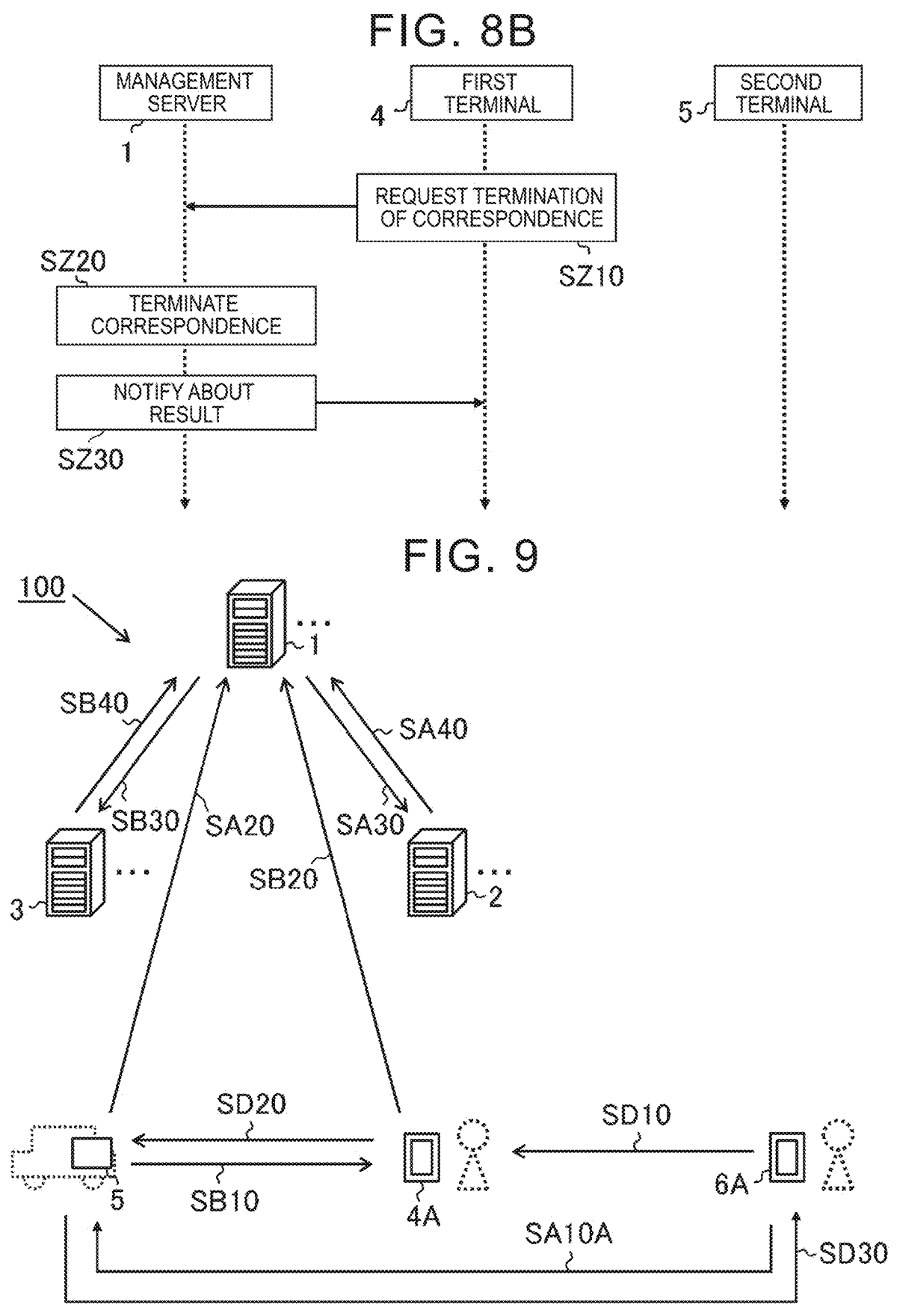

MANAGEMENT SERVER
1
FIRST TERMINAL
4
SECOND TERMINAL
5
REQUEST TERMINATION OF CORRESPONDENCE
SZ10
SZ20
TERMINATE CORRESPONDENCE
NOTIFY ABOUT RESULT
SZ30

MANAGEMENT SERVER
1
SECOND TERMINAL
5
FIRST TERMINAL
4C
TARGET USER TERMINAL
6C
DESIGNATE PROXY USER
SE10
NOTIFY ABOUT DESIGNATED PROXY INFORMATION AND FIRST UNIQUE INFORMATION
SA10C
SAB100C
APPLY FOR USE
SE20
SE201
VERIFY
SB10
ACQUIRE SECOND UNIQUE INFORMATION
TRANSMIT SECOND UNIQUE INFORMATION
SB20
SA20
TRANSMIT FIRST UNIQUE INFORMATION 100
1
SB40
SB30
SA40
SA30D
SA20D
SB20
SA311D
3
2
SA310D
SE20
SE10
SB10
5
4C
6C
SA10D 100
1
SB40
SB30
SA40
SA30
SB20
SA20
3
2
SF20
SF10
5
6E
4E
SA10E
SB10E

MANAGEMENT SERVER, MANAGEMENT METHOD, AND STORAGE MEDIUM

CROSS-REFERENCE TO RELATED APPLICATION

This application claims priority to Japanese Patent Application No. 2023-159247 filed on Sep. 22, 2023, incorporated herein by reference in its entirety.

BACKGROUND

1. Technical Field

The present disclosure relates to a management server, a management method, and a storage medium.

2. Description of Related Art

Japanese Unexamined Patent Application Publication No. 2022-140747 (JP 2022-140747 A) proposes a fee collection system for collecting fees for services from vehicle users by using media such as cards. Specifically, the fee collection system proposed in JP 2022-140747 A charges a target user for expressway use by a target rental car based on a correspondence among an identifier (ID) of an electronic toll collection system (ETC) card, a rental car company, a date and time of rental car use, and a rental car user (billing information, registration information, payment information, and use information).

SUMMARY

The present disclosure provides a technology for tracking a use relationship between a first target and a second target while ensuring security.

A management server according to one aspect of the present disclosure includes at least one processor. The at least one processor is configured to perform operations of: receiving, in response to occurrence of a use relationship between a first target and a second target, a first identifier of the first target, first unique information of the first target, a second identifier of the second target, and second unique information of the second target from at least one of a first terminal of the first target and a second terminal of the second target; requesting a first server to authenticate the first target by transmitting the received first identifier and the received first unique information to the first server; receiving a result of authentication of the first target from the first server; requesting a second server to authenticate the second target by transmitting the received second identifier and the received second unique information to the second server; receiving a result of authentication of the second target from the second server; and setting a correspondence between the first identifier and the second identifier when the received results of the authentication show that both the first target and the second target have successfully been authenticated.

In the management server according to the one aspect of the present disclosure, the processor may further be configured to terminate the correspondence in response to reception of a termination request from at least one of the first terminal and the second terminal or satisfaction of a predetermined termination condition.

In the management server according to the one aspect of the present disclosure, the receiving the first identifier, the first unique information, the second identifier, and the second unique information from at least one of the first terminal and the second terminal may include: receiving the second identifier and the second unique information from the first terminal; and receiving the first identifier and the first unique information from the second terminal.

In the management server according to the one aspect of the present disclosure, the receiving the first identifier, the first unique information, the second identifier, and the second unique information from at least one of the first terminal and the second terminal may include: receiving the first identifier and the second unique information from the first terminal; and receiving the second identifier and the first unique information from the second terminal.

In the management server according to the one aspect of the present disclosure, the receiving the first identifier, the first unique information, the second identifier, and the second unique information from at least one of the first terminal and the second terminal may include: receiving the second identifier and the first unique information from the first terminal; and receiving the first identifier and the second unique information from the second terminal.

In the management server according to the one aspect of the present disclosure, the receiving the first identifier, the first unique information, the second identifier, and the second unique information from at least one of the first terminal and the second terminal may include receiving the first identifier, the first unique information, the second identifier, and the second unique information from one of the first terminal and the second terminal.

In the management server according to the one aspect of the present disclosure, one of the first target and the second target may be a user, one terminal corresponding to the user out of the first terminal and the second terminal may be a user terminal associated with the user, the other of the first target and the second target may be a use item to be used by the user, and one terminal corresponding to the use item out of the first terminal and the second terminal may be a load terminal to be loaded on the use item.

In the management server according to the one aspect of the present disclosure, the use item may be a mobile body.

In the management server according to the one aspect of the present disclosure, the user terminal associated with the user may be a proxy user terminal possessed by a proxy user who acts as proxy for the user.

In the management server according to the one aspect of the present disclosure, the use relationship between the first target and the second target may occur through data communication between a target user terminal possessed by the user and the proxy user terminal and data communication between the proxy user terminal and the load terminal.

In the management server according to the one aspect of the present disclosure, the user terminal associated with the user may be a target user terminal possessed by the user, and the use relationship between the first target and the second target may occur by data communication between the target user terminal and the load terminal with mediation of a proxy user terminal possessed by a proxy user who acts as proxy for the user.

In the management server according to the one aspect of the present disclosure, the user terminal associated with the user may be a target user terminal possessed by the user, and one identifier corresponding to the user out of the first identifier and the second identifier may be associated with proxy authority of another user than the user.

A management method according to a second aspect of the present disclosure includes executing, by a management server: receiving, in response to occurrence of a use relationship between a first target and a second target, a first identifier of the first target, first unique information of the first target, a second identifier of the second target, and second unique information of the second target from at least one of a first terminal of the first target and a second terminal of the second target; requesting a first server to authenticate the first target by transmitting the received first identifier and the received first unique information to the first server; receiving a result of authentication of the first target from the first server; requesting a second server to authenticate the second target by transmitting the received second identifier and the received second unique information to the second server; receiving a result of authentication of the second target from the second server; and setting a correspondence between the first identifier and the second identifier when the received results of the authentication show that both the first target and the second target have successfully been authenticated.

In the management method according to the one aspect of the present disclosure, the management server may be configured to further execute terminating the correspondence in response to reception of a termination request from at least one of the first terminal and the second terminal or satisfaction of a predetermined termination condition.

In the management method according to the one aspect of the present disclosure, the receiving the first identifier, the first unique information, the second identifier, and the second unique information from at least one of the first terminal and the second terminal may include: receiving the second identifier and the second unique information from the first terminal; and receiving the first identifier and the first unique information from the second terminal.

In the management method according to the one aspect of the present disclosure, the receiving the first identifier, the first unique information, the second identifier, and the second unique information from at least one of the first terminal and the second terminal may include: receiving the first identifier and the second unique information from the first terminal; and receiving the second identifier and the first unique information from the second terminal.

In the management method according to the one aspect of the present disclosure, the receiving the first identifier, the first unique information, the second identifier, and the second unique information from at least one of the first terminal and the second terminal may include: receiving the second identifier and the first unique information from the first terminal; and receiving the first identifier and the second unique information from the second terminal.

In the management method according to the one aspect of the present disclosure, one of the first target and the second target may be a user, one terminal corresponding to the user out of the first terminal and the second terminal may be a user terminal associated with the user, the other of the first target and the second target may be a use item to be used by the user, and one terminal corresponding to the use item out of the first terminal and the second terminal may be a load terminal to be loaded on the use item.

In the management method according to the one aspect of the present disclosure, the use item may be a mobile body.

A storage medium according to one aspect of the present disclosure stores instructions that are executable by one or more processors and that cause the one or more processors to perform functions. The instructions include causing a first terminal of a first target to, when a use relationship occurs between the first target and a second target: provide first unique information of the first target to a second terminal of the second target during data exchange with the second terminal to cause the second terminal to transmit the first unique information to a management server on behalf of the first terminal; acquire second unique information of the second target from the second target; and transmit the acquired second unique information to the management server to cause the management server to attempt authentication of the first target using the first unique information and authentication of the second target using the second unique information and set a correspondence between a first identifier of the first target and a second identifier of the second target when both the first target and the second target have successfully been authenticated.

According to the present disclosure, it is possible to provide the technology for tracking the use relationship between the first target and the second target while ensuring security.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein:

FIG. 2 schematically shows an implementation of the situation to which the present disclosure is applied;

FIG. 3A schematically shows an example of linkage information according to an embodiment;

FIG. 3B schematically shows an example of user information according to the embodiment;

FIG. 8B shows an example of a processing procedure of the linkage termination according to the embodiment;

FIG. 9 schematically shows an example of the course of linkage setting in proxy pattern 1-1 according to the embodiment;

FIG. 11 schematically shows a modification of the course of the linkage setting in proxy pattern 1-1 according to the embodiment;

DETAILED DESCRIPTION OF EMBODIMENTS

Figure 1:
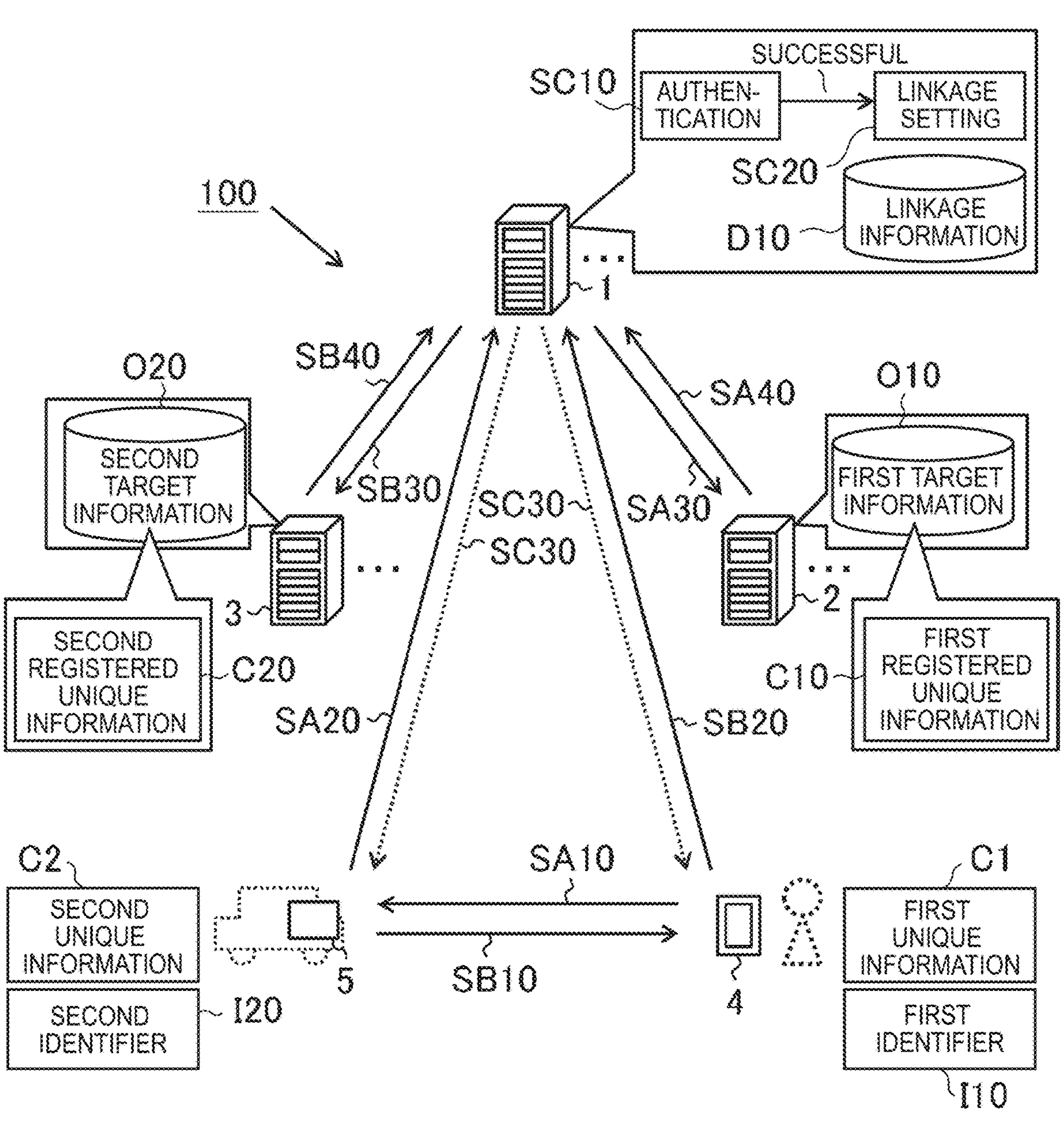
FIG. 1 schematically shows an example of a situation to which the present disclosure is applied.

With the system proposed in JP 2022-140747 A, users can pay expressway tolls using the ETC even if they do not have their own ETC cards. However, the inventors of the present disclosure have found that the related-art system has the following problems.

That is, along with diversification of Mobility as a Service (MaaS), there will be a demand to track the use of a mobile body by a user while ensuring security from the viewpoint of convenience such as an increase in the efficiency of payment. In the related-art system, the correspondence between the date and time of use and the user can be held as use information based on a rental car contract or reservation. Since the date and time of use depend on the contract or reservation, the use information does not necessarily match the actual use of the rental car by the user. In addition, the generation of the use information is not expected for a vehicle to be used without a contract or reservation (e.g., a private car). Therefore, the related-art system has difficulty in tracking the use of the mobile body by the user while ensuring security. This problem is not limited to the situation where a vehicle is used. Similar problems may occur in situations where a mobile body other than a vehicle (e.g., an aircraft or a ship) is used and where a plurality of types of mobile body is used. Similar problems may also occur in all situations where an object other than a mobile body is used.

A management server according to one aspect of the present disclosure includes at least one processor. The processor is configured to perform the operations of: receiving, in response to occurrence of a use relationship between a first target and a second target, a first identifier of the first target, first unique information of the first target, a second identifier of the second target, and second unique information of the second target from at least one of a first terminal of the first target and a second terminal of the second target; requesting a first server to authenticate the first target by transmitting the received first identifier and the received first unique information to the first server; receiving a result of authentication of the first target from the first server; requesting a second server to authenticate the second target by transmitting the received second identifier and the received second unique information to the second server; receiving a result of authentication of the second target from the second server; and setting a correspondence between the first identifier and the second identifier when the received results of the authentication show that both the first target and the second target have successfully been authenticated.

In the management server according to the one aspect of the present disclosure, the first server and the second server authenticate the first target and the second target, respectively, in response to the occurrence of the use relationship between the first target and the second target. This double authentication can be expected to ensure security. When both the first target and the second target have successfully been authenticated, the correspondence (linkage) between the first identifier and the second identifier is set. The use relationship between the first target and the second target can be tracked by recording the linkage setting. With the management server according to the one aspect of the present disclosure, it is possible to track the use relationship between the first target and the second target while ensuring security.

The form of the present disclosure is not limited to the above example. As another form of the management server according to the above aspect, one aspect of the present disclosure may be an information processing method that implements all or part of the above components. One aspect of the present disclosure may also be a program or a storage medium that stores such a program and is readable by a machine such as a computer. The storage medium readable by a machine accumulates information such as a program by electrical, magnetic, optical, mechanical, or chemical action. Further, one aspect of the present disclosure may be the first server, the second server, the first terminal, or the second terminal related to the management server according to the above aspect. Further, one aspect of the present disclosure may be an information processing method related to the first server, the second server, the first terminal, or the second terminal, a program, or a storage medium storing such a program.

For example, a management method according to one aspect of the present disclosure may include executing, by a management server: receiving, in response to occurrence of a use relationship between a first target and a second target, a first identifier of the first target, first unique information of the first target, a second identifier of the second target, and second unique information of the second target from at least one of a first terminal of the first target and a second terminal of the second target; requesting a first server to authenticate the first target by transmitting the received first identifier and the received first unique information to the first server; receiving a result of authentication of the first target from the first server; requesting a second server to authenticate the second target by transmitting the received second identifier and the received second unique information to the second server; receiving a result of authentication of the second target from the second server; and setting a correspondence between the first identifier and the second identifier when the received results of the authentication show that both the first target and the second target have successfully been authenticated.

For example, a storage medium according to one aspect of the present disclosure stores instructions including causing a first terminal of a first target to, when a use relationship occurs between the first target and a second target: provide first unique information of the first target to a second terminal of the second target during data exchange with the second terminal to cause the second terminal to transmit the first unique information to a management server on behalf of the first terminal; acquire second unique information of the second target from the second target; and transmit the acquired second unique information to the management server to cause the management server to attempt authentication of the first target using the first unique information and authentication of the second target using the second unique information and set a correspondence between a first identifier of the first target and a second identifier of the second target when both the first target and the second target have successfully been authenticated.

Hereinafter, an embodiment according to one aspect of the present disclosure (hereinafter also referred to as "present embodiment") will be described with reference to the drawings. However, the present embodiment described below is merely an example of the present disclosure in all respects. Various revisions or modifications may be made without departing from the scope of the present disclosure. In the implementation of the present disclosure, specific configurations based on the embodiment may be adopted as appropriate. Data that appears in the present embodiment will be described using natural language, but more specifically, it is specified using pseudo language, commands, parameters, machine language, etc. that can be recognized by a computer.

1. Application Example

FIG. 1 schematically shows an example of a situation to which the present disclosure is applied. A management system 100 according to the present embodiment includes a management server 1, a first server 2, and a second server 3. The management server 1 is one or more computers configured to record the correspondence (linkage) between a first target and a second target. The first server 2 is one or more computers configured to authenticate the first target. The second server 3 is one or more computers configured to authenticate the second target. The first server 2 and the second server 3 may be referred to as "authentication servers", "identification (ID) servers", etc.

In the present embodiment, when a use relationship occurs between the first target and the second target, data is exchanged between a first terminal 4 of the first target and a second terminal 5 of the second target (steps SA10, SB10). A first identifier I10 of the first target, first unique information C1 of the first target, a second identifier I20 of the second target, and second unique information C2 of the second target are transmitted to the management server 1 from at least one of the first terminal 4 and the second terminal 5. Therefore, the management server 1 receives the first identifier I10, the first unique information C1, the second identifier I20, and the second unique information C2 in real time from at least one of the first terminal 4 and the second terminal 5 in response to the occurrence of the use relationship between the first target and the second target (steps SA20, SB20). The transmission of these pieces of data by at least one of the first terminal 4 and the second terminal 5 may be handled as requesting the management server 1 to set a correspondence (linkage) from the first terminal 4 and the second terminal 5.

The management server 1 requests the first server 2 to authenticate the first target in real time by transmitting the received first identifier I10 and the received first unique information C1 to the first server 2 (step SA30). In one example, the first server 2 is configured to access first target information O10 including first registered unique information C10 of the first target to authenticate the first target (e.g., holds the first target information O10 in a storage unit). The registered unique information is unique information preregistered for authentication. The first server 2 extracts the first registered unique information C10 of the first target from the first target information O10 by searching the first target information O10 using the first identifier I10 as a query. The first server 2 checks the extracted first registered unique information C10 against the received first unique information C1. The checking may be made by any method. Based on the checking result, the first server 2 determines whether the first target is successfully authenticated. The first server 2 returns a result of the authentication of the first target to the management server 1. The management server 1 receives the result of the authentication of the first target from the first server 2 (step SA40).

The management server 1 requests the second server 3 to authenticate the second target in real time by transmitting the received second identifier I20 and the received second unique information C2 to the second server 3 (step SB30). In one example, the second server 3 is configured to access second target information O20 including second registered unique information C20 of the second target to authenticate the second target (e.g., holds the second target information O20 in a storage unit). The second server 3 extracts the second registered unique information C20 of the second target from the second target information O20 by searching the second target information O20 using the second identifier I20 as a query. The second server 3 checks the extracted second registered unique information C20 against the received second unique information C2. The checking may be made by any method. Based on the checking result, the second server 3 determines whether the second target is successfully authenticated. The second server 3 returns a result of the authentication of the second target to the management server 1. The management server 1 receives the result of the authentication of the second target from the second server 3 (step SB40).

The management server 1 determines whether both the first target and the second target have successfully been authenticated based on details of replies from the servers (2, 3) (step SC10). When both the first target and the second target have successfully been authenticated, the management server 1 sets a correspondence (linkage) between the first identifier I10 and the second identifier I20 (step SC20). In one example, the management server 1 generates linkage information D10 indicating the setting of the correspondence between the first identifier I10 and the second identifier I20, and stores the generated linkage information D10. When at least one of the first target and the second target is not successfully authenticated, the management server 1 does not set the correspondence between the first identifier I10 and the second identifier I20, and skips the process for setting the correspondence. The management server 1 may return a result of the linking process to at least one of the first terminal 4 and the second terminal 5 (step SC30). The series of processes from the data exchange between the terminals (4, 5) to the linkage setting may be executed in real time in response to the occurrence of the use relationship. The set linkage (correspondence) may be terminated as appropriate in response to disappearance of the use relationship between the first target and the second target. The setting of the correspondence between the first identifier I10 and the second identifier I20 may be handled as setting of the correspondence between the first target and the second target.

As described above, in the present embodiment, the first server 2 and the second server 3 authenticate the first target and the second target, respectively, in response to the occurrence of the use relationship between the first target and the second target (steps SA30, SA40, SB30, SB40). This double authentication can be expected to ensure security.

When both the first target and the second target have successfully been authenticated, the correspondence between the first identifier I10 and the second identifier I20 is set (steps SC10, SC20). The use relationship between the first target and the second target can be tracked by recording the linkage setting (linkage information D10). According to the present embodiment, it is possible to track the use relationship between the first target and the second target while ensuring security.

Targets

The first target and the second target are not particularly limited as long as the use relationship can be established, and may be selected as appropriate depending on embodiments. The first target and the second target may each be any entity such as an object, a human, or another creature. The any entity may include a virtual entity. The establishment of the use relationship may mean that a real or virtual relationship occurs between at least two entities, such as a relationship in which one uses the other, one possesses the other, one is joined to the other, or one is connected to the other. The management system 100 of the present disclosure may be used in any situation where the correspondence between two or more entities is to be tracked.

Terminals

Each terminal (4, 5) is related to each target. The relationship between each terminal (4, 5) and each target is not particularly limited, and may be determined as appropriate depending on embodiments. In one example, either the first terminal 4 or the second terminal 5 may be possessed by the corresponding target. Either the first terminal 4 or the second terminal 5 may be loaded on the corresponding target. The loading may include not only a case where the terminal is permanently placed on the target but also a case where the terminal is placed on the target at least temporarily during use of the target. The loading may include a case where the terminal is possessed by a user of the target. Either the first terminal 4 or the second terminal 5 may be the target itself.

Unique Information

Each piece of unique information (C1, C2) is used for authentication of each target. As long as each piece of unique information (C1, C2) can be used for authentication of each target, the data format and structure are not particularly limited, and may be selected as appropriate depending on embodiments. Each piece of unique information (C1, C2) may be any information such as information derived from each target, information derived from each terminal, temporarily generated information, or information generated by any other method.

The information derived from each target may be, for example, biometric information or uniquely assigned identification information. The biometric information may be, for example, a facial image, a fingerprint, or a voiceprint. The uniquely assigned identification information may be, for example, a vehicle registration number, a vehicle identification number (VIN), or a personal number. When an integrated circuit (IC) tag is attached to the target, the uniquely assigned identification information may include information held by the IC tag.

The information derived from each terminal may be, for example, a media access control address (MAC address) or terminal identification information (international mobile equipment identifier (IMEI), international mobile subscriber identity (IMSI), mobile equipment identifier (MEID), integrated circuit card ID (ICCID), or other serial numbers).

The temporarily generated information may be, for example, a one-time password or a private address (dynamically generated address). The temporarily generated information may be a timestamp, a random number, a hash value, etc. The information generated by any other method may include, for example, a password, a passcode, and any other information except a symbol string. At least part of the information such as the identification information and the terminal-derived information may be used as the identifier instead of the unique information.

Each piece of unique information (C1, C2) may be acquired as appropriate. In one example, at least one of the first unique information C1 and the second unique information C2 may be held in the corresponding terminal in advance. For example, the first unique information C1 may be held in the first terminal 4. In another example, at least one of the first unique information C1 and the second unique information C2 may be acquired by any device such as an input device or a sensor. For example, when the first target is a human and the first unique information C1 is a facial image, the facial image may be acquired by an image sensor (camera).

Identifiers

Each identifier (I10, I20) is used to identify each target. As long as each target can be identified by using each identifier (I10, I20), the data format and structure are not particularly limited, and may be selected as appropriate depending on embodiments. In one example, each identifier (I10, I20) may be a symbol string including numbers, letters, etc.

Each identifier (I10, I20) may be acquired as appropriate similarly to each piece of unique information (C1, C2). In one example, at least one of the first identifier I10 and the second identifier I20 may be held in the corresponding terminal in advance. In another example, at least one of the first identifier I10 and the second identifier I20 may be acquired by any device such as an input device or a sensor. For example, the identifier may be acquired by input via an input device. For example, the identifier may be converted into a code, and the identifier may be obtained by reading (decoding) the code.

First Server and Second Server

The first server 2 and the second server 3 may each be one or more server devices. The first server 2 and the second server 3 may each manage the target information (O10, O20) on each target. Each piece of target information (O10, O20) may be held in one or more storage devices installed at least inside or outside each server (2, 3).

In the present embodiment, each piece of target information (O10, O20) includes each piece of registered unique information (C10, C20) to be used for authentication of each target. Each piece of registered unique information (C10, C20) corresponds to each piece of unique information (C1, C2) acquired at the time of authentication. Each piece of unique information (C10, C20) may be preregistered at any timing before a linking request, such as a timing of account creation or addition of a new target.

Whether each target is successfully authenticated is determined based on the result of checking each piece of unique information (C1, C2) received from at least one of the first terminal 4 and the second terminal 5 against each piece of registered unique information (C10, C20). The checking method may be selected as appropriate depending on embodiments. In a simple example, whether each target is successfully authenticated may be determined depending on whether the received unique information agrees with the registered unique information. In another example, whether each target is successfully authenticated may be determined based on the degree of agreement between the received unique information and the registered unique information. A trained model generated by machine learning may be used for checking. At the time of checking, the received unique information and the registered unique information may be compared directly or may be compared indirectly after being converted into feature amounts etc.

The unit for managing each piece of target information (O10, O20) is not particularly limited, and may be determined as appropriate depending on embodiments. At least one of the first target information O10 and the second target information O20 may be managed centrally (collectively) or distributively (separately) for each appropriate group. The server devices constituting each server (2, 3) may be installed by one or more management organizations (entities). At least one of the first server 2 and the second server 3 may be installed by a plurality of management organizations. When the server is installed by a plurality of management organizations, the target information may be shared (i.e., managed centrally) or may be managed distributively for each management organization.

When the authentication server devices are installed distributively, the management server 1 may identify the server device to be requested to perform authentication by any method in the step of requesting authentication (step SA30, SB30). In one example, the information received from at least one of the first terminal 4 and the second terminal 5 may include request destination information (e.g., an address of the server device), and the management server 1 may identify the server device to be requested to perform authentication based on the request destination information in the received information. In another example, the requested server device can be identified from at least one of each identifier (I10, I20) and each piece of unique information (C1, C2) as typified by a telephone number or a credit card number. In this case, the management server 1 may identify the requested server device from at least one of each identifier (I10, I20) and each piece of unique information (C1, C2) received from at least one of the first terminal 4 and the second terminal 5.

Management Server

The management server 1 may be one or more server devices. The management server 1 of the present disclosure records information on the occurrence and disappearance of the correspondence between the first target and the second target as the linkage information D10. The linkage information D10 may be held in one or more storage devices installed at least inside or outside the management server 1.

The obtained linkage information D10 may be used in various situations. In one example, the linkage information D10 may be used to track the relationship between the first target and the second target. As a specific example, the linkage information D10 may be used in order that authority linked to one of the first target and the second target (first target information O10 and second target information O20) can be exercised by the other while the correspondence between the first target and the second target is set. That is, the linkage information D10 may be used to enable the exercise of the authority of one of the first target and the second target by the other based on the linkage between the first target and the second target (FIG. 2 described later).

In the present embodiment, the linkage information D10 includes information on the first identifier I10 and the second identifier I20 to indicate a combination of the first target and the second target for which the correspondence has been set. The management server 1 may acquire each identifier (I10, I20) of each target as appropriate. In one example, the management server 1 may acquire the information on the first identifier I10 and the second identifier I20 for which the correspondence is set from at least one of the servers (2, 3) and the terminals (4, 5) each time without holding the information in advance. In another example, the management server 1 may hold in advance information on at least one of the first identifier I10 and the second identifier I20 for which the correspondence is set.

The management organizations of the management server 1 and each server (2, 3) may have any relationship. In one example, the management organization of the management server 1 may double as the management organization of at least one of the first server 2 and the second server 3. In another example, the management organization of the management server 1 may be different from the management organizations of the first server 2 and the second server 3. The management system 100 of the present disclosure may be configured such that the management server 1 is connected to each server (2, 3) and each terminal (4, 5) via a network and they are installed with the information processing executable as intended by the management organization of the management server 1.

Operation Examples

In one example, one of the first target and the second target may be a user. One of the first terminal 4 and the second terminal 5 that corresponds to the user may be a user terminal associated with the user. The other of the first target and the second target may be a use item to be used by the user. One of the first terminal 4 and the second terminal 5 that corresponds to the use item may be a load terminal to be loaded on the use item. According to the example of the present embodiment, it is possible to track the use relationship between the user and the use item while ensuring security.

The type of the use item is not particularly limited as long as it can be used by the user, and may be selected as appropriate depending on embodiments. In one example, the use item may be a mobile body (mobility). According to the example of the present embodiment, it is possible to track the use relationship between the user and the mobile body. The type of the mobile body may be selected as appropriate. The mobile body may be, for example, a vehicle, a railway vehicle, an aircraft (airplane, drone, etc.), or a ship. The mobile body may be at least one of a manually controlled attended machine and an automatically controlled unattended machine. When the mobile body is a vehicle, the type of the vehicle may be selected as desired. The type of the vehicle may be selected, for example, from among a two-wheeled vehicle, a three-wheeled vehicle, and a four-wheeled vehicle. The vehicle may include a private car, a rental car, a shared car, a taxi, a bus, etc. The vehicle may be at least one of an autonomous vehicle and a manual vehicle. The load terminal may be referred to as "mobile body terminal".

FIG. 2 schematically shows an implementation of the situation to which the management system 100 of the present disclosure is applied. In the example of FIG. 2, the first target is a user and the second target is a mobile body. In the following description of the example of FIG. 2, it is assumed, for convenience, that the term "first" relates to the user and the term "second" relates to the mobile body. However, the correspondence between "first" and "second" is not limited to the example of FIG. 2. The terms "first" and "second" may be interchanged. That is, the second target may be the user and the first target may be the mobile body.

When the first target is the user, an example of the first terminal 4 is a user terminal. The user terminal may be, for example, any computer such as a mobile terminal (such as a smartphone), a dedicated device (such as an electronic key device), or another computer device. The user terminal may typically be possessed by the user who is a linking target (first target). An account of the user may be shared among a plurality of computers, and accordingly, the computers sharing the account may each be used as a user terminal (first terminal 4) for the same user.

An example of the first identifier I10 is a user identifier (user ID, personal ID). The user identifier may be, for example, a user account ID, a personal number, or user terminal identification information (e.g., a MAC address or terminal identification information). An example of the first unique information C1 is user unique information. The user unique information may be, for example, biometric information of the user (e.g., a facial image, a fingerprint, or a voiceprint), user terminal identification information, temporarily generated information, or information generated by any other method.

An example of the first target information O10 is user information O10A. The user information O10A includes registered user unique information. The registered user unique information is an example of the first registered unique information C10, and corresponds to user unique information acquired at the time of authentication. The user information O10A may include any information on the user in addition to the registered user unique information (FIG. 3B described later). In one example, the user information O10A may be associated with various types of information E10 for exercise of authority of the corresponding user by including information on the authority. The various types of information E10 may include, for example, public personal authentication information, payment information, and other service-related information. The public personal authentication information may include, for example, a personal number. The payment information may include, for example, credit card information, internet banking information, and electronic payment information. The other service-related information may include, for example, information on electronic prescription (insured person number, prescription information, etc.). The various types of information E10 may be managed by an external system or within the management system 100. The first server 2 may be installed by a public organization, a neutral organization, or each business operator (vehicle manufacturer, service operating company, etc.). The first server 2 may be referred to as "user ID server", "personal ID server", etc.

When the second target is the mobile body, an example of the second terminal 5 is a mobile body terminal (load terminal). The mobile body terminal may be, for example, a terminal attached to the inside or outside of the mobile body, a terminal possessed by a person involved in the operation of the mobile body (e.g., a driver or a conductor), or a device installed in a facility of the mobile body (e.g., a ticket gate). When the mobile body is a vehicle, the mobile body terminal may be referred to as "in-vehicle terminal".

An example of the second identifier I20 is a mobile body identifier (mobile body ID, car ID). The mobile body identifier may be, for example, a mobile body account ID, identification information uniquely assigned to the target mobile body (e.g., vehicle registration number or vehicle identification information), or mobile body terminal identification information. An example of the second unique information C2 is mobile body unique information. The mobile body unique information may be, for example, identification information uniquely assigned to the target mobile body, mobile body terminal identification information, temporarily generated information, or information generated by any other method.

Figures 3C, 4A:
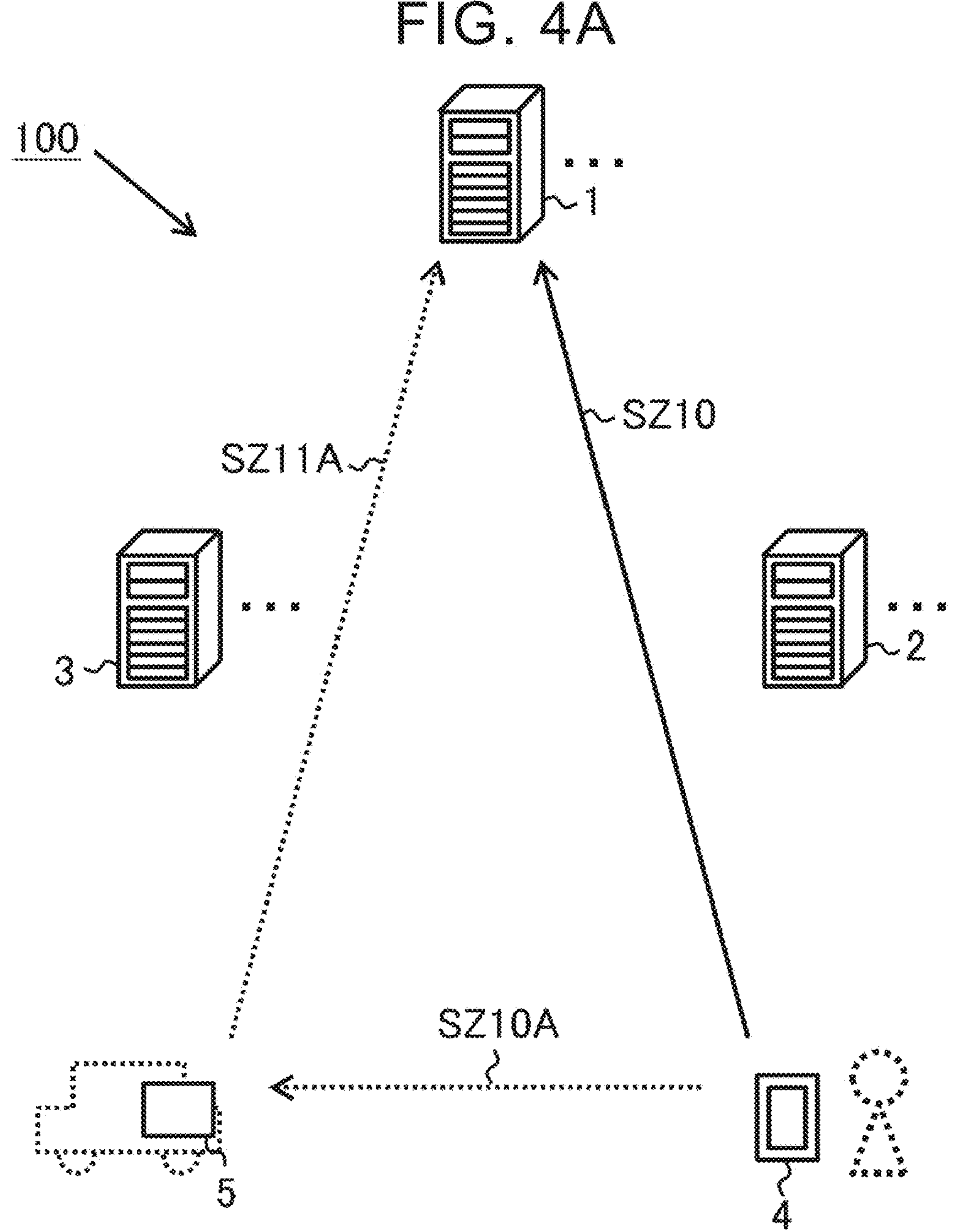
FIG. 3C schematically shows an example of mobile body information according to the embodiment.
FIG. 4A schematically shows an example of the course of linkage termination according to the embodiment.

An example of the second target information O20 is mobile body information O20A. The mobile body information O20A includes registered mobile body unique information. The registered mobile body unique information is an example of the second registered unique information C20, and corresponds to mobile body unique information acquired at the time of authentication. The mobile body information O20A may include any information on the mobile body in addition to the registered mobile body unique information (FIG. 3C described later). In the example of FIG. 2, exercise of at least part of the authority in the various types of information E10 associated with the user information O10A by the mobile body may be enabled (activated) based on the setting of linkage between the user and the mobile body. The second server 3 may be installed by a public organization, a neutral organization, or each business operator (vehicle manufacturer, service operating company, etc.). The second server 3 may be referred to as "mobile body ID server", "car ID server", etc.

The mobile body is an example of the use item. The configuration in FIG. 2 may be applied to any case where the user (occupant) of the use item changes dynamically. The use item may be, for example, a rental item or an accommodation facility in addition to the mobile body. The rental item may include a rental office, a rental space, etc.

The management system 100 may set the linkage between the first identifier I10 and the second identifier I20 in response to the start of use of the use item, and terminate the linkage in response to the end of use. The start and end of use may be detected by any method, for example, at the timings of getting on and off the vehicle or renting and returning the use item. In one example, at least one of the start and end of use may be detected in response to execution of the data exchange between the first terminal 4 and the second terminal 5.

The use item can be classified into at least two types that are an item that can be used repeatedly over a long period, and an item that can be used temporarily. For convenience of description, the former will be referred to as "regular use item" and the latter will be referred to as "temporary use item". An example of the regular use item is a user's property such as a private car. An example of the temporary use item is an item possessed by a person other than the user, such as a rental car, a shared car, a public transportation mobile body, a rental item, or an accommodation facility. The public transportation mobile body is, for example, a taxi, a bus, a railway vehicle, an airplane, or a ship.

In the management system 100, the types of the use items (regular use item or temporary use item) may or may not be distinguished. When distinguishing the types of the use items, the management system 100 may determine the types of the use items by any method. In one example, the target information (mobile body information etc.) may include information indicating the type of the use item, and the management system 100 may determine the type of the use item based on this information. In another example, the type of the use item may be determined based on at least one of the identifier and the unique information. In another example, the information transmitted from at least one of the first terminal 4 and the second terminal 5 to the management server 1 may include information indicating the type of the use item, and the management system 100 may determine the type of the use item based on this information. In another example, in a case where the management organization of the server (second server 3 in the example of FIG. 2) that handles the information on the use item is determined based on the type of the use item, the type of the use item may be determined based on the management organization to which the server belongs.

The management system 100 may switch, for example, the form of the linkage setting process, the linkage termination condition, the method for managing the linkage information D10, the authentication process, etc. depending on the determined type of the use item. In one example, the management system 100 may execute the linkage setting for some types of use item through the authentication process of the present disclosure, and execute the linkage setting for the remaining types of use item through an authentication process different from that of the present disclosure.

The situation to which the management system 100 of the present disclosure is applied is not limited to the situation where the relationship between the user and the use item is tracked. In another example, both the first target and the second target may be robotic devices configured to operate autonomously under autonomous control. The robotic device may include a mobile body such as an autonomous vehicle or a drone. In a situation where two or more robotic devices interact autonomously, the management system 100 of the present disclosure may be used to track the occurrence and disappearance of the relationship between the robotic devices.

As a specific example, one of the first target and the second target may be a large-sized autonomous vehicle, and the other may be a small-sized autonomous vehicle. The large-sized autonomous vehicle may be configured to house a plurality of small-sized autonomous vehicles. The large-sized autonomous vehicle may collect, transport, and release each small-sized autonomous vehicle as appropriate. Each small-sized autonomous vehicle may be operated as appropriate at a release destination. In this case, the management system 100 of the present disclosure may track information as to whether the large-sized autonomous vehicle is transporting (has collected) the small-sized autonomous vehicle by setting and terminating the correspondence between the large-sized autonomous vehicle and the small-sized autonomous vehicle.

Information Transmission Patterns

In the present embodiment, the first identifier I10, the first unique information C1, the second identifier I20, and the second unique information C2 are transmitted to the management server 1 from at least one of the first terminal 4 and the second terminal 5 (steps SA20, SB20). Assignment of the data transmission task may be determined as appropriate depending on embodiments.

(A) Split Transmission (A-1) Split Patterns

In one example, the first terminal 4 may transmit part of the first identifier I10, the first unique information C1, the second identifier I20, and the second unique information C2, and the second terminal 5 may transmit the rest. By splitting the data transmission task between the terminals (4, 5), improvement in the efficiency of data transmission can be expected. The transmission items of the terminals (4, 5) may be selected as appropriate depending on embodiments. In the present embodiment, at least one of the following four patterns may be adopted as a typical example.

(A-1-1) Pattern 1

In pattern 1, the first terminal 4 may transmit the second identifier I20 and the second unique information C2, and the second terminal 5 may transmit the first identifier I10 and the first unique information C1. That is, the reception of the first identifier I10, the first unique information C1, the second identifier I20, and the second unique information C2 from at least one of the first terminal 4 and the second terminal 5 may include reception of the second identifier I20 and the second unique information C2 from the first terminal 4 and reception of the first identifier I10 and the first unique information C1 from the second terminal 5.

In the examples of FIGS. 1 and 2, it is assumed that the second terminal 5 acquires the first identifier I10 and the first unique information C1 as the process of step SA10 and the second terminal 5 transmits the first identifier I10 and the first unique information C1 as the process of step SA20. It is also assumed that the first terminal 4 acquires the second identifier I20 and the second unique information C2 as the process of step SB10 and the first terminal 4 transmits the second identifier I20 and the second unique information C2 as the process of step SB20.

When the use relationship occurs between the first target and the second target, the first terminal 4 may provide the first identifier I10 and the first unique information C1 to the second terminal 5 during the data exchange with the second terminal 5 (step SA10). Thus, the first terminal 4 may cause the second terminal 5 to transmit the first identifier I10 and the first unique information C1 to the management server 1 on behalf of the first terminal 4 (step SA20). The first terminal 4 may acquire the second identifier I20 and the second unique information C2 from the second target during the data exchange (step SB10). The first terminal 4 may transmit the acquired second identifier I20 and the acquired second unique information C2 to the management server 1 (step SB20). Thus, the first terminal 4 may cause the management server 1 to attempt authentication of the first target using the first unique information C1 and authentication of the second target using the second unique information C2 (steps SA30, SA40 and steps SB30, SB40) and to set the correspondence (linkage) between the first identifier I10 and the second identifier I20 when both the first target and the second target have successfully been authenticated (step SC20).

When the use relationship occurs between the first target and the second target, the second terminal 5 may provide the second identifier I20 and the second unique information C2 to the first terminal 4 during the data exchange with the first terminal 4. Thus, the second terminal 5 may cause the first terminal 4 to transmit the second identifier I20 and the second unique information C2 to the management server 1 on behalf of the second terminal 5. The second terminal 5 may acquire the first identifier I10 and the first unique information C1 from the first target during the data exchange. The second terminal 5 may transmit the acquired first identifier I10 and the acquired first unique information C1 to the management server 1. Thus, the second terminal 5 may cause the management server 1 to attempt authentication of the first target using the first unique information C1 and authentication of the second target using the second unique information C2 and to set the correspondence between the first identifier I10 and the second identifier I20 when both the first target and the second target have successfully been authenticated.

In the example of the present embodiment, the second terminal 5 transmits data on the first target, and the first terminal 4 transmits data on the second target. Since each terminal (4, 5) acquires information on the counterpart in the use relationship, the certainty of the occurrence of the use relationship between the first target and the second target can be increased. As a result, improvement in the reliability of the linkage information D10 can be expected.

(A-1-2) Pattern 2

In pattern 2, the first terminal 4 may transmit the first identifier I10 and the second unique information C2, and the second terminal 5 may transmit the second identifier I20 and the first unique information C1. That is, the reception of the first identifier I10, the first unique information C1, the second identifier I20, and the second unique information C2 from at least one of the first terminal 4 and the second terminal 5 may include reception of the first identifier I10 and the second unique information C2 from the first terminal 4 and reception of the second identifier I20 and the first unique information C1 from the second terminal 5.

When the use relationship occurs between the first target and the second target, the first terminal 4 may provide the first unique information C1 to the second terminal 5 during the data exchange with the second terminal 5. Thus, the first terminal 4 may cause the second terminal 5 to transmit the first unique information C1 (and the second identifier I20) to the management server 1 on behalf of the first terminal 4. The first terminal 4 may acquire the second unique information C2 from the second target during the data exchange. The first terminal 4 may transmit the acquired second unique information C2 (and the first identifier I10) to the management server 1. Thus, the first terminal 4 may cause the management server 1 to attempt authentication of the first target using the first unique information C1 and authentication of the second target using the second unique information C2 and to set the correspondence between the first identifier I10 and the second identifier I20 when both the first target and the second target have successfully been authenticated.

When the use relationship occurs between the first target and the second target, the second terminal 5 may provide the second unique information C2 to the first terminal 4 during the data exchange with the first terminal 4. Thus, the second terminal 5 may cause the first terminal 4 to transmit the second unique information C2 (and the first identifier I10) to the management server 1 on behalf of the second terminal 5. The second terminal 5 may acquire the first unique information C1 from the first target during the data exchange. The second terminal 5 may transmit the acquired first unique information C1 (and the second identifier I20) to the management server 1. Thus, the second terminal 5 may cause the management server 1 to attempt authentication of the first target using the first unique information C1 and authentication of the second target using the second unique information C2 and to set the correspondence between the first identifier I10 and the second identifier I20 when both the first target and the second target have successfully been authenticated.

In the example of the present embodiment, the second terminal 5 transmits part of the data on the first target and the first terminal 4 transmits part of the data on the second target as in pattern 1. Thus, the certainty of the occurrence of the use relationship between the first target and the second target can be increased. As a result, improvement in the reliability of the linkage information D10 can be expected.

In the example of the present embodiment, the first terminal 4 may be configured not to transmit the second identifier I20 to the management server 1, and the second terminal 5 may be configured not to transmit the first identifier I10 to the management server 1. Thus, it is possible to avoid data transmission in the form of the combination of pieces of data to be used for authentication of each target ("first identifier I10 and first unique information C1", "second identifier I20 and second unique information C2"). As a result, it is not possible to identify the combination of pieces of data to be used for authentication of each target from only one of the data transmissions from the first terminal 4 and the second terminal 5. Thus, further improvement in security can be expected.

(A-1-3) Pattern 3

In pattern 3, the first terminal 4 may transmit the second identifier I20 and the first unique information C1, and the second terminal 5 may transmit the first identifier I10 and the second unique information C2. That is, the reception of the first identifier I10, the first unique information C1, the second identifier I20, and the second unique information C2 from at least one of the first terminal 4 and the second terminal 5 may include reception of the second identifier I20 and the first unique information C1 from the first terminal 4 and reception of the first identifier I10 and the second unique information C2 from the second terminal 5.

When the use relationship occurs between the first target and the second target, the first terminal 4 may provide the first identifier I10 to the second terminal 5 during the data exchange with the second terminal 5. Thus, the first terminal 4 may cause the second terminal 5 to transmit the first identifier I10 (and the second unique information C2) to the management server 1 on behalf of the first terminal 4. The first terminal 4 may acquire the second identifier I20 from the second target during the data exchange. The first terminal 4 may transmit the acquired second identifier I20 (and the first unique information C1) to the management server 1. Thus, the first terminal 4 may cause the management server 1 to attempt authentication of the first target using the first unique information C1 and authentication of the second target using the second unique information C2 and to set the correspondence between the first identifier I10 and the second identifier I20 when both the first target and the second target have successfully been authenticated.

When the use relationship occurs between the first target and the second target, the second terminal 5 may provide the second identifier I20 to the first terminal 4 during the data exchange with the first terminal 4. Thus, the second terminal 5 may cause the first terminal 4 to transmit the second identifier I20 (and the first unique information C1) to the management server 1 on behalf of the second terminal 5. The second terminal 5 may acquire the first identifier I10 from the first target during the data exchange. The second terminal 5 may transmit the acquired first identifier I10 (and the second unique information C2) to the management server 1. Thus, the second terminal 5 may cause the management server 1 to attempt authentication of the first target using the first unique information C1 and authentication of the second target using the second unique information C2 and to set the correspondence between the first identifier I10 and the second identifier I20 when both the first target and the second target have successfully been authenticated.

In the example of the present embodiment, the second terminal 5 transmits part of the data on the first target and the first terminal 4 transmits part of the data on the second target as in pattern 1. Thus, the certainty of the occurrence of the use relationship between the first target and the second target can be increased. As a result, improvement in the reliability of the linkage information D10 can be expected.

In the example of the present embodiment, the first terminal 4 may be configured not to transmit the first identifier I10 to the management server 1, and the second terminal 5 may be configured not to transmit the second identifier I20 to the management server 1. Thus, it is possible to avoid data transmission in the form of the combination of pieces of data to be used for authentication of each target as in pattern 2. As a result, it is not possible to identify the combination of pieces of data to be used for authentication of each target from only one of the data transmissions from the first terminal 4 and the second terminal 5. Thus, further improvement in security can be expected.

(A-1-4) Pattern 4

In pattern 4, the first terminal 4 may transmit the first identifier I10 and the first unique information C1, and the second terminal 5 may transmit the second identifier I20 and the second unique information C2. That is, the reception of the first identifier I10, the first unique information C1, the second identifier I20, and the second unique information C2 from at least one of the first terminal 4 and the second terminal 5 may include reception of the first identifier I10 and the first unique information C1 from the first terminal 4 and reception of the second identifier I20 and the second unique information C2 from the second terminal 5.

When the use relationship occurs between the first target and the second target, the first terminal 4 may cause the second terminal 5 to transmit the second identifier I20 and the second unique information C2 to the management server 1 in response to the data exchange with the second terminal 5. The first terminal 4 may transmit the first identifier I10 and the first unique information C1 to the management server 1. Thus, the first terminal 4 may cause the management server 1 to attempt authentication of the first target using the first unique information C1 and authentication of the second target using the second unique information C2 and to set the correspondence between the first identifier I10 and the second identifier I20 when both the first target and the second target have successfully been authenticated.

When the use relationship occurs between the first target and the second target, the second terminal 5 may cause the first terminal 4 to transmit the first identifier I10 and the first unique information C1 to the management server 1 in response to the data exchange with the first terminal 4. The second terminal 5 may transmit the second identifier I20 and the second unique information C2 to the management server 1. Thus, the second terminal 5 may cause the management server 1 to attempt authentication of the first target using the first unique information C1 and authentication of the second target using the second unique information C2 and to set the correspondence between the first identifier I10 and the second identifier I20 when both the first target and the second target have successfully been authenticated.

According to the example of the present embodiment, the first terminal 4 transmits the data on the first target, and the second terminal 5 transmits the data on the second target. Thus, improvement in the efficiency of data transmission can be expected.

(A-1-5) Others

The transmission items of the terminals (4, 5) are not limited to those in the above four patterns. In another example, one of the first terminal 4 and the second terminal 5 may transmit the first unique information C1 and the second unique information C2, and the other may transmit the first identifier I10 and the second identifier I20. The unit of transmission for each terminal (4, 5) need not agree with the units of the identifier (I10, I20) and the unique information (C1, C2). For example, one of the first terminal 4 and the second terminal 5 may transmit part of the first unique information C1, and the other may transmit the rest of the first unique information C1. In this way, the first terminal 4 and the second terminal 5 may divide and transmit data for at least one of the items.

(A-2) Association Method

When the split transmission pattern is adopted, the first terminal 4 transmits part of the data to be used for authentication of the first target and the second target, and the second terminal 5 transmits the rest of the data. To identify the combination of the first target and the second target that are currently requesting the setting of the correspondence, the management server 1 identifies association of the pieces of data (i.e., determines the combination of the corresponding pieces of data). When the first target and the second target have successfully been authenticated using the associated pieces of data, the correspondence is set between the first target and the second target in the associated pieces of data.

The data association may be identified by any method. In one example, the data transmitted from each terminal (4, 5) may include shared information for identifying the data association. The shared information may be information indicating a relationship of, for example, agreement or correspondence establishment. The management server 1 may identify the data association in response to establishment of a relationship between the shared information in the data received from one of the first terminal 4 and the second terminal 5 and the shared information in the data received from the other.

The shared information may have any structure. In one example, the shared information may include the combination of the first identifier I10 and the second identifier I20. In this case, the management server 1 may identify the data association in response to agreement between the combination of the identifiers (I10, I20) in the data received from the first terminal 4 and the combination of the identifiers (I10, I20) in the data received from the second terminal 5. In another example, the shared information may be temporary information such as a random number, a timestamp, or a hash value. In this case, the management server 1 may identify the data association in response to establishment of a relationship between the temporary information in the data received from the first terminal 4 and the temporary information in the data received from the second terminal 5. By adopting the latter out of pattern 2 and pattern 3, further improvement in security can be expected.

The shared information may be shared between the first terminal 4 and the second terminal 5 at any timing. In a typical example, the first terminal 4 and the second terminal 5 may share the shared information during the data exchange (steps SA10, SB10). When data is received from one of the first terminal 4 and the second terminal 5 and then no data is transmitted from the other within a predetermined period, the management server 1 may notify, by any method, at least one of the first terminal 4 and the second terminal 5 about an inquiry to request transmission of the rest of the data. The management server 1 may typically notify, about the inquiry, one terminal from which the data has been received. When the other terminal from which the data has not been received is identified, the management server 1 may notify the other terminal about the inquiry.

(B) Collective Transmission

In one example, one of the first terminal 4 and the second terminal 5 may transmit the first identifier I10, the first unique information C1, the second identifier I20, and the second unique information C2. That is, the reception of the first identifier I10, the first unique information C1, the second identifier I20, and the second unique information C2 from at least one of the first terminal 4 and the second terminal 5 may include reception of the first identifier I10, the first unique information C1, the second identifier I20, and the second unique information C2 from one of the first terminal 4 and the second terminal 5.

In a case of collective transmission from the second terminal 5, the first terminal 4 may provide the first identifier I10 and the first unique information C1 to the second terminal 5 during the data exchange with the second terminal 5 when the use relationship occurs between the first target and the second target. Thus, the first terminal 4 may cause the second terminal 5 to transmit the first identifier I10, the first unique information C1, the second identifier I20, and the second unique information C2 to the management server 1. In response to this data transmission, the first terminal 4 may cause, via the second terminal 5, the management server 1 to attempt authentication of the first target using the first unique information C1 and authentication of the second target using the second unique information C2 and to set the correspondence between the first identifier I10 and the second identifier I20 when both the first target and the second target have successfully been authenticated.

In a case of collective transmission from the first terminal 4, the second terminal 5 may provide the second identifier I20 and the second unique information C2 to the first terminal 4 during the data exchange with the first terminal 4 when the use relationship occurs between the first target and the second target. Thus, the second terminal 5 may cause the first terminal 4 to transmit the first identifier I10, the first unique information C1, the second identifier I20, and the second unique information C2 to the management server 1. In response to this data transmission, the second terminal 5 may cause, via the first terminal 4, the management server 1 to attempt authentication of the first target using the first unique information C1 and authentication of the second target using the second unique information C2 and to set the correspondence between the first identifier I10 and the second identifier I20 when both the first target and the second target have successfully been authenticated.

In the example of the present embodiment, the second terminal 5 transmits the data on the first target, or the first terminal 4 transmits the data on the second target. Thus, the certainty of the occurrence of the use relationship between the first target and the second target can be increased. As a result, improvement in the reliability of the linkage information D10 can be expected.

Data Exchange

In the present embodiment, the series of processes related to the linkage setting may be started in response to the data exchange between the first terminal 4 and the second terminal 5 (steps SA10, SB10). The data exchange method is not particularly limited, and may be selected as appropriate depending on embodiments.

In one example, the data exchange between the first terminal 4 and the second terminal 5 may be performed by wireless or wired data communication. The wireless communication may be performed by using, for example, near field communication (NFC), Bluetooth (registered trademark), or Wi-Fi (registered trademark). The wired communication may be performed by using, for example, a wired local area network (LAN) or a universal serial bus (USB). The data communication may be performed directly between the first terminal 4 and the second terminal 5 or may be performed indirectly via another computer. In another example, the data exchange may be performed by a method other than the data communication, such as reading a two-dimensional code. For example, the data exchange may be performed in such a manner that one of the first terminal 4 and the second terminal 5 displays data on a display and the other reads the displayed data by using a sensor such as an image sensor.

When one of the first terminal 4 and the second terminal 5 transmits data on the other target in the data transmission to the management server 1 (e.g., pattern 1 to pattern 3 of split transmission or collective transmission), the one terminal may acquire, during the data exchange, the data on the other target to be transmitted. That is, at least one of providing the data on the first target from the first terminal 4 to the second terminal 5 and providing the data on the second target from the second terminal 5 to the first terminal 4 may be executed during the data exchange. Alternatively, during the data exchange, the first terminal 4 may acquire the data on the second target by a voluntary operation and the second terminal 5 may acquire the data on the first target by a voluntary operation.

When pattern 1 of split transmission is adopted as a specific example, the first terminal 4 may acquire the second identifier I20 and the second unique information C2 from the second target during the data exchange. In one example, when the second terminal 5 holds at least one of the second identifier I20 and the second unique information C2, the first terminal 4 may acquire at least one of the second identifier I20 and the second unique information C2 from the second terminal 5 by data communication. In another example, the first terminal 4 may acquire at least one of the second identifier I20 and the second unique information C2 from the second terminal 5 by a method other than the data communication, such as reading data displayed in a two-dimensional code on the second terminal 5. In still another example, the first terminal 4 may acquire at least one of the second identifier I20 and the second unique information C2 from the second target or the second terminal 5 by using a device such as an input device or a sensor during the data exchange. The acquisition from the second target may include acquisition by the first target operating a device as a substitute when the first target is a human and the second target is an object. The same applies to the acquisition of the first identifier I10 and the first unique information C1 by the second terminal 5.

In the example of FIG. 2, the first terminal 4 may acquire the second identifier I20 (mobile body identifier) by data communication or by reading a code. When the second unique information C2 (mobile body unique information) is a vehicle registration number, the first terminal 4 may acquire the second unique information C2 by capturing an image of a license plate with an image sensor and analyzing the obtained image. The second terminal 5 may acquire the first identifier I10 (user identifier) by data communication or by reading a code. When the first unique information C1 (user unique information) is a facial image, the second terminal 5 may acquire the first unique information C1 by capturing an image of the user's face with an image sensor.

When an input device is used to acquire data, acquisition of the data by one terminal from the other target may include not only acquisition of the data from the other target by the other target operating the input device, but also acquisition of the data from the other target by one target operating the input device. When the second unique information C2 (mobile body unique information) is a vehicle registration number and an input device is used to acquire the vehicle registration number in the example of FIG. 2, the first terminal 4 may acquire the second unique information C2 from the mobile body (second target) by the user (first target) inputting the vehicle registration number via the input device.

The acquisition of the data by one terminal from the other target need not be executed during the data exchange. One terminal may acquire the data from the other target at any timing different from that of the data exchange. Any of the above methods may be adopted as the data acquisition method. When one terminal does not acquire the data from the other target within the data exchange (including pattern 4 of split transmission), the data exchange between the first terminal 4 and the second terminal 5 may function as a mere trigger for starting the series of processes related to the linkage setting.

When the first terminal 4 transmits at least part of the data on the first target in the data transmission to the management server 1, the first terminal 4 may acquire the data on the first target at any timing before the data transmission. Similarly, when the second terminal 5 transmits at least part of the data on the second target, the second terminal 5 may acquire the data on the second target at any timing before the data transmission. The data acquisition method is not particularly limited, and may be selected as appropriate depending on embodiments. In one example, when at least one of the first identifier I10 and the first unique information C1 of the first target is prestored in a memory resource of the first terminal 4, the first terminal 4 may acquire at least one of the first identifier I10 and the first unique information C1 of the first target from the memory resource. In another example, the first terminal 4 may acquire at least one of the first identifier I10 and the first unique information C1 of the first target by using an input device, a sensor, etc. The same applies to the acquisition of the data on the second target by the second terminal 5.

Linkage Information

FIG. 3A schematically shows an example of the linkage information D10 according to the present embodiment. In the example of FIG. 3A, the linkage information D10 includes the first identifier I10, the second identifier I20, a setting time, and a termination time. The first identifier I10 and the second identifier I20 indicate the first target and the second target for which the correspondence (linkage) is set. The setting time is the time when the correspondence is set. The setting time may be a timestamp. The termination time is the time when the correspondence is terminated. The value of the termination time may be added when the process of terminating the correspondence is executed. The method for expressing the termination is not limited to such an example. In another example, the termination time may be replaced with at least one of an effective period and a flag. The effective period is a period during which the correspondence setting is effective. In this case, whether the correspondence setting is effective (i.e., whether the correspondence is set or terminated) is indicated depending on whether the time is within the effective period. The flag indicates whether the correspondence is terminated. The flag may be set when the process of terminating the correspondence is executed. In still another example, the linkage information D10 may include at least one of the effective period and the flag together with a field for the termination time. As long as the correspondence setting can be indicated, the structure of the linkage information D10 is not limited to the example of FIG. 3A, and may be changed as appropriate depending on embodiments. In another example, the linkage information D10 may further include information indicating the type of the use item (regular use item or temporary use item). The type of the use item need not be identified by using separate information. For example, the type of the use item may be identified by using information such as an identifier.

The data format of the linkage information D10 is not particularly limited, and may be selected as appropriate depending on embodiments. The linkage information D10 may be held on any database platform. In one example, the linkage information D10 may be held in a relational database in a table format etc. In another example, the linkage information D10 may be held by blockchain infrastructure. In this case, transactions for the linkage setting and termination may be accumulated in the blockchain as the linkage information D10. For example, the transaction for the linkage setting may include the first identifier I10, the second identifier I20, and the setting time. The transaction for the linkage termination may include the first identifier I10, the second identifier I20, and the termination time (or information indicating termination).

First Target Information

The first target information O10 includes the first registered unique information C10. The first target information O10 may include any information on the first target except the first registered unique information C10. The first target information O10 may include, for example, the first identifier I10, attribute information of the first target, and information on authority. In the example of FIG. 2, the user information O10A is an example of the first target information O10.

FIG. 3B schematically shows an example of the user information O10A according to the present embodiment. In the example of FIG. 3B, the user information O10A includes a user ID (first identifier I10), registered user unique information (first registered unique information C10), attribute information, and authority information. The attribute information may include any information on the attributes of the corresponding user. The attribute information may include personal information such as a name, an address, an age, a gender, and contact information. The authority information is related to the authority of the corresponding user. The authority information may include, for example, information for cooperating with a server that executes information processing related to the authority of the target, or information indicating association with the various types of information E10. The structure of the user information O10A is not limited to the example of FIG. 3B, and may be changed as appropriate depending on embodiments.

The data format of the first target information O10 (user information O10A) is not particularly limited, and may be selected as appropriate depending on embodiments. The first target information O10 (user information O10A) may be held on any database platform. In one example, the first target information O10 (user information O10A) may be held in a relational database in a table format etc. In another example, the first target information O10 (user information O10A) may be held by blockchain infrastructure.

Second Target Information

The second target information O20 includes the second registered unique information C20. The second target information O20 may include any information on the second target except the second registered unique information C20. The second target information O20 may include, for example, the second identifier I20, attribute information of the second target, and information on authority. In the example of FIG. 2, the mobile body information O20A is an example of the second target information O20.

FIG. 3C schematically shows an example of the mobile body information O20A according to the present embodiment. In the example of FIG. 3C, the mobile body information O20A includes a mobile body ID (second identifier I20), registered mobile body unique information (second registered unique information C20), and attribute information. The attribute information includes a number, a type, and owner information. When the mobile body is a vehicle, the number is a vehicle registration number and the type is a vehicle type. When the vehicle registration number is used as the mobile body unique information, the number may be omitted from the attribute information. The owner information may include any information on the owner of the mobile body. The owner information may include personal information of the owner, such as a name, an address, an age, a gender, and contact information. The owner may be a corporation. The structure of the mobile body information O20A is not limited to the example of FIG. 3C, and may be changed as appropriate depending on embodiments. The structure of the attribute information may also be changed as appropriate. For example, the mobile body information O20A may further include information on the mobile body terminal, such as contact information of the mobile terminal.

The data format of the second target information O20 (mobile body information O20A) is not particularly limited, and may be selected as appropriate depending on embodiments. The second target information O20 (mobile body information O20A) may be held on any database platform. In one example, the second target information O20 (mobile body information O20A) may be held in a relational database in a table format etc. In another example, the second target information O20 (mobile body information O20A) may be held by blockchain infrastructure.

Linkage Setting Notification Method

The management server 1 may transmit a notification indicating a result of the linking process to at least one of the first terminal 4 and the second terminal 5 (step SC30). The notification transmission route is not particularly limited, and may be determined as appropriate depending on embodiments. In one example, the management server 1 may directly notify at least one of the first terminal 4 and the second terminal 5 (FIGS. 1 and 2). In another example, the management server 1 may indirectly notify at least one of the first terminal 4 and the second terminal 5 via an external computer such as each server (2, 3).

Continued Use Checking Process

As one of the optional configurations, the management server 1 may further execute, after the correspondence between the first target and the second target has been set, a process for checking whether the correspondence continues (checking process). The continued use checking method may be selected as appropriate depending on embodiments.

In one example, the continuation of the correspondence may be checked by authenticating at least one of the first target and the second target via at least one of the first terminal 4 and the second terminal 5. The authentication in the checking process may be executed similarly to the authentication using the unique information (C1, C2) or may be executed differently. In order to increase certainty, one of the first terminal 4 and the second terminal 5 may be used as a medium to authenticate the other target as in pattern 1 of split transmission. In the example of FIG. 2, the user may be authenticated by a method such as authenticating the user's face by using an image sensor installed on the mobile body, authenticating the user's fingerprint by using a fingerprint reader attached to the steering wheel, or causing the user to utter and authenticating the voiceprint by using a microphone installed on the mobile body. The authentication process may be executed by the terminal (4, 5) or the server (2, 3). When executing the authentication process on the server (2, 3), the data to be used for authentication may be transmitted directly from the terminal (4, 5) to the server (2, 3) or may be transmitted indirectly via an external computer such as the management server 1. The data to be used for authentication in the checking process may be the same as or different from the unique information (C1, C2). The management server 1 may acquire an authentication result as appropriate. The management server 1 may determine that the correspondence continues when the acquired authentication result shows that the target has successfully been authenticated, and determine that the correspondence does not continue when the acquired authentication result shows that the target has not successfully been authenticated.

In another example, when at least one of the first target and the second target is a user (e.g., the case of FIG. 2), the management server 1 may directly or indirectly transmit a confirmation notification including an operator to at least one of the first terminal 4 and the second terminal 5. The operator may be, for example, a confirmation button, a reply button, or a link. The transmission destination of the confirmation notification need not correspond to the user. In the case of FIG. 2, the management server 1 may transmit the confirmation notification to at least one of the first terminal 4 and the second terminal 5. The transmission destination of the confirmation notification may be the same as or different from the transmission destination of the notification indicating the result of the linking process. A response to the confirmation notification may be returned directly or indirectly to the management server 1 in response to operation on the operator by the user. The management server 1 may determine that the correspondence continues when the response by the operation on the operator is received within a predetermined period, and determine that the correspondence does not continue when the response is not received.

In still another example, when tracking the correspondence between the first target and the second target in the real world, each terminal (4, 5) may include a positioning module such as a global positioning satellite (GPS) module or a global navigation satellite system (GNSS) module. The first terminal 4 may measure the current position of the first target (first terminal 4) by using the positioning module, and the second terminal 5 may measure the current position of the second target (second terminal 5) by using the positioning module. Each terminal (4, 5) may transmit the obtained current position of each target to the management server 1 directly or indirectly via an external computer such as each server (2, 3). The management server 1 may determine whether the correspondence continues based on whether the received current positions of the targets are close enough to satisfy a predetermined condition for the use relationship (e.g., the user is on the mobile body). That is, the management server 1 may determine that the correspondence continues when the current positions of the targets are close enough to satisfy the predetermined condition, and otherwise determine that the correspondence does not continue. When this configuration is adopted, the management server 1 may store information on the obtained current positions of the targets in association with the linkage information D10. Thus, the management server 1 can track not only the correspondence between the targets but also the movement records of the targets. At least part of the above process may be executed by a computer other than the management server 1.

When determination is made that the correspondence continues, the management server 1 may maintain the setting of the correspondence. When determination is made that the correspondence does not continue, the management server 1 may terminate the correspondence. After the correspondence has been set, the management server 1 may update the status of the correspondence by repeating the checking process regularly or irregularly until the correspondence is terminated.

Linkage Termination

In the present embodiment, the management server 1 may terminate the correspondence in response to reception of a termination request from at least one of the first terminal 4 and the second terminal 5 or satisfaction of a predetermined termination condition.

(I) Termination Request

In one example, the termination request for the linkage includes at least one of the first identifier I10 and the second identifier I20. In a simple expression, the first terminal 4 may transmit a termination request that includes the first identifier I10 but does not include the second identifier I20 to the management server 1. Similarly, the second terminal 5 may transmit a termination request that includes the second identifier I20 but does not include the first identifier I10 to the management server 1. When overlap of correspondence settings is permitted, the termination request may include both the first identifier I10 and the second identifier I20. In one example, the first terminal 4 or the second terminal 5 may transmit a termination request including the first identifier I10 and the second identifier I20 to the management server 1. In another example, the first terminal 4 may transmit a termination request including one of the first identifier I10 and the second identifier I20, and the second terminal 5 may transmit a termination request including the other. In still another example, the management server 1 may assign an identifier to the set correspondence and notify at least one of the first terminal 4 and the second terminal 5 about the assigned identifier at any timing such as a timing of the notification indicating the result of the linking process. At least one of the first terminal 4 and the second terminal 5 may transmit a termination request including the identifier to the management server 1 to designate the correspondence to be terminated, and cause the management server 1 to terminate the designated correspondence. According to the example of the present embodiment, the first identifier I10 and the second identifier I20 can be omitted from the information in the termination request. Thus, improvement in the efficiency of data communication for the termination request can be expected.

When the first terminal 4 transmits a termination request including the second identifier I20, the first terminal 4 may acquire the second identifier I20 at any timing. In one example, when the first terminal 4 acquires the second identifier I20 at the time of requesting the linkage setting (e.g., pattern 1 of split transmission), the first terminal 4 may store the second identifier I20 acquired at the time of requesting the linkage setting in the memory resource as current linkage information. Alternatively, when the management server 1 transmits the notification indicating the result of the linking process to the first terminal 4, the notification may include the second identifier I20. The first terminal 4 may store the second identifier I20 in the notification received from the management server 1 in the memory resource as current linkage information. When requesting linkage termination, the first terminal 4 may acquire the second identifier I20 from the memory resource. The first terminal 4 may acquire the first identifier I10 at any timing. In one example, the first identifier I10 may be prestored in the memory resource. When creating the current linkage information, the first terminal 4 may store the second identifier I20 in association with the first identifier I10. When transmitting the termination request, the first terminal 4 may acquire the first identifier I10 from the memory resource.

Similarly, when the second terminal 5 transmits a termination request including the first identifier I10, the second terminal 5 may acquire the first identifier I10 at any timing. In one example, when the second terminal 5 acquires the first identifier I10 at the time of requesting the linkage setting (e.g., pattern 1 of split transmission), the second terminal 5 may store the first identifier I10 acquired at the time of requesting the linkage setting in the memory resource as current linkage information. Alternatively, when the management server 1 transmits the notification indicating the result of the linking process to the second terminal 5, the notification may include the first identifier I10. The second terminal 5 may store the first identifier I10 in the notification received from the management server 1 in the memory resource as current linkage information. When requesting linkage termination, the second terminal 5 may acquire the first identifier I10 from the memory resource. The second terminal 5 may acquire the second identifier I20 at any timing. In one example, the second identifier I20 may be prestored in the memory resource. When creating the current linkage information, the second terminal 5 may store the first identifier I10 in association with the second identifier I20. When transmitting the termination request, the second terminal 5 may acquire the second identifier I20 from the memory resource.

FIG. 4A schematically shows an example of the course of the linkage termination according to the present embodiment. In the example of FIG. 4A, the first terminal 4 directly transmits a termination request to the management server 1 as a first route (step SZ10). As a second route, the first terminal 4 gives an instruction to the second terminal 5 (step SZ10A), and causes the second terminal 5 to directly transmit a termination request to the management server 1 (step SZ11A). The transmission route of the termination request is not limited to such an example. The first terminal 4 may indirectly transmit the termination request to the management server 1 via an external computer such as the first server 2. On the second route, the second terminal 5 may indirectly transmit the termination request to the management server 1 via an external computer such as the second server 3. The starting point of the linkage termination is not limited to the first terminal 4. In another example, the second terminal 5 may directly or indirectly transmit the termination request to the management server 1. The second terminal 5 may give an instruction to the first terminal 4 and cause the first terminal 4 to directly or indirectly transmit the termination request to the management server 1. After the termination request is received, the management server 1 refers to the linkage information D10 and terminates the correspondence designated by the identifier in the termination request. After the termination process, the management server 1 may transmit a notification indicating a result of the termination process to at least one of the first terminal 4 and the second terminal 5 similarly to the linkage setting.

In one example, the termination request process may include an authentication process for at least one of the first target and the second target. The authentication process may be similar to the authentication process in the linkage setting process or the continued use checking process. The authentication process need not be executed during the termination request. In another example, the termination request process may be simplified by omitting the authentication process.

The trigger for the termination request may be set as appropriate depending on embodiments. In one example, when at least one of the first target and the second target is a user, the termination request may be transmitted from at least one of the first terminal 4 and the second terminal 5 by the user's operation on at least one of the first terminal 4 and the second terminal 5. That is, the trigger for the termination request may be the user's operation. In another example, at least one of the first terminal 4 and the second terminal 5 may execute any information processing in response to disappearance of the use relationship. The any information processing may trigger transmission of the termination request from at least one of the first terminal 4 and the second terminal 5. For example, the any information processing may be the data exchange between the first terminal 4 and the second terminal 5. The data exchange method during the termination request may be similar to that of the data exchange during the linkage setting (steps SA10, SB10). Distinction may be made as appropriate between the data exchange during the linkage setting and the data exchange during the termination request. In the example of FIG. 2, the second terminal 5 may include separate sensor devices at the entrance and exit as in the case of a bus entrance, a railway ticket gate, etc. In this case, distinction may be made between the linkage setting and the termination request based on the sensor device used for the data exchange. For example, when the data exchange is executed by an application on the terminal, the application may be switchable between a linkage setting mode and a termination request mode. In this case, distinction may be made between the linkage setting and the termination request based on the mode of the application.

Any internal processing may be executed in each terminal (4, 5) along with the termination request process. In one example, when the current linkage information is created in at least one of the first terminal 4 and the second terminal 5, the at least one terminal may update the current linkage information to past linkage information along with the termination request process. The update process may be set as appropriate depending on embodiments. For example, the update process may be deletion of the current linkage information. In this case, the current linkage information may be deleted completely or stored as a past linkage record. For example, the update process may be invalidation of the current linkage information by adding invalidation information indicating setting of an end time or an end flag to the current linkage information. When one of the first terminal 4 and the second terminal 5 transmits the termination request, the one terminal may transmit a notification about the linkage termination to the other terminal along with the transmission of the termination request or success in the termination. When the current linkage information is created in the other terminal, the other terminal may execute the update process based on the notification.

(II) Termination Condition

The termination condition is a condition for terminating the correspondence between the targets. The termination condition may be defined as appropriate depending on embodiments.

In one example, the termination condition may be defined to terminate the correspondence at a termination time set as desired. The termination time may be provided, for example, by designation from the user or designation from another application (scheduler etc.). In this case, the management server 1 may terminate the correspondence between the targets when the termination time has come. The termination time may be set as the end of an effective period of the linkage information D10. When the termination time is set as the end of the effective period, the management server 1 may treat the correspondence between the targets as being terminated when the termination time has come.

In another example, the termination condition may be defined so that, when a plurality of correspondence settings for the same target has overlapped due to interruption of a correspondence setting by at least one of another first target and another second target, any one of the overlapping correspondences is terminated. The number of correspondences (linkages) that can be set for the same target is not limited to one and may be two or more. The management server 1 may terminate any of the previously set and maintained correspondences when the number of overlapping correspondence settings has exceeded a threshold (upper limit). The threshold may be provided as appropriate. The correspondence to be terminated may be determined as appropriate depending on a priority level, order, a type of the target, etc.

For example, it is assumed that one of the first target and the second target is a user and the other is a use item. In this case, the number of users who can be linked to the same use item may be infinite or finite. When the number of users who can be linked is finite, the upper limit of the number of users who can be linked may be provided as appropriate by a threshold. The threshold may be set based on the attributes of the use item. When a new correspondence setting for the target use item is received, the management server 1 may refer to the linkage information D10 and extract the previous correspondence that has been set and maintained for the target use item. When the number of overlapping correspondence settings for the target use item has exceeded the threshold due to the newly received correspondence setting, the management server 1 may discard a request for the newly received correspondence setting or terminate at least one of the extracted previous correspondences. When terminating the previous correspondence, the management server 1 may determine the correspondence to be terminated depending on the user's priority level, order (e.g., the correspondence set earlier is terminated), etc.

In the example of FIG. 2 as a specific example, it is assumed that the mobile body is a private car and a first user and a second user are, for example, in a family and share the target private car. The private car may be interpreted as a regular use item. For convenience of description, it is assumed that the number of users who can be linked to the target private car is one. When the correspondence between one of the first user and the second user and the target private car is set and, meanwhile, the setting of a correspondence between the other user and the target private car is received, the management server 1 may terminate the previous correspondence (correspondence between the one user and the target private car).

Similarly, the number of use items that can be linked to the same user may be infinite or finite. When the number of use items that can be linked is finite, the upper limit of the number of use items that can be linked may be provided as appropriate by a threshold. When a new correspondence setting for the target user is received, the management server 1 may refer to the linkage information D10 and extract the previous correspondence that has been set and maintained for the target user. When the number of overlapping correspondence settings for the target user has exceeded the threshold due to the newly received correspondence setting, the management server 1 may discard a request for the newly received correspondence setting or terminate at least one of the extracted previous correspondences. When terminating the previous correspondence, the management server 1 may determine the correspondence to be terminated depending on the priority level of the use item, the type (e.g., a regular use item or a temporary use item), etc.

In the example of FIG. 2 as a specific example, it is assumed that a first mobile body is a regular use item (e.g., a private car) and a second mobile body is a temporary use item (e.g., a rental car, a shared car, or a public transportation mobile body). When the correspondence between the target user and the first mobile body is set and, meanwhile, the setting of a correspondence between the target user and the second mobile body is received, the management server 1 may terminate the previous correspondence (correspondence with first mobile body).

In this specific example, the management server 1 may set again the previously terminated correspondence between the first mobile body (regular use item) and the target user in response to termination of the correspondence with the second mobile body (temporary use item). Thus, the setting of the correspondence with the regular use item can be restored quickly. When both the first mobile body and the second mobile body are regular use items or temporary use items, the management server 1 may arbitrate the overlapping correspondence settings as appropriate. For example, the management server 1 may discard a request for a newly received correspondence setting unless the previous correspondence is terminated.

As described above, the management server 1 may terminate the correspondence in response to reception of the termination request from at least one of the first terminal 4 and the second terminal 5 or satisfaction of the predetermined termination condition. According to the example of the present embodiment, it is possible to track the disappearance of the use relationship between the first target and the second target. The linkage information D10 after the termination of the correspondence may be stored as a record.

Simplified Linkage Setting Process

In one example, when the use relationship repeatedly occurs and disappears in the same combination of the first target and the second target, the management system 100 may execute the authentication process for the first target and the second target each time and repeatedly set and terminate the correspondence. In a case where the use relationship repeatedly occurs and disappears frequently, each execution of the authentication process for the same combination of the first target and the second target may be a hassle. Particularly in a case where one of the first target and the second target is a user and the other is a regular use item, each execution of the authentication of the two may be a hassle.

In another example, the management system 100 may set the correspondence while omitting the authentication process for at least one of the first target and the second target in the subsequent linkage setting processes for the same combination of the first target and the second target. That is, the management system 100 may receive a request for the correspondence setting for a combination of the first target and the second target for which the correspondence was set in the past, while omitting the authentication process for at least one of the first target and the second target. For convenience of description, the process of setting the correspondence while omitting the authentication process for at least one of the first target and the second target will also be referred to as "simplified linkage setting process", and the normal route process in which the authentication process is not omitted will also be referred to as "normal linkage setting process". In one example, the authentication process for one of the first target and the second target may be executed in the linkage setting using the simplified process. In another example, the authentication process for both the first target and the second target may be omitted in the linkage setting using the simplified process.

Information on the combination of the first target and the second target for which the correspondence was set in the past may be managed by at least one of the management server 1, each server (2, 3), and each terminal (4, 5). In one example, the linkage information D10 may be maintained as a record even after the correspondence is terminated. Based on the record of the linkage information D10, the management server 1 may determine whether a combination of the first target and the second target for which a request for the correspondence setting has been received is a combination for which the correspondence was set in the past. When determination is made that the combination is the combination for which the correspondence was set in the past, the management server 1 may perform the linkage setting using the simplified process. At any timing such as a timing of the linkage setting, the first terminal 4 may acquire the second identifier I20 of the second target and store the acquired second identifier I20 as a counterpart in the simplified process. The second terminal 5 may also acquire the first identifier I10 of the first target and store the acquired first identifier I10 as a counterpart in the simplified process. Thus, at least one of the first terminal 4 and the second terminal 5 may hold information on the counterpart for which the correspondence was set in the past, and use the held information on the counterpart to request the linkage setting using the simplified process. The first server 2 may acquire the second identifier I20 of the second target from at least one of the management server 1 and each terminal (4, 5), and store the acquired second identifier I20 as the counterpart in the simplified process in association with the first target information O10 of the corresponding first target. The second server 3 may also acquire the first identifier I10 of the first target from at least one of the management server 1 and each terminal (4, 5), and store the acquired first identifier I10 as the counterpart in the simplified process in association with the second target information O20 of the corresponding second target. Thus, at least one of the first server 2 and the second server 3 may hold information on the counterpart for which the correspondence was set in the past, and use the held information on the counterpart to handle the linkage setting using the simplified process.

The management system 100 may permit the simplified process for part of the first target and the second target in such a manner that the simplified process is permitted for the regular use item and is not permitted for the temporary use item and it is linked each time by the normal process. Whether to permit the simplified process may be switched as appropriate. In one example, whether to permit the simplified process may be switched depending on the type of at least one of the first target and the second target. As a specific example, when one of the first target and the second target is a user and the other is a use item, whether to permit the simplified process may be switched depending on the type of the use item (regular use item or temporary use item) as described above.

Whether to permit the simplified process may be switched by any method. In one example, at least one of the management server 1, each server (2, 3), and each terminal (4, 5) may identify the type of the use item and switch whether to permit the simplified process based on the identification result. The type of the use item may be identified based on individual information in the target information or based on information such as an identifier. In another example, a program including a mode in which the simplified process is permitted may be installed only in a terminal of the use item for which the simplified process is permitted, such as a terminal of the regular use item (second terminal 5 in FIG. 2), and whether to permit the simplified process may be switched by the operation of this terminal. The operation in the mode in which the simplified process is permitted may be, for example, storing information on the counterpart or transmitting a request for the linkage setting using the simplified process.

The request for the linkage setting using the simplified process may be transmitted from at least one of the first terminal 4 and the second terminal 5. At least one of the first terminal 4 and the second terminal 5 may transmit the request for the linkage setting using the simplified process to the management server 1 directly or indirectly via an external computer such as each server (2, 3). For example, the first terminal 4 may transmit the request for the linkage setting using the simplified process to the management server 1 directly or indirectly via an external computer such as the first server 2. The first terminal 4 may give an instruction to the second terminal 5 to cause the second terminal 5 to transmit the request for the linkage setting using the simplified process to the management server 1 directly or indirectly via an external computer such as the second server 3. Similarly, the second terminal 5 may transmit the request for the linkage setting using the simplified process to the management server 1 directly or indirectly via an external computer such as the second server 3. The second terminal 5 may give an instruction to the first terminal 4 to cause the first terminal 4 to transmit the request for the linkage setting using the simplified process to the management server 1 directly or indirectly via an external computer such as the first server 2.

Whether the request is made for the simplified process or the normal process may be determined as appropriate. In one example, the linkage setting request may include information indicating whether it is made for the simplified process. The management server 1 may determine whether the request is made for the simplified process or the normal process based on this information. In another example, the management server 1 may determine whether the request is made for the simplified process or the normal process based on information on the targets (e.g., a combination of the first identifier I10 and the second identifier I20) in the linkage setting request.

The request for the linkage setting using the simplified process may basically include the first identifier I10 and the second identifier I20. The first identifier I10 and the second identifier I20 in the request may be obtained from each terminal (4, 5) or each server (2, 3) in the course of transmission from at least one of the first terminal 4 and the second terminal 5 to the management server 1. The request for the linkage setting using the simplified process is not limited to such a structure. At least one of the first identifier I10 and the second identifier I20 may be omitted from the information in the request. In another example, the management server 1 may assign, similarly to the example of the termination request, an identifier to the correspondence between the first identifier I10 and the second identifier I20 during the linkage setting in the past to store (register) the combination for which the simplified process is permitted. The management server 1 may notify at least one of the first terminal 4 and the second terminal 5 about the assigned identifier at any timing such as a timing of the notification indicating the result of the linking process. At least one of the first terminal 4 and the second terminal 5 may transmit a linkage setting request including the identifier to the management server 1 to cause the management server 1 to execute the linkage setting using the simplified process. According to the example of the present embodiment, the first identifier I10 and the second identifier I20 can be omitted from the information in the request. Thus, improvement in the efficiency of data communication for the linkage setting request can be expected.

In one example, when the authentication process for one of the first target and the second target is executed in the simplified process, the authentication process for one of the first target and the second target may be executed in a transmission pattern similar to that of the normal process. For example, when pattern 1 of split transmission is adopted in the normal process, pattern 1 of split transmission may be adopted also in the simplified process. The pattern of the authentication process in the simplified process is not limited to such an example. In another example, the transmission pattern of the authentication process in the simplified process may be different from the transmission pattern adopted in the normal process among the above transmission patterns. In still another example, at least one of the first terminal 4 and the second terminal 5 may directly transmit the authentication request to each server (2, 3). The authentication result may be transmitted to the management server 1 from at least one of each server (2, 3) and each terminal (4, 5).

When the authentication process for one of the first target and the second target is executed, the terminal that transmits the request for the linkage setting using the simplified process may store at least part of the data (identifier, unique information) to be used for authentication of the one target. For example, when pattern 1 of split transmission is adopted, the second terminal 5 may store at least one of the first identifier I10 and the first unique information C1 of the first target in the memory resource at any timing such as a timing of the past linkage setting. The second terminal 5 may acquire at least one of the first identifier I10 and the first unique information C1 from the memory resource, and use the acquired information to transmit the data to be used for authentication to the management server 1. Thus, it is possible to further reduce the hassle in the linkage setting.

Figure 4B:
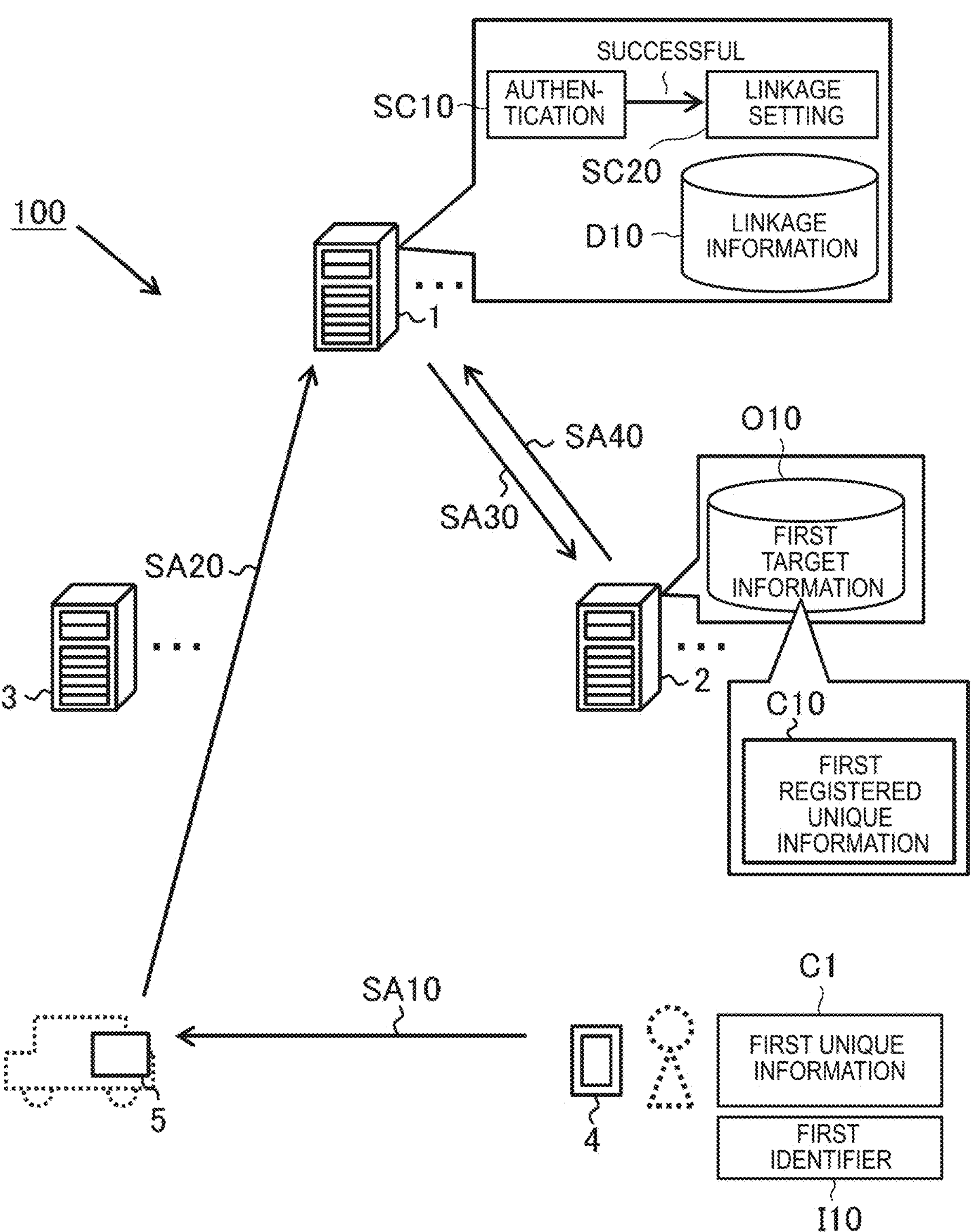
FIG. 4B schematically shows an example of the course of simplified linkage setting according to the embodiment.

FIG. 4B schematically shows an example of the course of the linkage setting using the simplified process according to the present embodiment. In FIG. 4B, it is assumed that the authentication process for the user (first target) is executed, the authentication process for the mobile body (second target) is omitted, and pattern 1 of split transmission is adopted as the transmission pattern of the authentication process in the example of FIG. 2. In step SA10, the first terminal 4 provides the first identifier I10 and the first unique information C1 to the second terminal 5 in the data exchange. The second terminal 5 acquires the first identifier I10 and the first unique information C1 from the user. In step SA20, the second terminal 5 transmits, to the management server 1, a request for the linkage setting using the simplified process including the first identifier I10 and the first unique information C1. This request may also include the second identifier I20. The management server 1 determines as appropriate that the request received from the second terminal 5 is the request for the linkage setting using the simplified process. In step SA30, the management server 1 requests the first server 2 to authenticate the user by transmitting the first identifier I10 and the first unique information C1 to the first server 2. In step SA40, the management server 1 receives a result of the authentication of the user from the first server 2. When the received result shows that the user has successfully been authenticated, the management server 1 sets a correspondence (linkage) between the first identifier I10 and the second identifier I20 (step SC20). The process of the linkage setting using the simplified process is not limited to the example of FIG. 4B, and may be changed as appropriate depending on embodiments. For example, a transmission pattern other than pattern 1 of split transmission may be adopted when the authentication process for one of the first target and the second target is executed as described above. In the simplified process, the authentication process for the user (first target) may be omitted and the authentication process for the mobile body (second target) may be executed. The request for the linkage setting using the simplified process may be transmitted from the first terminal 4 instead of the second terminal 5. The transmission route of the request for the simplified process is not limited to the example of FIG. 4B. At least one of the first identifier I10 and the second identifier I20 may be omitted from the request for the linkage setting using the simplified process.

As one of the optional configurations, the management server 1 may, as a registration process for the target for which the simplified process is permitted, acquire identification information (MAC address, terminal identification information, etc.) of at least one of the first terminal 4 and the second terminal 5 for which the simplified process is permitted and store the acquired identification information. This registration process may be executed at any timing such as a timing of the past linkage setting. The management server 1 may receive the request for the linkage setting using the simplified process only from the terminal identified based on the identification information.

The trigger for the request for the linkage setting using the simplified process may be similar to that in the normal process. That is, the data exchange between the first terminal 4 and the second terminal 5 may trigger at least one of the first terminal 4 and the second terminal 5 to transmit the request for the linkage setting using the simplified process to the management server 1. The trigger for the simplified process is not limited to such an example. In another example, when at least one of the first target and the second target is a user, the request for the linkage setting using the simplified process may be transmitted from at least one of the first terminal 4 and the second terminal 5 by the user's operation on at least one of the first terminal 4 and the second terminal 5. That is, the trigger for the request for the linkage setting using the simplified process may be the user's operation. In another example, the trigger for the request for the linkage setting using the simplified process may be an instruction from another application (scheduler etc.). In another example, at least one of the first terminal 4 and the second terminal 5 may execute any information processing in response to occurrence of the use relationship similarly to the termination request. The any information processing may trigger transmission of the request for the linkage setting using the simplified process from at least one of the first terminal 4 and the second terminal 5.

The process for terminating the correspondence set by the simplified process (process for terminating the simplified process) may basically be similar to the linkage termination process in the normal process (process for terminating the normal process). The process for terminating the simplified process need not be identical to the process for terminating the normal process. The correspondence set by the simplified process may be terminated as appropriate. In another example, when the transmission route of the request for the correspondence setting using the simplified process is different from the transmission route of the termination request for the normal process, the transmission route of the termination request for the simplified process may be identical to the transmission route of the request for the correspondence setting using the simplified process.

Situations of Use of Linkage Information

As described above, the linkage information D10 may be used in various situations. In one example, the linkage information D10 may be used to simply track the occurrence and disappearance of the relationship between the first target and the second target. In another example, the linkage information D10 may be used in order that at least part of the authority linked to one of the first target and the second target can be exercised by the other while the correspondence between the first target and the second target is set. In the example of FIG. 2, the linkage information D10 may be used in order that at least part of the authority linked to the user can be exercised by the mobile body while the correspondence between the user and the mobile body is set.

Figures 5, 6A:
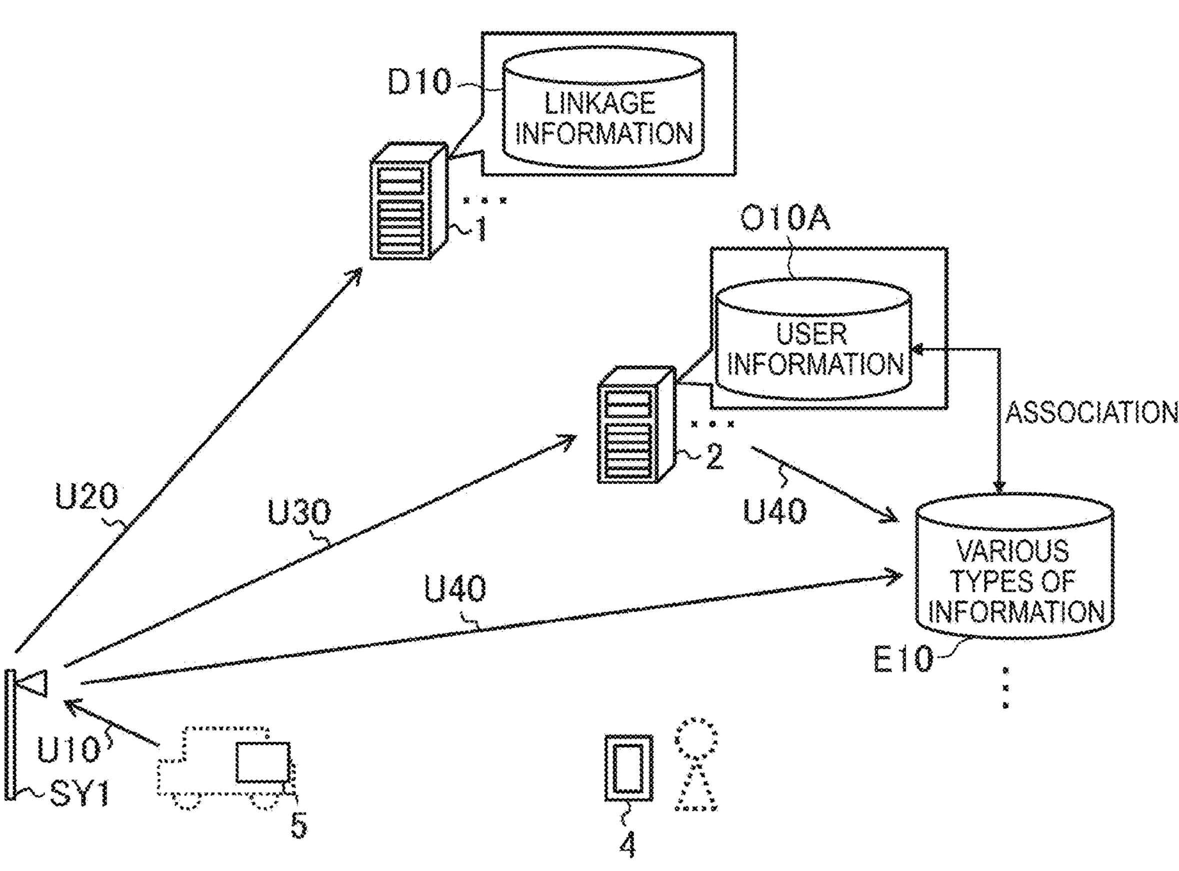
FIG. 5 schematically shows an example of a situation of use of the linkage information according to the embodiment.
FIG. 6A schematically shows an example of the hardware configuration of a management server according to the embodiment.

FIG. 5 schematically shows an example of the situation of use of the linkage information D10 according to the present embodiment. In FIG. 5, it is assumed that the authority linked to the user is exercised by the mobile body in the example of FIG. 2. An external system SY1 is installed at a location where various services are exercised (e.g., a parking lot), and executes information processing to provide a target service to a user who has target authority. The configuration and services of the external system SY1 are not particularly limited, and may be selected as appropriate depending on embodiments.

In step U10, the external system SY1 first acquires the second identifier I20 (mobile body identifier) from the target mobile body. The method for acquiring the second identifier I20 may be selected as appropriate depending on embodiments. In one example, the external system SY1 may acquire the second identifier I20 from the second terminal 5 by exchanging data with the second terminal 5. The data exchange method may be similar to that of the data exchange between the first terminal 4 and the second terminal 5. In another example, when the second identifier I20 is a vehicle registration number, the external system SY1 may acquire the second identifier I20 by capturing an image of a license plate with an image sensor and analyzing the obtained image.

In step U20, the external system SY1 uses the acquired second identifier I20 as a query to inquire of the management server 1 whether there is an effective correspondence on a target date and time for the target mobile body. The term "effective" means that the setting is maintained (not terminated) on the target date and time. The target date and time are basically "current (immediate)" but are not limited to this. For example, when executing a payment process for a date and time in the past, the target date and time may be the date and time in the past. When there is an effective correspondence, the first identifier I10 (user identifier) of the user linked to the target mobile body is extracted. When there is no effective correspondence and the user linked to the target mobile body is not extracted, this process may end.

In step U30, the external system SY1 uses the extracted first identifier I10 as a query to inquire of the first server 2 about exercisable authority for the user linked to the target mobile body. The first server 2 refers to the first target information O10 (user information O10A) and extracts exercisable authority associated with the target user. When no exercisable authority is extracted, this process may end. In the first target information O10 (user information O10A), whether to permit the exercise of the authority by the mobile body may be set for each authority. The exercisable authority may be extracted based on this setting. This process may end also when the target authority to be exercised by the external system SY1 is not included in the exercisable authority. The target authority to be exercised may be designated as appropriate at any timing. In one example, the target authority to be exercised may be designated by the external system SY1 in advance or by the user.

In step U40, when the target authority is included in the exercisable authority, the external system SY1 executes a process for exercising the target authority. Thus, the authority linked to the user is exercised by the mobile body, and the user can receive a service via the mobile body. For example, when the authority information includes information on public personal authentication and the target authority is related to the public personal authentication, the user can receive a public service via the mobile body. For example, when the authority information includes payment information and the target authority is related to payment, the user can receive a payment service via the mobile body. The payment service may be, for example, payment for use of a parking lot, an expressway, a drive-through order, a public transportation service, or a rental service. For example, when the authority information includes information on electronic prescription and the target authority is reception of medicines dispensed on the electronic prescription, the user can use the electronic prescription via the mobile body and receive the medicines.

The processing procedure for exercising the authority is merely an example, and each step may be changed to the extent possible. Regarding the processing procedure, any step can be omitted, replaced, or added as appropriate depending on embodiments. In the processing procedure, the user may be replaced with the first target and the mobile body may be replaced with the second target. In the processing procedure, the terms "first" and "second" may be interchanged.

Data Communication Between Devices

The data communication between the devices (management server 1, first server 2, second server 3, first terminal 4, and second terminal 5) is not particularly limited, and may be selected as appropriate depending on embodiments. The network between the devices may be selected as appropriate from among, for example, the Internet, a wireless communication network, a mobile communication network, a telephone network, a private network, and a local area network. The data communication between the devices may be encrypted by a method such as Secure Socket Layer (SSL) or Transport Layer Security (TLS). In one example, each terminal (4, 5) may include a subscriber identity module (SIM), and the data communication between the management server 1 and each terminal (4, 5) may be encrypted communication using the SIM.

2. Configuration Examples

Hardware Configuration Examples

Management Server

FIG. 6A schematically shows an example of the hardware configuration of the management server 1 according to the present embodiment. The management server 1 according to the present embodiment is a computer in which a control unit 11, a storage unit 12, a communication interface 13, an input device 14, an output device 15, and a drive 16 are electrically connected.

The control unit 11 includes a central processing unit (CPU) that is a hardware processor, a random access memory (RAM), a read only memory (ROM), etc., and executes any information processing based on programs and various types of data. The control unit 11 (CPU) is an example of a processor resource of the management server 1.

The storage unit 12 may include, for example, a hard disk drive, a solid state drive, or a semiconductor memory. The storage unit 12 (and the RAM and the ROM) is an example of the memory resource. In the present embodiment, the storage unit 12 stores various types of information such as a management program 81 and the linkage information D10. The management program 81 causes the management server 1 to execute information processing (FIGS. 8A and 8B etc. described later) related to the setting and termination of the correspondence between the first target and the second target. The management program 81 includes a series of instructions for the information processing.

The communication interface 13 performs wired or wireless communication via a network. The communication interface 13 may be, for example, a wired local area network (LAN) module or a wireless LAN module. The management server 1 may perform data communication with other computers (first server 2, second server 3, first terminal 4, second terminal 5) via the communication interface 13.

The input device 14 is a device for performing input, such as a mouse, a keyboard, and operation buttons. The output device 15 is a device for performing output, such as a display and a speaker. An operator can operate the management server 1 by using the input device 14 and the output device 15. The input device 14 and the output device 15 may be an integrated device such as a touch panel display. The input device 14 and the output device 15 may be connected via external interfaces. The external interface may be configured as appropriate to connect to an external device by wire or wirelessly, for example, using a universal serial bus (USB) port, a dedicated port, or a wireless communication port.

The drive 16 is a device for reading various types of information such as programs stored in a storage medium 91. At least one of the management program 81 and the linkage information D10 may be stored in the storage medium 91 instead of or together with the storage unit 12. The storage medium 91 accumulates various types of information (stored programs etc.) by electrical, magnetic, optical, mechanical, or chemical action so that a machine such as a computer can read the information. The management server 1 may acquire at least one of the management program 81 and the linkage information D10 from the storage medium 91. The storage medium 91 may be a disc storage medium such as a compact disc (CD) or a digital versatile disc (DVD), or may be a storage medium other than the disc storage medium, such as a semiconductor memory (e.g., a flash memory). The type of the drive 16 may be selected as appropriate depending on the type of the storage medium 91. The drive 16 may be connected via an external interface.

In the specific hardware configuration of the management server 1, any component may be omitted, replaced, or added as appropriate depending on embodiments. For example, the control unit 11 may include a plurality of hardware processors. The hardware processor may be a microprocessor, a field-programmable gate array (FPGA), a digital signal processor (DSP), a graphics processing unit (GPU), an application specific integrated circuit (ASIC), etc. At least one of the input device 14, the output device 15, and the drive 16 may be omitted. The linkage information D10 may be stored not in the storage unit 12 but in an external computer (e.g., a network attached storage (NAS)) accessible to the management server 1. The management server 1 may include a plurality of computers. In this case, the hardware configurations of the computers may or may not agree with each other. The management server 1 may be an information processing device designed exclusively for a service to be provided, a general-purpose server device, a general-purpose computer, etc.

First Server

Figure 6B:
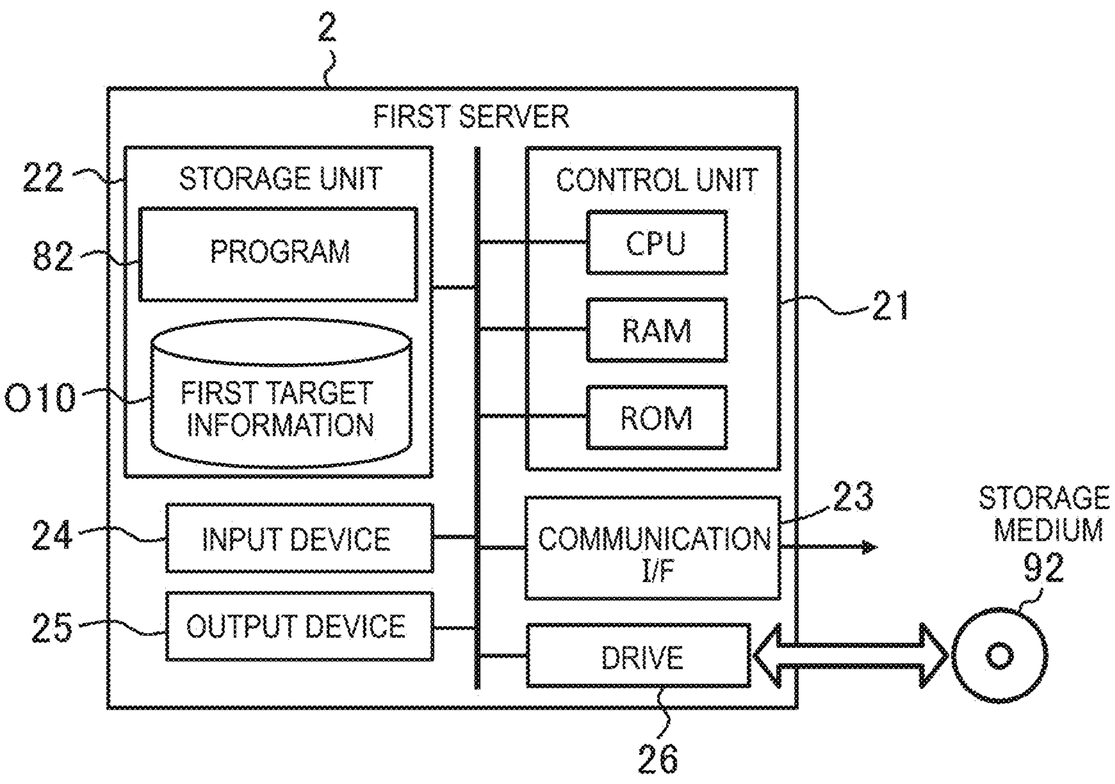
FIG. 6B schematically shows an example of the hardware configuration of a first server according to the embodiment.

FIG. 6B schematically shows an example of the hardware configuration of the first server 2 according to the present embodiment. The first server 2 according to the present embodiment is a computer in which a control unit 21, a storage unit 22, a communication interface 23, an input device 24, an output device 25, and a drive 26 are electrically connected. The control unit 21 to the drive 26 and a storage medium 92 of the first server 2 may be similar to the control unit 11 to the drive 16 and the storage medium 91 of the management server 1, respectively.

The control unit 21 (CPU) is an example of a processor resource of the first server 2, and the storage unit 22 (and the RAM and the ROM) is an example of the memory resource of the first server 2. In the present embodiment, the storage unit 22 stores various types of information such as a program 82 and the first target information O10. The program 82 causes the first server 2 to execute information processing (FIG. 8A etc. described later) related to authentication of the first target. The program 82 includes a series of instructions for the information processing. At least one of the program 82 and the first target information O10 may be stored in the storage medium 92 instead of or together with the storage unit 22. The first server 2 may acquire at least one of the program 82 and the first target information O10 from the storage medium 92. The first server 2 may perform data communication with other computers (management server 1, etc.) via the communication interface 23. The first server 2 may be operated via the input device 24 and the output device 25.

In the specific hardware configuration of the first server 2, any component may be omitted, replaced, or added as appropriate depending on embodiments. For example, the control unit 21 may include a plurality of hardware processors. The hardware processor may be a microprocessor, an FPGA, a DSP, a GPU, an ASIC, etc. At least one of the input device 24, the output device 25, and the drive 26 may be omitted. The first target information O10 may be stored not in the storage unit 22 but in an external computer (e.g., a NAS) accessible to the first server 2. The first server 2 may include a plurality of computers. In this case, the hardware configurations of the computers may or may not agree with each other. The first server 2 may be an information processing device designed exclusively for a service to be provided, a general-purpose server device, a general-purpose computer, etc.

Second Server

Figure 6C:
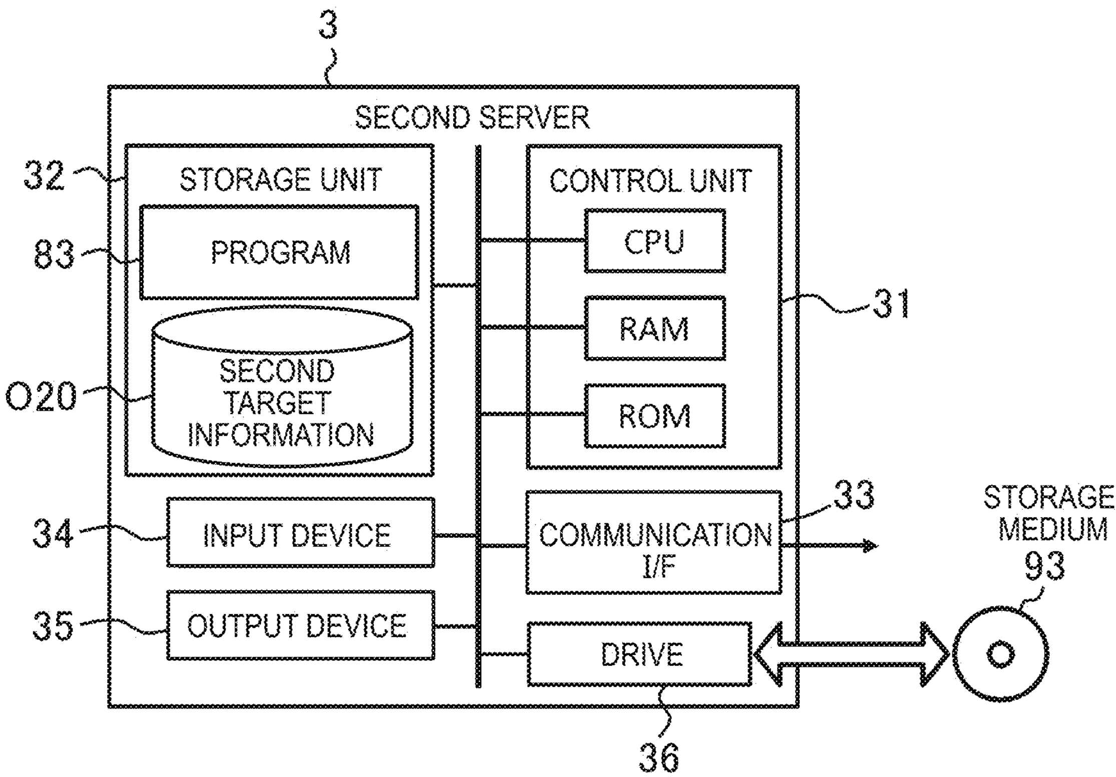
FIG. 6C schematically shows an example of the hardware configuration of a second server according to the embodiment.

FIG. 6C schematically shows an example of the hardware configuration of the second server 3 according to the present embodiment. The second server 3 according to the present embodiment is a computer in which a control unit 31, a storage unit 32, a communication interface 33, an input device 34, an output device 35, and a drive 36 are electrically connected. The control unit 31 to the drive 36 and a storage medium 93 of the second server 3 may be similar to the control unit 11 to the drive 16 and the storage medium 91 of the management server 1, respectively.

The control unit 31 (CPU) is an example of a processor resource of the second server 3, and the storage unit 32 (and the RAM and the ROM) is an example of the memory resource of the second server 3. In the present embodiment, the storage unit 32 stores various types of information such as a program 83 and the second target information O20. The program 83 causes the second server 3 to execute information processing (FIG. 8A etc. described later) related to authentication of the second target. The program 83 includes a series of instructions for the information processing. At least one of the program 83 and the second target information O20 may be stored in the storage medium 93 instead of or together with the storage unit 32. The second server 3 may acquire at least one of the program 83 and the second target information O20 from the storage medium 93. The second server 3 may perform data communication with other computers (management server 1, etc.) via the communication interface 33. The second server 3 may be operated via the input device 34 and the output device 35.

In the specific hardware configuration of the second server 3, any component may be omitted, replaced, or added as appropriate depending on embodiments. For example, the control unit 31 may include a plurality of hardware processors. The hardware processor may be a microprocessor, an FPGA, a DSP, a GPU, an ASIC, etc. At least one of the input device 34, the output device 35, and the drive 36 may be omitted. The second target information O20 may be stored not in the storage unit 32 but in an external computer (e.g., a NAS) accessible to the second server 3. The second server 3 may include a plurality of computers. In this case, the hardware configurations of the computers may or may not agree with each other. The second server 3 may be an information processing device designed exclusively for a service to be provided, a general-purpose server device, a general-purpose computer, etc.

First Terminal

Figure 6D:
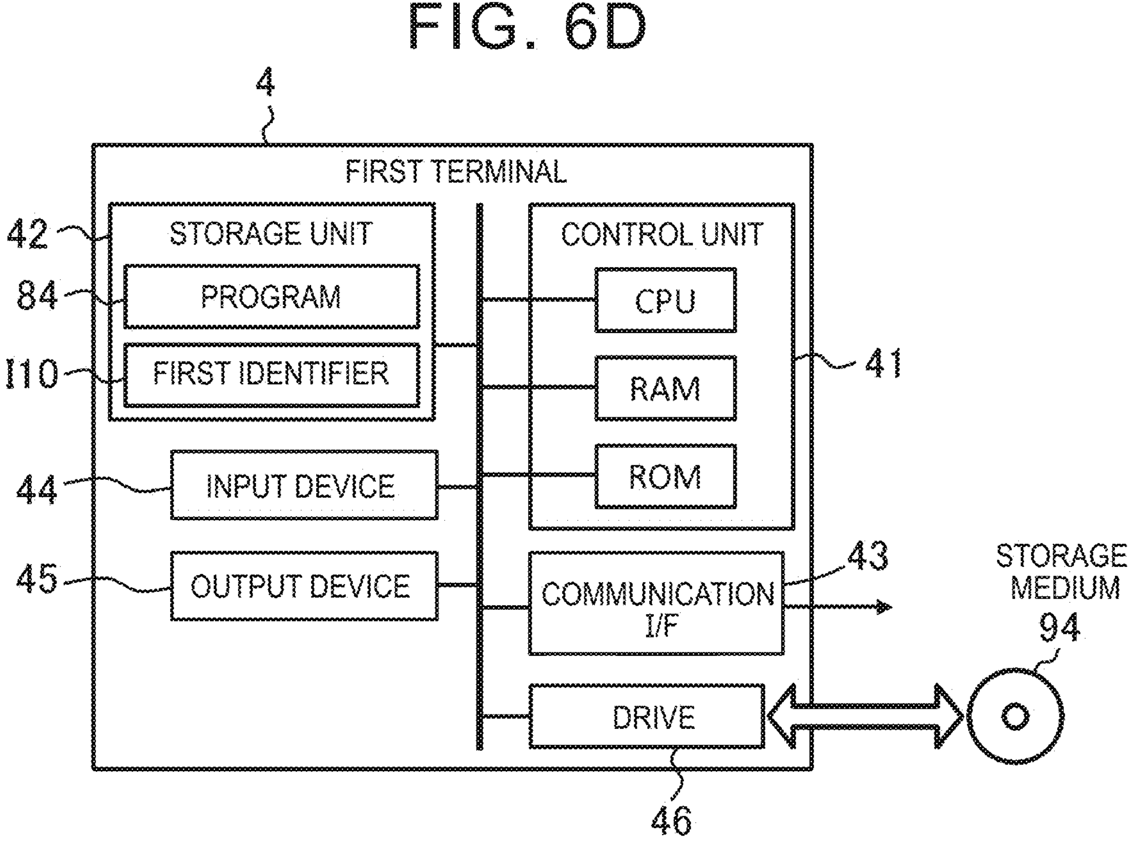
FIG. 6D schematically shows an example of the hardware configuration of a first terminal according to the embodiment.

FIG. 6D schematically shows an example of the hardware configuration of the first terminal 4 according to the present embodiment. The first terminal 4 according to the present embodiment is a computer in which a control unit 41, a storage unit 42, a communication interface 43, an input device 44, an output device 45, and a drive 46 are electrically connected. The control unit 41 to the drive 46 and a storage medium 94 of the first terminal 4 may be similar to the control unit 11 to the drive 16 and the storage medium 91 of the management server 1, respectively.

The control unit 41 (CPU) is an example of a processor resource of the first terminal 4, and the storage unit 42 (and the RAM and the ROM) is an example of the memory resource of the first terminal 4. In the present embodiment, the storage unit 42 stores various types of information such as a program 84 and the first identifier I10. The program 84 causes the first terminal 4 to execute information processing (FIGS. 8A and 8B etc. described later) related to linking. The program 84 includes a series of instructions for the information processing. At least one of the program 84 and the first identifier I10 may be stored in the storage medium 94 instead of or together with the storage unit 42. The first terminal 4 may acquire at least one of the program 84 and the first identifier I10 from the storage medium 94. The first terminal 4 may perform data communication with other computers (management server 1, second terminal 5, etc.) via the communication interface 43. The first terminal 4 may be operated via the input device 44 and the output device 45.

In the specific hardware configuration of the first terminal 4, any component may be omitted, replaced, or added as appropriate depending on embodiments. For example, the control unit 41 may include a plurality of hardware processors. The hardware processor may be a microprocessor, an FPGA, a DSP, a GPU, an ASIC, an electronic control unit (ECU), etc. At least one of the input device 44, the output device 45, and the drive 46 may be omitted. The first identifier I10 need not be stored in the storage unit 42. The first identifier I10 may be acquired each time. To acquire data such as an identifier and unique information, the first terminal 4 may further include a data acquisition device such as a sensor or a reader. The communication interface 43 may include a plurality of types of module. For example, the communication interface 43 may include a short-range wireless communication module and a wireless communication module, and the first terminal 4 may perform data communication with the second terminal 5 via the short-range wireless communication module and with the management server 1 via the wireless communication module. The first terminal 4 may include a plurality of computers. In this case, the hardware configurations of the computers may or may not agree with each other. The first terminal 4 may be an information processing device designed exclusively for a service to be provided, a general-purpose computer, a terminal device (e.g., a smartphone or a tablet personal computer (PC)), etc.

Second Terminal

Figure 6E:
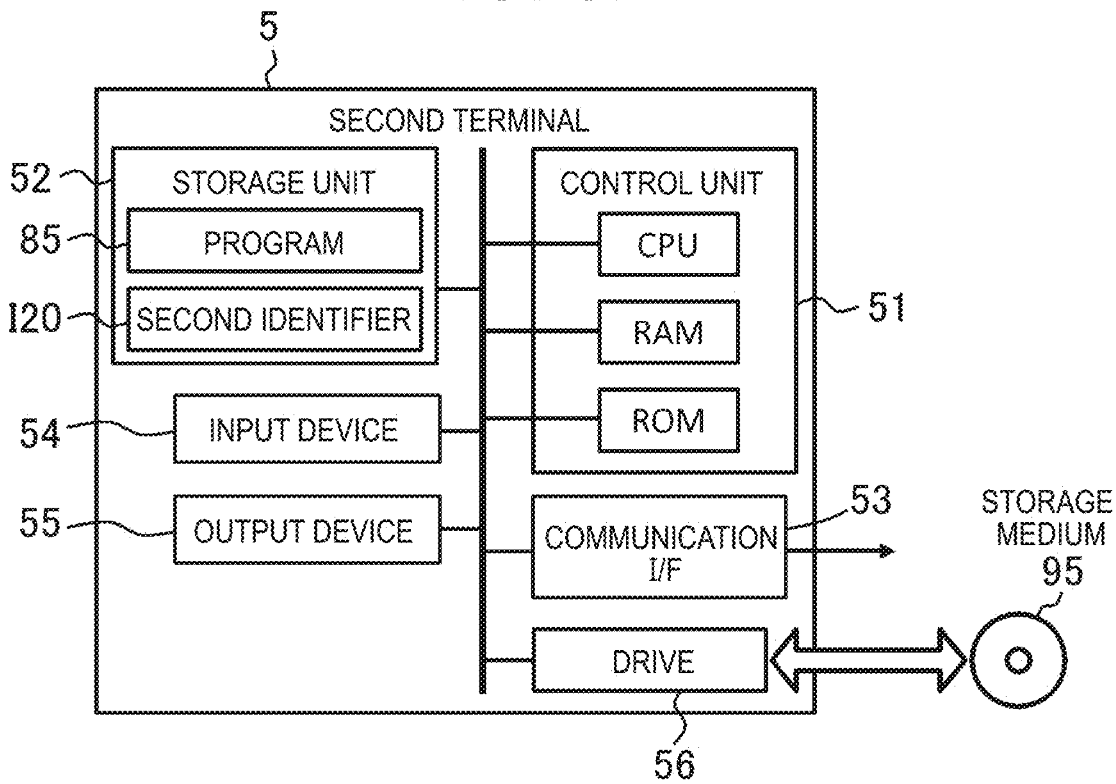
FIG. 6E schematically shows an example of the hardware configuration of a second terminal according to the embodiment.

FIG. 6E schematically shows an example of the hardware configuration of the second terminal 5 according to the present embodiment. The second terminal 5 according to the present embodiment is a computer in which a control unit 51, a storage unit 52, a communication interface 53, an input device 54, an output device 55, and a drive 56 are electrically connected. The control unit 51 to the drive 56 and a storage medium 95 of the second terminal 5 may be similar to the control unit 11 to the drive 16 and the storage medium 91 of the management server 1, respectively.

The control unit 51 (CPU) is an example of a processor resource of the second terminal 5, and the storage unit 52 (and the RAM and the ROM) is an example of the memory resource of the second terminal 5. In the present embodiment, the storage unit 52 stores various types of information such as a program 85 and the second identifier I20. The program 85 causes the second terminal 5 to execute information processing (FIGS. 8A and 8B etc. described later) related to linking. The program 85 includes a series of instructions for the information processing. At least one of the program 85 and the second identifier I20 may be stored in the storage medium 95 instead of or together with the storage unit 52. The second terminal 5 may acquire at least one of the program 85 and the second identifier I20 from the storage medium 95. The second terminal 5 may perform data communication with other computers (management server 1, first terminal 4, etc.) via the communication interface 53. The second terminal 5 may be operated via the input device 54 and the output device 55.

In the specific hardware configuration of the second terminal 5, any component may be omitted, replaced, or added as appropriate depending on embodiments. For example, the control unit 51 may include a plurality of hardware processors. The hardware processor may be a microprocessor, an FPGA, a DSP, a GPU, an ASIC, an ECU, etc. At least one of the input device 54, the output device 55, and the drive 56 may be omitted. The second identifier I20 need not be stored in the storage unit 52. The second identifier I20 may be acquired each time. To acquire data such as an identifier and unique information, the second terminal 5 may further include a data acquisition device such as a sensor or a reader. The communication interface 53 may include a plurality of types of module similarly to the first terminal 4. The second terminal 5 may include a plurality of computers. In this case, the hardware configurations of the computers may or may not agree with each other. The second terminal 5 may be an information processing device designed exclusively for a service to be provided, a general-purpose computer, a terminal device, etc.

Software Configuration Examples

Figure 7:
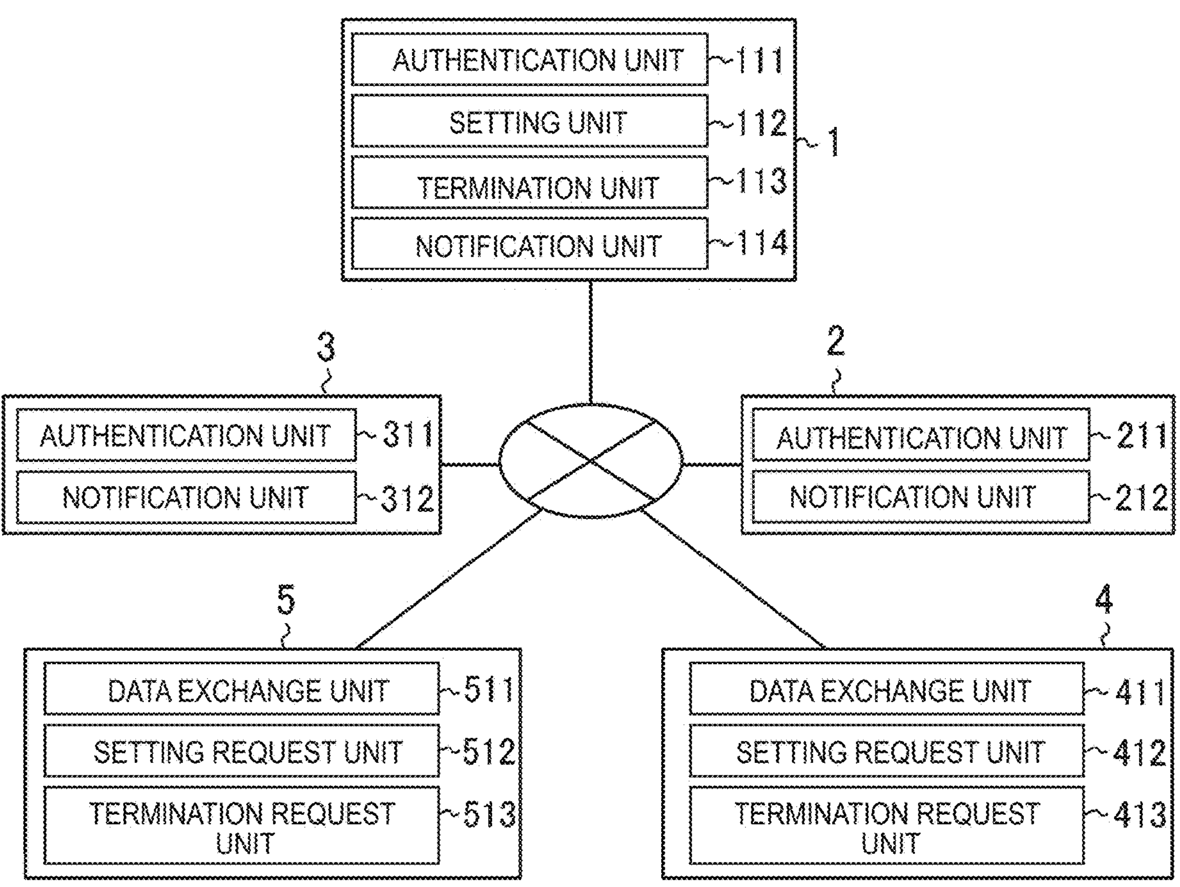
FIG. 7 schematically shows an example of the software configurations of the devices according to the embodiment.

FIG. 7 schematically shows an example of the software configurations of the devices (management server 1, first server 2, second server 3, first terminal 4, and second terminal 5) according to the present embodiment.

Management Server

The control unit 11 of the management server 1 loads the management program 81 stored in the storage unit 12 into the RAM, and executes the instructions in the management program 81 by the CPU. Thus, the management server 1 operates as a computer including an authentication unit 111, a setting unit 112, a termination unit 113, and a notification unit 114 as software modules.

The authentication unit 111 receives the first identifier I10, the first unique information C1, the second identifier I20, and the second unique information C2 from at least one of the first terminal 4 and the second terminal 5 in response to the occurrence of the use relationship between the first target and the second target. The authentication unit 111 requests the first server 2 to authenticate the first target by transmitting the received first identifier I10 and the received first unique information C1 to the first server 2. The authentication unit 111 requests the second server 3 to authenticate the second target in real time by transmitting the received second identifier I20 and the received second unique information C2 to the second server 3. The authentication unit 111 may be referred to as "authentication request unit".

When both the first target and the second target have successfully been authenticated, the setting unit 112 sets a correspondence between the first identifier I10 and the second identifier I20. The termination unit 113 terminates the correspondence in response to reception of a termination request from at least one of the first terminal 4 and the second terminal 5 or satisfaction of the predetermined termination condition. The notification unit 114 transmits a notification indicating a result of the correspondence setting process to at least one of the first terminal 4 and the second terminal 5. The notification unit 114 transmits a notification indicating a result of the correspondence termination process to at least one of the first terminal 4 and the second terminal 5.

First Server

The control unit 21 of the first server 2 executes the instructions in the program 82 by the CPU. Thus, the first server 2 operates as a computer including an authentication unit 211 and a notification unit 212 as software modules. The authentication unit 211 executes the authentication process for the first target in response to a request for authentication of the first target. The notification unit 212 transmits a notification indicating a result of the authentication process.

Second Server

The control unit 31 of the second server 3 executes the instructions in the program 83 by the CPU. Thus, the second server 3 operates as a computer including an authentication unit 311 and a notification unit 312 as software modules. The authentication unit 311 executes the authentication process for the second target in response to a request for authentication of the second target. The notification unit 312 transmits a notification indicating a result of the authentication process.

First Terminal

The control unit 41 of the first terminal 4 executes the instructions in the program 84 by the CPU. Thus, the first terminal 4 operates as a computer including a data exchange unit 411, a setting request unit 412, and a termination request unit 413 as software modules. The data exchange unit 411 exchanges data with the second terminal 5. The setting request unit 412 requests the management server 1 to set a correspondence between the first target and the second target by transmitting data to be used for authentication. The termination request unit 413 requests the management server 1 to terminate the correspondence.

Second Terminal

The control unit 51 of the second terminal 5 executes the instructions in the program 85 by the CPU. Thus, the second terminal 5 operates as a computer including a data exchange unit 511, a setting request unit 512, and a termination request unit 513 as software modules. The data exchange unit 511 exchanges data with the first terminal 4. The setting request unit 512 requests the management server 1 to set a correspondence between the first target and the second target by transmitting data to be used for authentication. The termination request unit 513 requests the management server 1 to terminate the correspondence.

Others

The present embodiment illustrates an example in which each software module of each device is implemented by a general-purpose CPU. Part or all of the software modules may be implemented by one or more dedicated processors. Each of the modules may be implemented as a hardware module. In the software configuration of each device, any module may be omitted, replaced, or added as appropriate depending on embodiments. For example, when the collective transmission is adopted as the transmission pattern of data to be used for authentication, the setting request unit (412, 512) may be omitted from one of the first terminal 4 and the second terminal 5 (terminal that does not transmit data). For example, when the termination request is transmitted from only one of the first terminal 4 and the second terminal 5, the termination request unit (413, 513) may be omitted from the other terminal.

3. Operation Examples

Linkage Setting

Figure 8A:
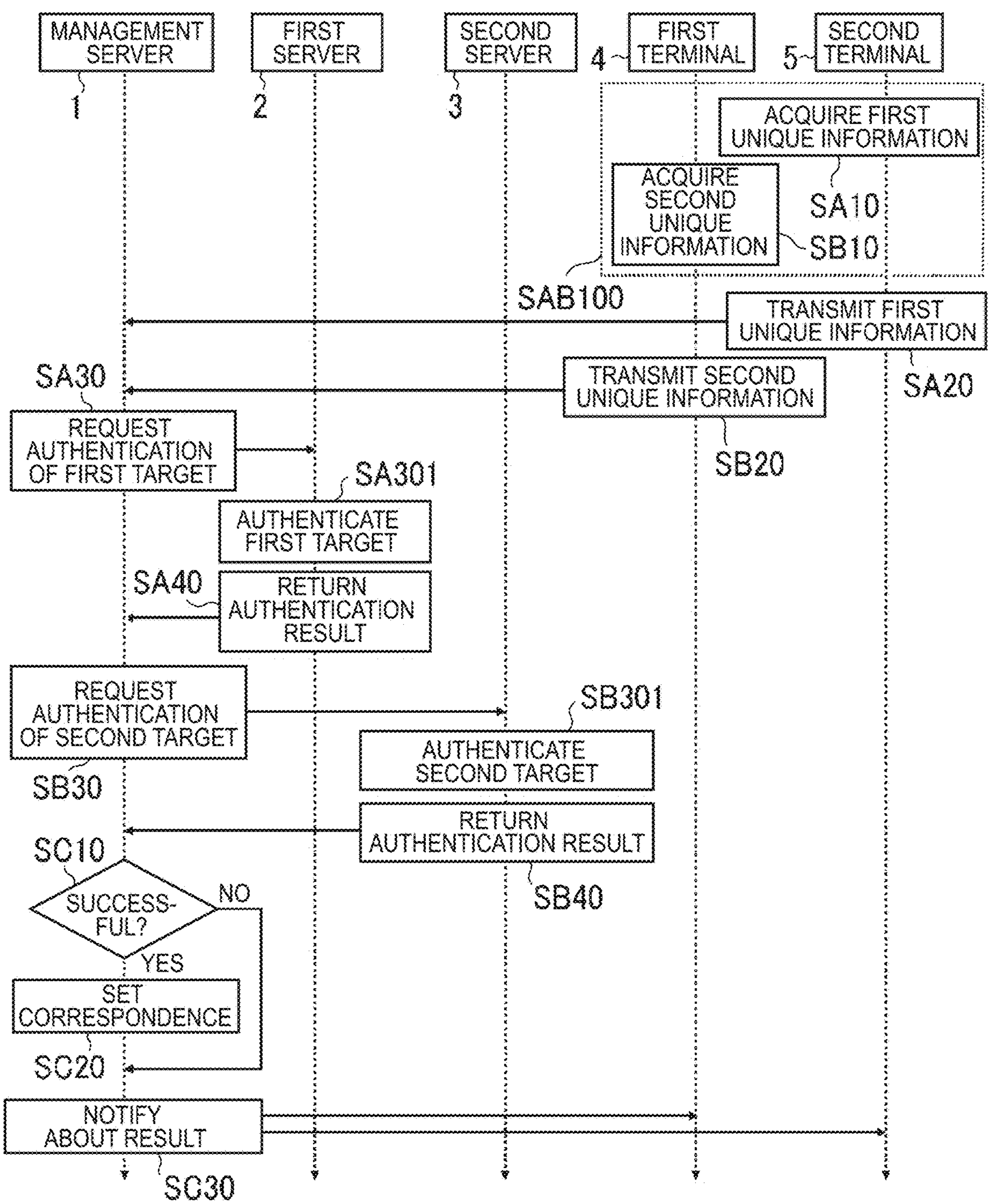
FIG. 8A shows an example of a processing procedure of the linkage setting according to the embodiment.

FIG. 8A shows an example of a processing procedure of the linkage setting by the management system 100 according to the present embodiment. The following processing procedure is an example of a management method to be executed by a computer. In the example of FIG. 8A, it is assumed that pattern 1 of split transmission is adopted as the transmission pattern of data to be used for authentication and each terminal (4, 5) acquires data to be used for authentication in the data exchange.

In step SAB100, the control unit 41 of the first terminal 4 operates as the data exchange unit 411 to exchange data with the second terminal 5. The control unit 51 of the second terminal 5 operates as the data exchange unit 511 to exchange data with the first terminal 4. The data exchange may be executed as appropriate in response to the occurrence of the use relationship between the first target and the second target. In step SA10, the control unit 51 of the second terminal 5 acquires the first identifier I10 and the first unique information C1 from the first target. In step SB10, the control unit 41 of the first terminal 4 acquires the second identifier I20 and the second unique information C2 from the second target. The processes of steps SA10 and SB10 may be executed within the data exchange process.

In step SA20, the control unit 51 of the second terminal 5 operates as the setting request unit 512 to transmit a linkage setting request including the first identifier I10 and the first unique information C1 to the management server 1. The control unit 11 of the management server 1 operates as the authentication unit 111 to receive the first identifier I10 and the first unique information C1. In step SB20, the control unit 41 of the first terminal 4 similarly operates as the setting request unit 412 to transmit a linkage setting request including the second identifier I20 and the second unique information C2 to the management server 1. The control unit 11 of the management server 1 operates as the authentication unit 111 to receive the second identifier I20 and the second unique information C2. The control unit 11 associates the pieces of data received from the first terminal 4 and the second terminal 5 as appropriate, and identifies a combination of the first target and the second target for which the correspondence setting is requested.

In step SA30, the control unit 11 of the management server 1 operates as the authentication unit 111 to transmit, to the first server 2, an authentication request for the first target including the received first identifier I10 and the received first unique information C1. The control unit 21 of the first server 2 receives the first identifier I10 and the first unique information C1 from the management server 1. In step SA301, the control unit 21 of the first server 2 operates as the authentication unit 211 to execute an authentication process for the first target using the received first identifier I10 and the received first unique information C1. In one example, the control unit 21 extracts the first registered unique information C10 of the first target that is the request source by searching the first target information O10 using the received first identifier I10 as a query. The control unit 21 checks the extracted first registered unique information C10 against the received first unique information C1. Based on a checking result, the control unit 21 determines whether the first target is successfully authenticated. In step SA40, the control unit 21 operates as the notification unit 212 to return a result of the authentication of the first target to the management server 1. The control unit 11 of the management server 1 receives the result of the authentication of the first target from the first server 2.

In step SB30, the control unit 11 of the management server 1 operates as the authentication unit 111 to transmit, to the second server 3, an authentication request for the second target including the received second identifier I20 and the received second unique information C2. The control unit 31 of the second server 3 receives the second identifier I20 and the second unique information C2 from the management server 1. In step SB301, the control unit 31 of the second server 3 operates as the authentication unit 311 to execute an authentication process for the second target using the received second identifier I20 and the received second unique information C2. In one example, the control unit 31 extracts the second registered unique information C20 of the second target that is the request source by searching the second target information O20 using the received second identifier I20 as a query. The control unit 31 checks the extracted second registered unique information C20 against the received second unique information C2. Based on a checking result, the control unit 31 determines whether the second target is successfully authenticated. In step SB40, the control unit 31 operates as the notification unit 312 to return a result of the authentication of the second target to the management server 1. The control unit 11 of the management server 1 receives the result of the authentication of the second target from the second server 3.

In step SC10, the control unit 11 of the management server 1 operates as the authentication unit 111 to determine whether both the first target and the second target have successfully been authenticated based on details of replies from the servers (2, 3). When both the first target and the second target have successfully been authenticated, the control unit 11 advances the process to step SC20. When at least one of the first target and the second target has not successfully been authenticated, the control unit 11 skips the process of step SC20 and advances the process to step SC30.

In step SC20, the control unit 11 operates as the setting unit 112 to set a correspondence between the first identifier I10 and the second identifier I20. In one example, the control unit 11 generates the linkage information D10 indicating the correspondence between the first identifier I10 and the second identifier I20, and stores the generated linkage information D10. In step SC30, the control unit 11 operates as the notification unit 114 to transmit a notification indicating a result of the correspondence setting process to at least one of the first terminal 4 and the second terminal 5. When the result notification is completed, the processing procedure related to the linkage setting according to this operation example ends.

The above processing procedure is merely an example, and each step may be changed to the extent possible. Regarding the above processing procedure, any step can be omitted, replaced, or added as appropriate depending on embodiments.

For example, the order of acquisition of the first unique information C1 and the second unique information C2 is not limited to the example of FIG. 8A. The process of step SA10 may be executed after step SB10. The process of step SA10 may be executed at least partially in parallel with the process of step SB10. The process of step SA20 may be executed at any timing after step SA10. The process of step SA20 may be executed before step SB10. The process of step SB20 may be executed at any timing after step SB10. The process of step SB20 may be executed before step SA10.

The transmission pattern of data to be used for authentication is not limited to pattern 1 of split transmission, and may be selected as appropriate depending on embodiments. In another example, the transmission pattern of data to be used for authentication may be a pattern other than pattern 1 of split transmission among the above transmission patterns (pattern 2 to pattern 4 of split transmission, other split transmission, collective transmission). Accordingly, the processes of steps SA10, SA20, SB10, and SB20 may be changed as appropriate.

The order of the authentication processes for the first target and the second target is not limited to the example of FIG. 8A. The processes of steps SA30 to SA40 may be executed at any timing after step SA20. The processes of steps SA30 to SA40 may be executed before step SB10. When the first identifier I10 is transmitted from the first terminal 4 in step SB20, the processes of steps SA30 to SA40 may be executed at any timing after step SB20. The processes of steps SB30 to SB40 may be executed at any timing after step SB20. The processes of steps SB30 to SB40 may be executed before step SA10. When the second identifier I20 is transmitted from the second terminal 5 in step SA20, the processes of steps SB30 to SB40 may be executed at any timing after step SA20. The processes of steps SB30 to SB40 may be executed at least partially in parallel with the processes of steps SA30 to SA40. The processes of steps SB30 to SB40 may be executed before the processes of steps SA30 to SA40.

Linkage Termination

FIG. 8B shows an example of a processing procedure of the linkage termination by the management system 100 according to the present embodiment. The following processing procedure is an example of the management method to be executed by the computer. In the example of FIG. 8B, it is assumed that the authentication process is omitted and the termination request is transmitted directly from the first terminal 4 to the management server 1.

In step SZ10, the control unit 41 of the first terminal 4 operates as the termination request unit 413 to transmit a request for terminating the correspondence to the management server 1. The control unit 11 of the management server 1 receives the termination request. The correspondence to be terminated by request may be designated as appropriate. The trigger for the termination request may be selected as appropriate depending on embodiments.

In step SZ20, the control unit 11 operates as the termination unit 113 to terminate the correspondence designated by the received termination request. The termination may include generating information indicating the termination and recording the generated information. In one example, when the linkage information D10 has the structure of FIG. 3A, the control unit 11 may terminate the correspondence between the targets by adding a termination time to the corresponding linkage information D10 or setting a termination flag. When the linkage information D10 is structured by blockchain infrastructure, the control unit 11 may terminate the correspondence between the targets by generating a transaction indicating the linkage termination and adding the generated transaction to the blockchain.

In step SZ30, the control unit 11 operates as the notification unit 114 to transmit a result of the linkage termination process to the first terminal 4. When the result notification is completed, the processing procedure related to the linkage termination according to this operation example ends.

The above processing procedure is merely an example, and each step may be changed to the extent possible. Regarding the above processing procedure, any step can be omitted, replaced, or added as appropriate depending on embodiments.

For example, as described above, the transmission route of the termination request is not limited to the example of FIG. 8B, and may be selected as appropriate depending on embodiments. The termination request may be transmitted from the second terminal 5 (termination request unit 513). The termination request process may include the authentication process for at least one of the first target and the second target. Instead of step SZ20, the control unit 11 of the management server 1 may operate as the termination unit 113 to terminate the correspondence in response to satisfaction of the predetermined termination condition.

Features

In the present embodiment, the first target and the second target are authenticated in steps SA30 to SA40 and SB30 to SB40 in response to the occurrence of the use relationship between the first target and the second target. This double authentication can be expected to ensure security. When both the first target and the second target have successfully been authenticated, the correspondence between the first identifier I10 and the second identifier I20 is set by the processes of steps SC10 and SC20. The use relationship between the first target and the second target can be tracked by recording the linkage setting (linkage information D10). According to the present embodiment, it is possible to track the use relationship between the first target and the second target while ensuring security.

4. Modifications

Although the embodiment of the present disclosure has been described in detail above, the above description is only illustrative of the present disclosure in all respects. Various revisions or modifications may be made without departing from the scope of the present disclosure. For example, the following changes are possible. The same reference symbols are used below for the same components as those in the above embodiment, and description is omitted as appropriate for the same points as those in the above embodiment. The following modifications may be combined as appropriate.

4.1

In the above embodiment, the linkage information D10 may be utilized, as one utilization example, to exercise the authority associated with one of the first target and the second target by the other. In the examples of FIGS. 2 and 5, it is assumed, as one utilization example, that one target (user) exercises his or her authority via the other target (use item/mobile body). The exercise of the authority is not limited to such an example. In another example, the management system 100 may be configured such that the first target can act as proxy to exercise the authority of another first target via the second target. In addition or alternatively, the management system 100 may be configured such that the second target can act as proxy to exercise the authority of another second target via the first target. That is, a proxy individual as one of the first target and the second target may act as proxy to exercise the authority of a proxy requesting individual (target individual) as the one target via (any individual as) the other target. In the examples of FIGS. 2 and 5, the management system 100 may be configured such that a proxy user can exercise the authority of a target user (proxy requester) via the use item (mobile body).

The authority proxy method may be determined as appropriate. In one example, any of the following three methods may be adopted as the authority proxy method. For convenience of the following description, it is assumed that the first target and the second target are a user and a use item (mobile body), respectively. That is, proxy patterns in the examples of FIGS. 2 and 5 will be described. The range of application of each proxy pattern is not limited to the case where the first target and the second target are the user and the use item, respectively. In each of the following proxy patterns, the user (first target) may be interpreted as "one of the first target and the second target" and the use item (second target) may be interpreted as "the other of the first target and the second target". The use item may typically be the mobile body.

(1) Proxy Pattern 1 (Proxy Authentication/Proxy Linking)

As proxy pattern 1, the management system 100 may be configured to set the correspondence between the target user (proxy requester) and the use item when the target user (first target) and the use item (second target) are successfully authenticated through a proxy authentication process by the proxy user. The management system 100 may be configured to permit the proxy user to act as proxy to exercise the authority associated with the target user via the use item while this correspondence is set. The proxy user is an example of the proxy individual, and the target user (proxy requester) is an example of the proxy requesting individual (target individual).

That is, a user terminal associated with the user (in the example of FIG. 2, the first terminal 4) may be a proxy user terminal possessed by the proxy user who acts as proxy for the user. When the use relationship occurs between the first target and the second target, data exchange may be executed as appropriate between the target user terminal, the proxy user terminal, and the load terminal. In one example, the use relationship between the first target and the second target may occur at least through data communication between the target user terminal possessed by the user and the proxy user terminal and data communication between the proxy user terminal and the load terminal.

The proxy authentication method is not particularly limited, and may be set as appropriate depending on embodiments. The proxy authentication method may be configured such that the proxy user terminal acts as proxy for the target user terminal to execute at least part of the authentication processes for the target user (first target) and the use item (second target) in the above embodiment. In one example, either of the following two methods may be adopted as the proxy authentication method.

(1-1) Proxy Pattern 1-1

Figure 10:
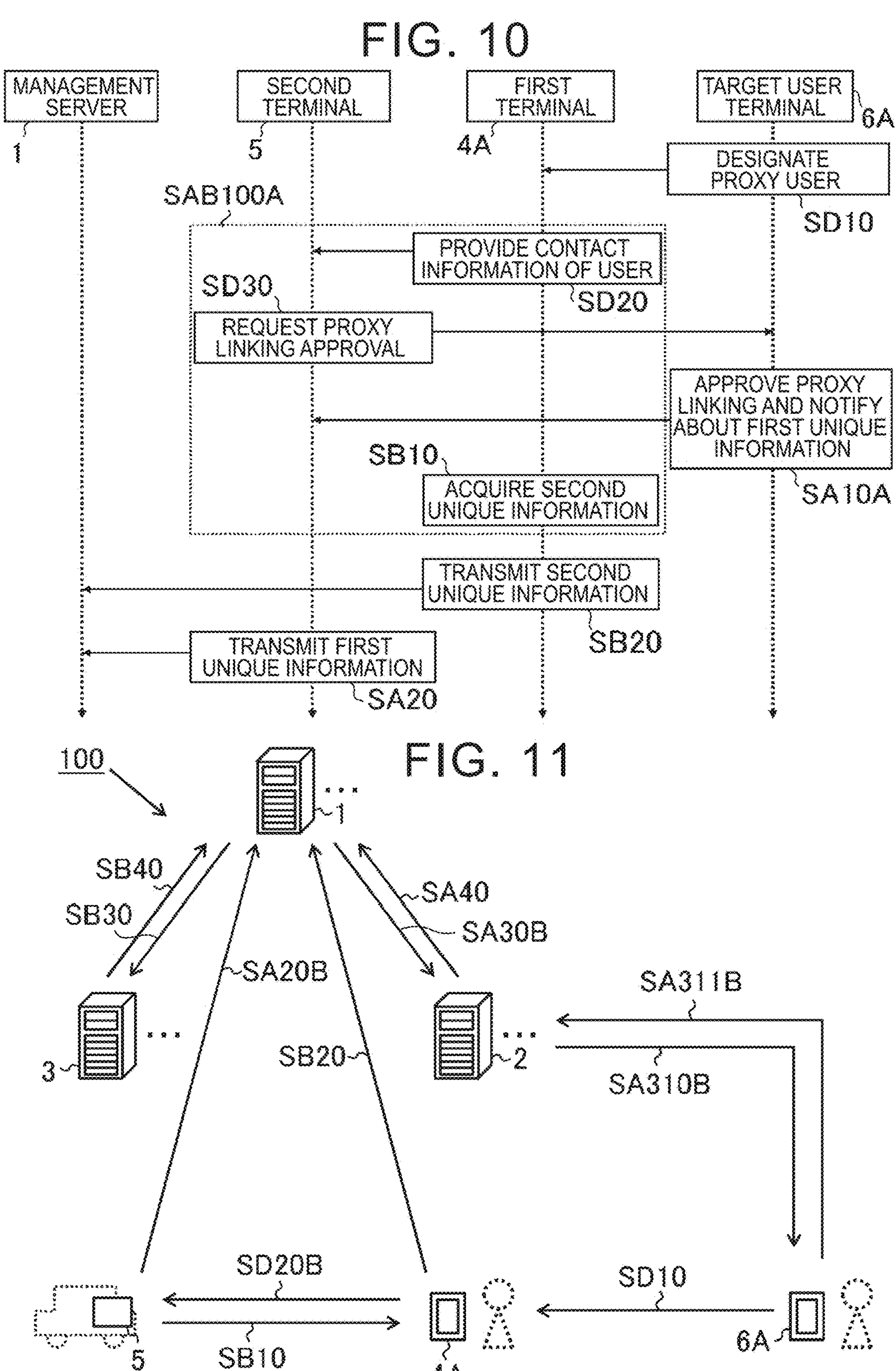
FIG. 10 shows an example of a processing procedure of the linkage setting in proxy pattern 1-1 according to the embodiment.

FIG. 9 schematically shows an example of the course of linkage setting in proxy pattern 1-1 according to the present embodiment. FIG. 10 shows an example of a processing procedure of the linkage setting in proxy pattern 1-1 according to the present embodiment. In the example of FIGS. 9 and 10, a first terminal 4A is a proxy user terminal and corresponds to the first terminal 4 in the examples of FIGS. 2 and 5 of the above embodiment. The first target is a target user (proxy requester) who requests proxy. A target user terminal 6A is a terminal possessed by the target user. The hardware configurations of the first terminal 4A and the target user terminal 6A may be similar to that of the first terminal 4 etc. in the above embodiment. In the example of FIGS. 9 and 10, it is assumed that pattern 1 of split transmission is adopted as the transmission pattern of data to be used for authentication, the first identifier I10 passes through the first terminal 4A, and the first unique information C1 does not pass through the first terminal 4A.

In step SD10, a control unit of the target user terminal 6A first operates as a proxy designation unit to receive designation of a proxy user for the target user. The proxy user may be designated as appropriate. In a typical example, the target user terminal 6A may store an address book and the proxy user may be selected from among users registered in the address book. In another example, the target user terminal 6A may access a list of users via an external computer such as the first server 2 and receive selection of the proxy user from among the users registered in the list. When the proxy user is designated, the control unit of the target user terminal 6A operates as a notification unit to exchange data with the first terminal 4A of the proxy user designated by the target user and notify it that proxy authority has been invested. A control unit of the first terminal 4A of the proxy user receives the notification about the proxy authority investment from the target user terminal 6A. In one example, this notification may include the first identifier I10 (user identifier) and contact information of the target user. The contact information may be a telephone number, an e-mail address, account information of a contact application (e.g., a social networking service application), an identification number, etc. Similarly to the data exchange between the first terminal 4 and the second terminal 5, the data exchange between the target user terminal 6A and the first terminal 4A may be performed by wireless or wired data communication or by a method other than the data communication, such as reading a two-dimensional code. The target user terminal 6A may give the notification about the proxy authority investment directly to the first terminal 4A, or may transmit it indirectly via an external computer such as the first server 2. When data communication is adopted as the data exchange method, the notification about the proxy authority investment is an example of data communication between the target user terminal possessed by the user and the proxy user terminal. Thus, the target user terminal 6A invests the first terminal 4A with proxy authentication authority and causes the first terminal 4A to execute a process for setting a correspondence with the use item.

In step SAB100A, the control unit of the first terminal 4A of the proxy user invested with the proxy authority operates as a data exchange unit to exchange data with the second terminal 5. The control unit 51 of the second terminal 5 operates as the data exchange unit 511 to exchange data with the first terminal 4A. Similarly to the data exchange between the first terminal 4 and the second terminal 5, the data exchange between the first terminal 4A and the second terminal 5 may be performed by wireless or wired data communication or by a method other than the data communication, such as reading a two-dimensional code. When data communication is adopted as the data exchange method, the data exchange between the first terminal 4A and the second terminal 5 is an example of data communication between the proxy user terminal and the load terminal.

In step SD20, the control unit of the first terminal 4A provides the first identifier I10 and the contact information to the second terminal 5. The control unit 51 of the second terminal 5 acquires the first identifier I10 and the contact information from the proxy user. Thus, the first terminal 4A causes the second terminal 5 to notify the target user terminal 6A about a proxy linking approval request including an inquiry about the first unique information C1 (user unique information) of the target user and transmit a linkage setting request including the acquired first unique information C1 and the acquired first identifier I10 to the management server 1. The method for acquiring these pieces of information by the second terminal 5 is not limited to such an example. In another example, at least one of the first identifier I10 and the contact information may be input to the second terminal 5 by the proxy user operating the second terminal 5.

In step SD30, the control unit 51 of the second terminal 5 operates as the data exchange unit 511 to notify the target user terminal 6A about the proxy linking approval request including the inquiry about the first unique information C1. In step SA10A, the control unit of the target user terminal 6A receives an operation from the target user to determine whether to approve the proxy linking. When the target user performs an operation for approval, the control unit of the target user terminal 6A operates as a data exchange unit to provide a proxy linking approval result and the first unique information C1 (user unique information) of the target user to the second terminal 5. Thus, the target user terminal 6A causes the second terminal 5 to cooperate with the first terminal 4A and transmit a linkage setting request to the management server 1. When the target user does not approve, the processing procedure of the linkage setting by proxy authentication may end as appropriate.

The data exchange in steps SD30 and SA10A may basically be performed by direct or indirect wireless or wired data communication. In step SA10A, the control unit of the target user terminal 6A may acquire the first unique information C1 from the target user as appropriate and transmit the acquired first unique information C1 directly or indirectly to the second terminal 5. The method for exchanging data between the second terminal 5 and the target user terminal 6A is not limited to such an example, and may be, in some cases, a method other than the data communication, such as reading a two-dimensional code.

In step SB10, the control unit of the first terminal 4A acquires the second identifier I20 and the second unique information C2 from the use item as appropriate similarly to the first terminal 4. In one example, the second terminal 5 may provide the second identifier I20 and the second unique information C2 to the first terminal 4A. Thus, the second terminal 5 may cause the first terminal 4A to transmit a linkage setting request including the second identifier I20 and the second unique information C2 to the management server 1.

In step SB20, the control unit of the first terminal 4A operates as a setting request unit to transmit the linkage setting request including the second identifier I20 and the second unique information C2 to the management server 1. In step SA20, the control unit 51 of the second terminal 5 operates as the setting request unit 512 to transmit a linkage setting request including the first identifier I10 and the first unique information C1 to the management server 1. The management server 1 receives the first identifier I10, the first unique information C1, the second identifier I20, and the second unique information C2. Then, the management server 1, the first server 2, and the second server 3 may execute the processes of steps SA30, SB30, and subsequent steps as in the above embodiment. As a result of the execution, a correspondence between the target user and the use item is set when the target user and the use item are successfully authenticated. When the correspondence is set, the processing procedure of the linkage setting by proxy authentication ends. While the correspondence is set, the proxy user can exercise the authority of the target user (proxy requester) via the use item.

In proxy pattern 1-1, the notification routes of the first identifier I10 and the first unique information C1 are not limited to those in the above example. The target user terminal 6A may directly or indirectly notify the second terminal 5 about the first identifier I10 at any timing such as the timing of step SA10A without intermediation of the first terminal 4A. In this case, the first identifier I10 may be omitted from the notification about the proxy authority investment. The first unique information C1 may be provided to the first terminal 4A at any timing such as the timing of step SD10. Thus, the first unique information C1 may be provided from the first terminal 4A to the second terminal 5. In this case, the first unique information C1 may be omitted from the data provided to the second terminal 5 in step SA10A. In order not to provide the first unique information C1 to the proxy user, however, it is preferable to adopt the route of FIGS. 9 and 10 on which the first unique information C1 does not pass through the first terminal 4A. The proxy linking approval process may be omitted. When the proxy linking approval process is omitted and the first unique information C1 is provided from the first terminal 4A to the second terminal 5, the processes of steps SD30 and SA10A may be omitted. In this case, the contact information of the target user may be omitted from the notification about the proxy authority investment and the data provided to the second terminal 5 in step SD20.

In proxy pattern 1-1, the transmission pattern of data to be used for authentication is not limited to pattern 1 of split transmission, and may be selected as appropriate depending on embodiments. In another example, the transmission pattern of data to be used for authentication may be a pattern other than pattern 1 of split transmission among the above transmission patterns (pattern 2 to pattern 4 of split transmission, other split transmission, collective transmission). Accordingly, the processes of steps SD10 to SD30, SA10A, SA20, SB10, and SB20 may be changed as appropriate. When the second terminal 5 transmits at least part of the data on the target user (first identifier I10 and first unique information C1), the second terminal 5 may acquire the data on the target user via the first terminal 4A similarly to the above, or may acquire the data from the target user (target user terminal 6A) without intermediation of the first terminal 4A. When the first terminal 4A transmits at least part of the data on the target user, the first terminal 4A may acquire the data on the target user via the second terminal 5, or may acquire the data from the target user (target user terminal 6A) without intermediation of the second terminal 5. For example, the first terminal 4A may acquire the data on the target user via the second terminal 5 through the route of steps SA10A and SB10. The first terminal 4A may acquire the data on the target user from the target user (target user terminal 6A) through the route of step SD10 without intermediation of the second terminal 5. When the first terminal 4A transmits at least part of the data on the use item (second identifier I20 and second unique information C2), the first terminal 4A may acquire the data on the use item from the use item as appropriate similarly to the above. Similarly, the second terminal 5 may acquire the data on the use item as appropriate. In any case, the processes of steps SD30 and SA10A may be omitted when the proxy linking approval is omitted and the target user terminal 6A does not provide the data to the second terminal 5.

In step SD10 of proxy pattern 1-1, at least one of an effective period of proxy exercise and authority to permit proxy exercise (enabling authority) may be designated along with the designation of the proxy user. Designation information indicating at least one of the designated effective period and the designated enabling authority may be generated. The designation information on at least one of the designated effective period and the designated enabling authority may be managed as appropriate. In one example, the designation information may be transmitted from the target user terminal 6A to the first server 2 and managed by the first server 2 in association with the first target information O10 (user information O10A). The first server 2 may notify the management server 1 about the designation information as appropriate. In another example, the target user terminal 6A may notify the management server 1 about the designation information via at least one of the first terminal 4A and the second terminal 5 (i.e., along with the transmission of data to be used for authentication), and the management server 1 may manage the designation information in association with the linkage information D10. In still another example, the designation information may be transmitted directly or indirectly from the target user terminal 6A to the management server 1 and managed by the management server 1. In this case, similarly to the split transmission, the management server 1 may associate as appropriate the designation information with the data to be used for authentication and received from at least one of the first terminal 4A and the second terminal 5. The association method may be similar to the association method in the split transmission. In one example, the data received from at least one of the first terminal 4A and the second terminal 5 and the designation information may include proxy information as shared information, and this proxy information may be used to associate the data to be used for authentication with the designation information. The proxy information may be any information on the proxy user. The proxy information may include, for example, attribute information (e.g., personal information such as a name, an address, an age, a gender, and contact information) and identification information (e.g., an account name and an identifier) of the proxy user. The proxy information may include the same type of information as the unique information (C1, C2). The timing to designate the enabling authority and the effective period is not limited to the timing of step SD10. At least one of the enabling authority and the effective period may be designated at any timing before the correspondence is terminated.

In proxy pattern 1-1, the first terminal 4A may transmit the proxy information directly to the management server 1, or may transmit it indirectly via an external computer such as the second terminal 5. For example, the first terminal 4A may transmit the proxy information to the management server 1 in step SB20. The first terminal 4A may provide the proxy information to the second terminal 5 during the data exchange, and cause the second terminal 5 to transmit the proxy information to the management server 1. Thus, the management server 1 may generate the linkage information D10 including the proxy information to make distinction as to whether the set correspondence is based on proxy linking. Since the linkage information D10 includes the proxy information, it is possible to track the proxy user who has set the correspondence. Using this proxy information, the user who can act as proxy to exercise the authority of the target user may be limited to the designated proxy user (user identified based on the proxy information). The method for distinction as to whether the correspondence is based on proxy linking is not limited to such an example. In another example, the data from each terminal (4, 5) may be used to make distinction as appropriate as to whether the request is based on proxy linking. The management server 1 may generate the linkage information D10 including information indicating whether the correspondence is set by proxy linking.

In proxy pattern 1-1, the second terminal 5 may acquire the proxy information from the first terminal 4A. The second terminal 5 may notify the target user terminal 6A about the acquired proxy information when making the proxy linking approval request in step SD30. Thus, the target user can be informed about the proxy user who is executing the proxy linking. In step SD10, the target user terminal 6A may generate designated proxy information indicating a designated proxy. The proxy information provided from the second terminal 5 may correspond to this designated proxy information. The target user terminal 6A may check the designated proxy information against the proxy information provided from the second terminal 5 to determine whether the proxy user who is executing the proxy linking is the same as the designated proxy user. When determination is made that the proxy user who is executing the proxy linking is the same as the designated proxy user, the target user terminal 6A may automatically give a proxy linking approval notification including the first unique information to the second terminal 5, or permit the target user to perform an approval operation. The second terminal 5 need not acquire the proxy information from the first terminal 4A. For example, the second terminal 5 may acquire the proxy information from the proxy user without intermediation of the first terminal 4A by a method such as capturing an image of the proxy user with an image sensor. The checking on the proxy user and the approval notification including the first unique information C1 need not be executed by the target user terminal 6A. At least one of the checking on the proxy user and the approval notification may be executed by an external computer such as the first server 2.

The designated proxy information may include authentication information, and the proxy information may include proxy authentication information corresponding to the authentication information. The authentication information may be similar to the first registered unique information C10 or the second registered unique information C20. In one example, the authentication information may be temporarily generated information such as a timestamp, a random number, or a hash value. In this case, the authentication information may be generated as appropriate by the target user terminal 6A or an external computer when designating the proxy in step SD10. The target user terminal 6A may provide the authentication information to the first terminal 4A at any timing such as the timing of step SD10. The first terminal 4A may hold the authentication information as the proxy authentication information, and provide proxy information including the proxy authentication information to the second terminal 5. Then, determination may be made as to whether the proxy user who is executing the proxy linking is the same as the designated proxy user by checking the authentication information against the proxy authentication information. The method for checking the designated proxy information against the proxy information may be similar to the method for checking the unique information etc.

In proxy pattern 1-1, when there is no response from the target user terminal 6A within a predetermined period after the notification about the approval request in step SD30, the second terminal 5 may notify the target user terminal 6A about a reminder to prompt the target user terminal 6A to give a response in step SA10A. The proxy linking approval process using the designated proxy information and the proxy information may be executed by an external computer such as the first server 2 instead of by the target user terminal 6A. In this case, the designated proxy information may be provided to the external computer when designating the proxy user in step SD10. When there is no response from the target user terminal 6A, the second terminal 5 may substitute the approval process by sending an inquiry to the external computer. The first unique information C1 may also be provided to the external computer, and the second terminal 5 may acquire the first unique information C1 from the external computer in response to approval of the proxy linking.

In proxy pattern 1-1, the correspondence set in response to the proxy linking request may be terminated as appropriate. As in the above embodiment, the management server 1 may terminate the correspondence in response to reception of a termination request from at least one of the first terminal 4A and the second terminal 5 or satisfaction of a predetermined termination condition. The termination request and the predetermined termination condition according to the above embodiment may also be applied to the present modification. In the present modification, the predetermined termination condition may be set based on at least one of the effective period and the enabling authority for the proxy authority. For example, the termination condition may be defined to terminate the correspondence when the designated effective period has elapsed. The termination condition may be defined to terminate the correspondence (i.e., extinguish or disable the authority) by exercising the designated enabling authority. The termination condition may be defined to terminate the previous correspondence set by proxy linking when there are overlapping correspondence settings for the target user because the target user is attempting to set the correspondence with the use item to exercise the enabling authority by himself or herself.

The management server 1 may terminate the correspondence in response to reception of a termination request from the target user terminal 6A. The target user terminal 6A may transmit the termination request directly to the management server 1, or may transmit it indirectly via an external computer such as the first server 2. As in the above embodiment, the termination request from the target user terminal 6A may include at least one of the first identifier I10 and the second identifier I20 for which the termination is designated, or may include neither the first identifier I10 nor the second identifier I20. When determination is made as to whether the correspondence is set by proxy linking, the termination request from the target user terminal 6A may include only the first identifier I10 without including the second identifier I20, thereby designating termination of the correspondence set by proxy linking designated based on the first identifier I10.

In proxy pattern 1-1, after the correspondence setting process by proxy linking is completed, the control unit 11 of the management server 1 may operate as the notification unit 114 to transmit a notification indicating the result of execution of the setting process by proxy linking directly or indirectly to at least one of the first terminal 4A, the second terminal 5, and the target user terminal 6A. In the case of direct notification to the target user terminal 6A, the management server 1 may acquire the contact information of the target user terminal 6A at any timing. In one example, when the first terminal 4A and the second terminal 5 exchange data on the contact information of the target user terminal 6A, the contact information of the target user terminal 6A may be transmitted to the management server 1 at the time of making the linking request from at least one of the first terminal 4A and the second terminal 5. When the target user terminal 6A performs data communication with the management server 1, the management server 1 may acquire the contact information of the target user terminal 6A during this data communication.

The processing procedure of FIG. 10 is merely an example, and each step may be changed to the extent possible. Regarding the above processing procedure, any step can be omitted, replaced, or added as appropriate depending on embodiments. For example, the process of step SB20 may be executed at any timing after step SB10. When there is no wait until the proxy approval is completed, the processes of steps SB10 and SB20 may be executed at any timing after the second unique information C2 has become acquirable from the use item, and may be executed before step SD20. The process of step SB10 may be executed before step SD20, and the process of step SB20 may be executed after step SD20. For example, the process of step SA20 may be executed at any timing after step SA10A. The process of step SA20 may be executed before step SB10. When the first identifier I10 and the first unique information C1 are provided from the first terminal 4A, the process of step SA20 may be executed at any timing after the first identifier I10 and the first unique information C1 have been acquired.

Modification

In proxy pattern 1-1, at least one of the first terminal 4A and the second terminal 5 acquires the first unique information C1 (user unique information) of the target user, and transmits the acquired first unique information C1 to the management server 1. The transmission route of the first unique information C1 is not limited to such an example. As a modification, the authentication process may proceed without the first unique information C1, and the first server 2 may send an inquiry to the target user terminal 6A.

FIG. 11 schematically shows a modification of the course of the linkage setting in proxy pattern 1-1 according to the present embodiment. In the example of FIG. 11, the first target information O10 (user information O10A) includes the contact information of the target user (first target) as attribute information. In FIG. 11, it is assumed that the configuration of the present modification is applied to the example of FIG. 9.

In step SD10, the target user terminal 6A first receives designation of the proxy user, and gives a notification about the proxy authority investment to the first terminal 4A of the designated proxy user. The contact information of the target user may be omitted from the notification about the proxy authority investment. In step SD20B, the second terminal 5 acquires the first identifier I10. In step SB10, the first terminal 4A acquires the second identifier I20 and the second unique information C2. The authentication process for the use item in step SB20 and subsequent steps may be executed as in the above embodiment. As a result of the execution, the management server 1 receives the authentication result for the use item from the second server 3.

In step SA20B, the second terminal 5 transmits, to the management server 1, a linkage setting request that does not include the first unique information C1 but includes the first identifier I10. The management server 1 receives the first identifier I10. In step SA30B, the control unit 11 of the management server 1 operates as the authentication unit 111 to transmit, to the first server 2, an authentication request for the first target including the received first identifier I10. The first server 2 receives the first identifier I10 from the management server 1.

In step SA310B, the control unit 21 of the first server 2 operates as the authentication unit 211 to extract the first registered unique information C10 and the contact information of the target user by searching the first target information O10 (user information O10A) using the received first identifier I10 as a query. The control unit 21 uses the extracted contact information to transmit, to the target user terminal 6A, a proxy linking approval request including an inquiry about the first unique information C1. The control unit of the target user terminal 6A receives an operation from the target user to determine whether to approve the proxy linking. In step SA311B, when the target user performs an operation for approval, the control unit of the target user terminal 6A transmits a proxy linking approval result and the first unique information C1 (user unique information) of the target user to the first server 2. The control unit 21 of the first server 2 receives the first unique information C1. When the target user does not approve, the processing procedure of the linkage setting by proxy authentication in the present modification may end as appropriate. The control unit of the target user terminal 6A may acquire the first unique information C1 from the target user as appropriate.

The control unit 21 of the first server 2 operates as the authentication unit 211 to check the extracted first registered unique information C10 against the received first unique information C1. Based on a checking result, the control unit 21 determines whether the target user is successfully authenticated. In step SA40, the control unit 21 operates as the notification unit 212 to transmit an authentication result for the target user to the management server 1. The management server 1 receives the authentication result for the target user. Then, the management server 1 may execute the processes of step SC10 and subsequent steps as in the above embodiment. As a result of the execution, a correspondence between the target user and the use item is set when the target user and the use item are successfully authenticated. When the correspondence is set, the processing procedure of the linkage setting by proxy authentication ends.

In the present modification, the configuration other than the above may be similar to the above configuration related to the example of FIGS. 9 and 10. In the present modification, the target user terminal 6A may execute the process of step SA311B in advance by accessing the first server 2 during or after the designation of the proxy user through the process of step SD10 and before step SA310B. In this case, the process of step SA310B may be omitted. Similarly to the split transmission, the linking request from at least one of the first terminal 4A and the second terminal 5 and the pre-authentication by the execution of step SA311B may be associated as appropriate. In one example, the proxy information may be included as shared information, and the linking request from at least one of the first terminal 4A and the second terminal 5 and the pre-authentication by the execution of step SA311B may be associated by using the proxy information. When this configuration is adopted, the first server 2 may perform an association process in response to the authentication request from the management server 1 through the process of step SA30B, and return the authentication result for the target user based on the first unique information C1 acquired in advance to the management server 1 as the process of step SA40. Alternatively, the first server 2 may transmit, to the management server 1 in advance, the authentication result for the target user based on the first unique information C1 acquired in advance. In this case, the process of step SA30B may also be omitted, and the management server 1 may perform the association process and acquire the authentication result for the target user. When this configuration is adopted, at least part of the authentication process for the target user may be executed by the target user terminal 6A.

(1-2) Proxy Pattern 1-2

Figures 12, 13:
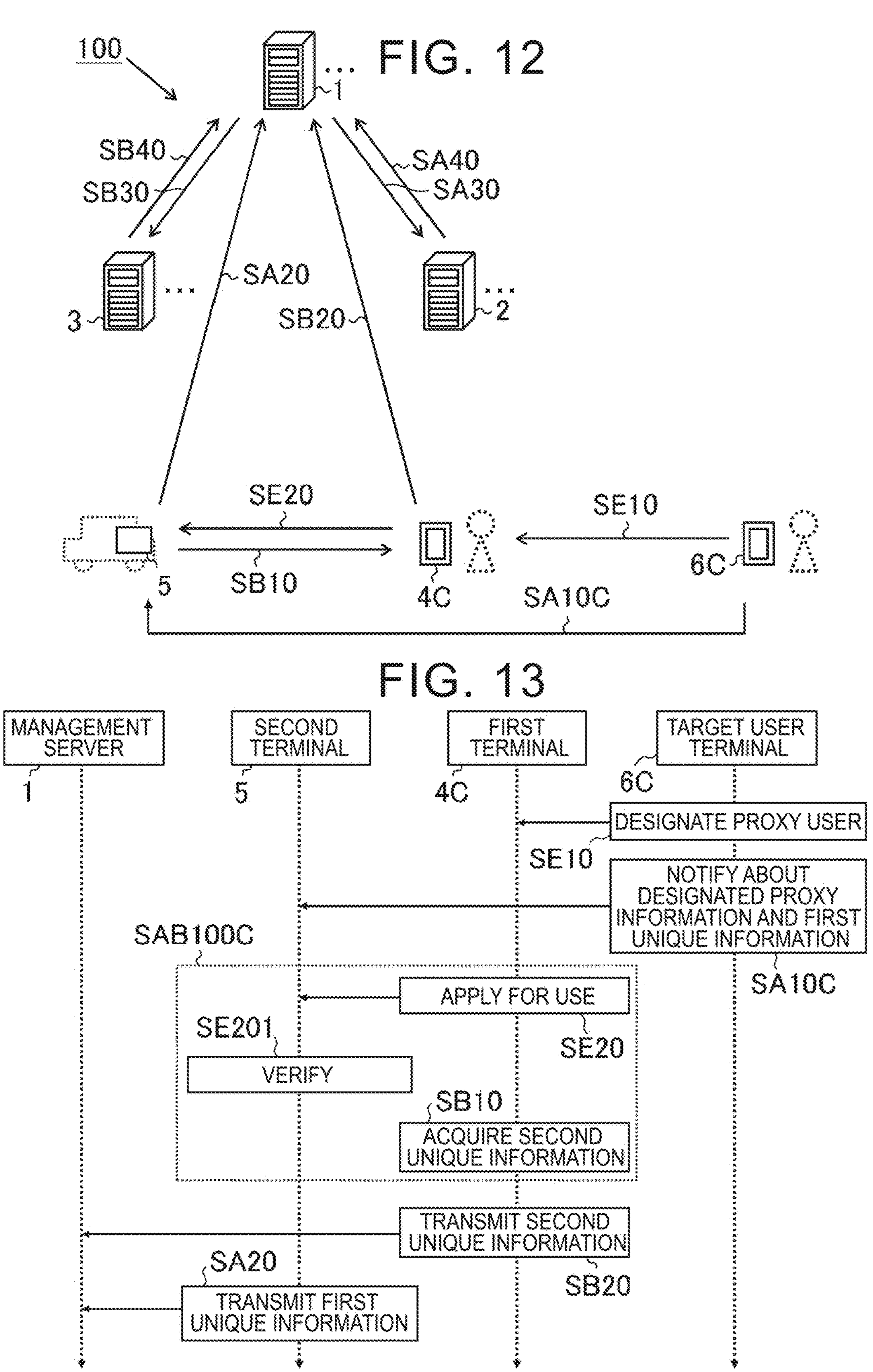
FIG. 12 schematically shows an example of the course of linkage setting in proxy pattern 1-2 according to the embodiment.
FIG. 13 shows an example of a processing procedure of the linkage setting in proxy pattern 1-2 according to the embodiment.

FIG. 12 schematically shows an example of the course of linkage setting in proxy pattern 1-2 according to the present embodiment. FIG. 13 shows an example of a processing procedure of the linkage setting in proxy pattern 1-2 according to the present embodiment. In the example of FIGS. 12 and 13, a first terminal 4C is a proxy user terminal and corresponds to the first terminal 4 in the examples of FIGS. 2 and 5 of the above embodiment and the first terminal 4A in proxy pattern 1-1. The first target is a target user (proxy requester) who requests proxy. A target user terminal 6C is a terminal possessed by the target user and corresponds to the target user terminal 6A in proxy pattern 1-1. The hardware configurations of the first terminal 4C and the target user terminal 6C may be similar to that of the first terminal 4 etc. in the above embodiment. In the example of FIGS. 12 and 13, it is assumed that pattern 1 of split transmission is adopted as the transmission pattern of data to be used for authentication and the first identifier I10 and the first unique information C1 do not pass through the first terminal 4C.

In step SE10, a control unit of the target user terminal 6C first operates as a proxy designation unit to receive designation of a proxy user for the target user. The control unit of the target user terminal 6C operates as a notification unit to exchange data with the first terminal 4C of the proxy user designated by the target user and notify it that proxy authority has been invested. A control unit of the first terminal 4C of the proxy user receives the notification about the proxy authority investment from the target user terminal 6C. In one example, this notification may include authentication information. The authentication information may be similar to that in proxy pattern 1-1. For example, the authentication information may be temporarily generated information. The first terminal 4C may hold the authentication information in the received notification as proxy authentication information. The other processes in step SE10 may be similar to those in step SD10. When data communication is adopted as the data exchange method, the notification about the proxy authority investment is an example of data communication between the target user terminal possessed by the user and the proxy user terminal. Thus, the target user terminal 6C invests the first terminal 4C with proxy authentication authority and causes the first terminal 4C to execute a process for setting a correspondence with the use item.

In step SA10C, the control unit of the target user terminal 6C receives designation of a use item for which proxy linking by the proxy user is permitted. The use item for which proxy linking is permitted may be designated as appropriate depending on embodiments. In one example, the target user terminal 6C and the second terminal 5 may directly exchange data by a method such as short-range wireless communication to designate the use item of the second terminal 5 that is the partner of data exchange as the use item for which proxy linking is permitted. In another example, the target user terminal 6C may access a list of use items via an external computer and designate the use item for which proxy linking is permitted from among the use items registered in the list. The list may include information such as identification information of each use item and contact information of the second terminal 5. The list may be stored in the target user terminal 6C. The use item may be designated manually by the target user or by any information processing such as selecting a use item that meets a condition. After the use item has been designated, the control unit of the target user terminal 6C operates as a data exchange unit to notify the second terminal 5 of the designated use item about designated proxy information including authentication information, the first identifier I10, and the first unique information C1. The designated proxy information may be acquired as appropriate in response to the designation of the proxy user. The designated proxy information may be similar to that in proxy pattern 1-1. The second terminal 5 of the designated use item receives the designated proxy information including the authentication information, the first identifier I10, and the first unique information C1. In order for the proxy user to identify the designated use item, information on the designated use item may be provided as appropriate to the first terminal 4C from the target user terminal 6C or an external computer. Through the process of step SA10C, the target user terminal 6C causes the second terminal 5 of the designated use item to execute a process of verifying the authenticity of the proxy user in response to a use application for the use item, and to cooperate with the first terminal 4C of the proxy user and transmit a linkage setting request to the management server 1.

In step SAB100C, the control unit of the first terminal 4C of the proxy user invested with the proxy authority operates as a data exchange unit to exchange data with the second terminal 5 of the designated use item. The control unit 51 of the second terminal 5 operates as the data exchange unit 511 to exchange data with the first terminal 4C. The data exchange method in step SAB100C may be similar to that in step SAB100A. When data communication is adopted as the data exchange method, the data exchange between the first terminal 4C and the second terminal 5 is an example of data communication between the proxy user terminal and the load terminal.

In step SE20, the control unit of the first terminal 4C applies for use of the use item by providing proxy information including the proxy authentication information to the second terminal 5. Thus, the first terminal 4C causes the second terminal 5 to verify the authenticity of the proxy and, in response to successful verification of the proxy, transmit a request for the linkage setting based on the held first identifier I10 and the held first unique information C1 to the management server 1.

In step SE201, the control unit 51 of the second terminal 5 verifies the authenticity of the proxy user by checking the proxy information in the use application against the designated proxy information received from the target user terminal 6C (i.e., executes the authentication process for the proxy user). The checking of the proxy information against the designated proxy information includes checking the proxy authentication information against the authentication information. Based on a checking result, the control unit 51 of the second terminal 5 determines whether the proxy user is successfully verified. When the proxy user is successfully verified, the control unit 51 of the second terminal 5 permits the proxy user to use the use item, and enables the subsequent processes related to proxy linking. When the proxy user is not successfully verified, the processing procedure of the linkage setting by proxy authentication may end as appropriate.

In step SB10, the control unit of the first terminal 4C acquires the second identifier I20 and the second unique information C2 from the use item as appropriate. In step SB20, the control unit of the first terminal 4C transmits a linkage setting request including the second identifier I20 and the second unique information C2 to the management server 1. In step SA20, the control unit 51 of the second terminal 5 transmits a linkage setting request including the first identifier I10 and the first unique information C1 to the management server 1. The processes of steps SB10, SB20, and SA20 may be similar to those in proxy pattern 1-1. The management server 1 receives the first identifier I10, the first unique information C1, the second identifier I20, and the second unique information C2. Then, the management server 1, the first server 2, and the second server 3 may execute the processes of steps SA30, SB30, and subsequent steps as in proxy pattern 1-1. As a result of the execution, a correspondence between the target user and the use item is set when the target user and the use item are successfully authenticated. When the correspondence is set, the processing procedure of the linkage setting by proxy authentication ends. While the correspondence is set, the proxy user can exercise the authority of the target user (proxy requester) via the use item.

In proxy pattern 1-2, the notification routes of the first identifier I10 and the first unique information C1 are not limited to those in the above example. At least one of the first identifier I10 and the first unique information C1 may be provided to the second terminal 5 via the first terminal 4C. In this case, at least one of the first identifier I10 and the first unique information C1 may be omitted from the data provided to the second terminal 5 in step SA10C.

In proxy pattern 1-2, the transmission pattern of data to be used for authentication is not limited to pattern 1 of split transmission, and may be selected as appropriate depending on embodiments. In another example, the transmission pattern of data to be used for authentication may be a pattern other than pattern 1 of split transmission among the above transmission patterns (pattern 2 to pattern 4 of split transmission, other split transmission, collective transmission). Accordingly, the processes of steps SE10, SE20, SA10C, SA20, SB10, and SB20 may be changed as appropriate. When the second terminal 5 transmits at least part of the data on the target user (first identifier I10 and first unique information C1), the second terminal 5 may acquire the data on the target user via the first terminal 4C similarly to the above, or may acquire the data from the target user (target user terminal 6C) without intermediation of the first terminal 4C. When the first terminal 4C transmits at least part of the data on the target user, the first terminal 4C may acquire the data on the target user via the second terminal 5, or may acquire the data from the target user (target user terminal 6C)

without intermediation of the second terminal 5. For example, the first terminal 4C may acquire the data on the target user via the second terminal 5 through the route of steps SA10C and SB10. The first terminal 4C may acquire the data on the target user from the target user (target user terminal 6C) through the route of step SE10 without intermediation of the second terminal 5. When the first terminal 4C transmits at least part of the data on the use item (second identifier I20 and second unique information C2), the first terminal 4C may acquire the data on the use item from the use item as appropriate similarly to the above. Similarly, the second terminal 5 may acquire the data on the use item as appropriate.

In proxy pattern 1-2, a specific individual may typically be designated in the designation of the use item in step SA10C. The use item designation method is not limited to such an example. In another example, the use item may be designated within any range such as a specific management organization instead of being designated as the specific individual. As an example of this case, data sent in advance such as the designated proxy information may be held in an external computer such as the first server 2. The second terminal 5 may download, from the external computer, data from the target user terminal 6C as a process before step SE20. The data to be downloaded may be selected as appropriate. For example, the target user may be designated by an operation by the proxy user or based on data from the first terminal 4C, and the second terminal 5 may download data corresponding to the designated target user. The target user may be designated as appropriate based on the first identifier I10 etc. After the data has been downloaded, the second terminal 5 may receive a use application from the proxy user and execute the processes of step SE201 and subsequent steps. Even when the use item is designated as a specific individual, the second terminal 5 may download the data from the target user terminal 6C in use by the proxy user. For example, when the period of use of the use item by the proxy user is designated in advance, the second terminal 5 may download the data from the target user terminal 6C before the period of use comes.

The processing procedure of FIG. 13 is merely an example, and each step may be changed to the extent possible. Regarding the above processing procedure, any step can be omitted, replaced, or added as appropriate depending on embodiments. For example, the notification about the proxy authority investment in step SE10 may be executed after step SA10C. The process of step SE10 may be executed at least partially in parallel with the process of step SA10C. The process of step SA10C may be executed before step SE10. The process of step SA20 may be executed at any timing after step SE201. The process of step SA20 may be executed before step SB10. The process of step SA20 may be executed at least partially in parallel with the processes of steps SB10 and SB20.

The configuration of proxy pattern 1-1 may be applied as appropriate to the configuration of proxy pattern 1-2 other than the above. For example, at least one of the effective period of proxy exercise and the authority to permit proxy exercise (enabling authority) may be designated also in proxy pattern 1-2. The management server 1 may generate the linkage information D10 including the proxy information. The management server 1 may generate the linkage information D10 including information indicating whether the correspondence is set by proxy linking. The correspondence set in response to the proxy linking request may be terminated by a method similar to that in proxy pattern 1-1. The control unit 11 of the management server 1 may transmit a notification indicating the result of execution of the setting process by proxy linking to at least one of the first terminal 4C, the second terminal 5, and the target user terminal 6C.

Modification

As in the modification of proxy pattern 1-1, the transmission route of the first unique information C1 is not limited to the example in proxy pattern 1-2. As a modification, the authentication process may proceed without the first unique information C1, and the first server 2 may send an inquiry to the target user terminal 6C.

Figures 14, 15:
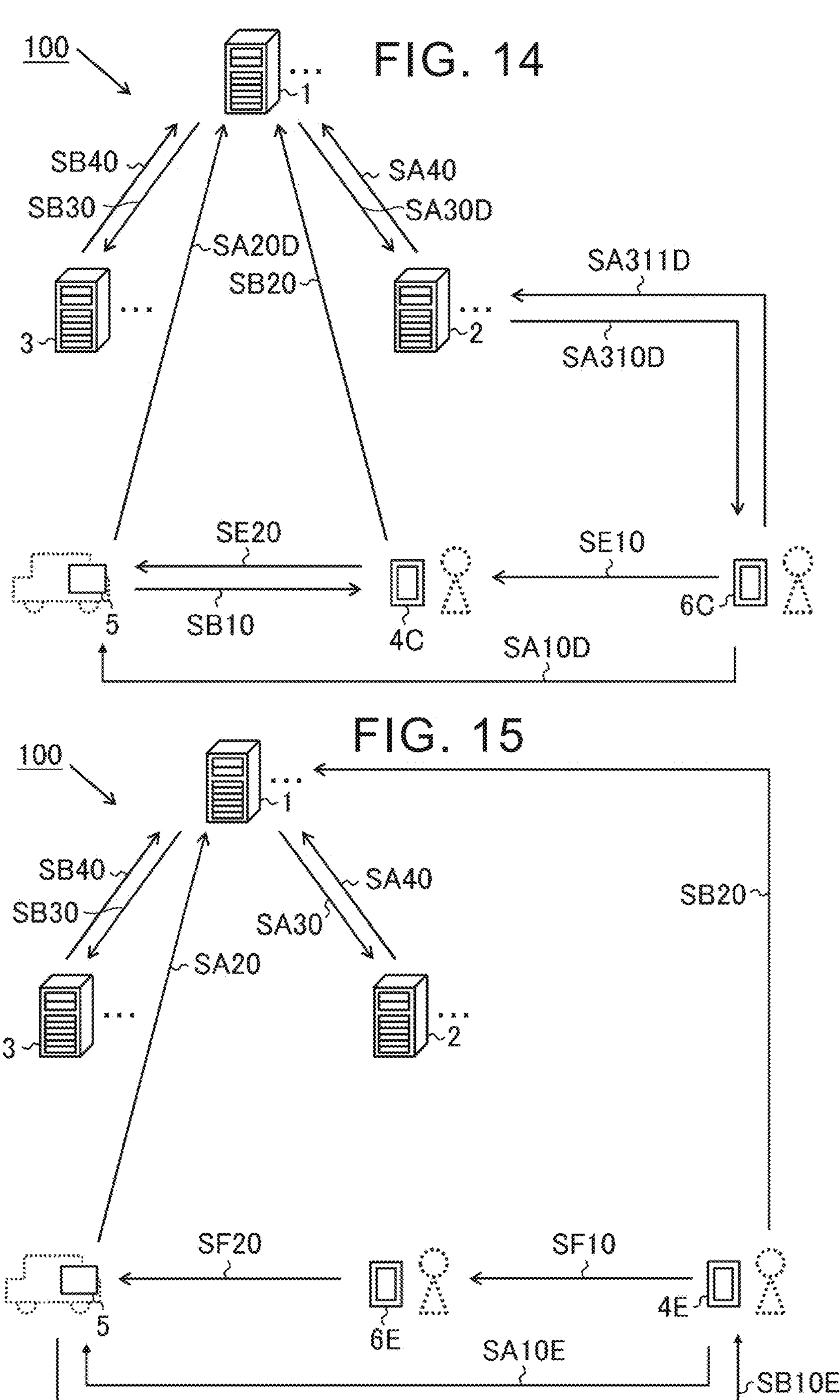
FIG. 14 schematically shows a modification of the course of the linkage setting in proxy pattern 1-2 according to the embodiment.
FIG. 15 schematically shows an example of the course of linkage setting in proxy pattern 2 according to the embodiment.

FIG. 14 schematically shows a modification of the course of the linkage setting in proxy pattern 1-2 according to the present embodiment. In the example of FIG. 14, the first target information O10 (user information O10A) includes the contact information of the target user (first target) as attribute information. In FIG. 14, it is assumed that the configuration of the present modification is applied to the example of FIG. 12.

As in the example of FIGS. 12 and 13, the target user terminal 6C first receives designation of a proxy user in step SE10. The target user terminal 6C notifies the first terminal 4C of the designated proxy user about proxy authority investment. In step SA10D, the target user terminal 6C receives designation of a use item for which proxy linking by the proxy user is permitted. The target user terminal 6C provides designated proxy information including authentication information and the first identifier I10 to the second terminal 5 of the designated use item. Step SA10D may be similar to step SA10C except that the first unique information C1 is omitted.

Steps SB10 and SE20 are similar to those in the example of FIGS. 12 and 13. In step SE20, the first terminal 4C applies for use of the designated use item to the second terminal 5. The second terminal 5 verifies the authenticity of the proxy. When the verification is successful, the second terminal 5 enables the subsequent processes related to proxy linking. In step SB10, the first terminal 4C acquires the second identifier I20 and the second unique information C2 from the use item as appropriate.

The authentication process for the use item in step SB20 and subsequent steps may be executed as in the above embodiment. As a result of the execution, the management server 1 receives the authentication result for the use item from the second server 3. The processes of steps SA20D, SA30D, SA310D, SA311D, and SA40 may be executed similarly to steps SA20B, SA30B, SA310B, SA311B, and SA40 in the modification of proxy pattern 1-1. As a result of the execution, the management server 1 receives the authentication result for the target user from the first server 2. Then, the management server 1 may execute the processes of step SC10 and subsequent steps as in the above embodiment. As a result of the execution, a correspondence between the target user and the use item is set when the target user and the use item are successfully authenticated. When the correspondence is set, the processing procedure of the linkage setting by proxy authentication ends.

In the present modification, the configuration other than the above may be similar to the above configuration related to the example of FIGS. 12 and 13. In the present modification as well, the process of step SA311D may be executed in advance as in the modification of proxy pattern 1-1. Thus, the process of step SA310D may be omitted. The process of step SA30D may also be omitted by executing the process of step SA40 in advance.

(2) Proxy Pattern 2

As proxy pattern 2, the management system 100 may be configured such that the proxy authority is invested in the proxy user but the authentication process is performed by the target user. That is, the user terminal associated with the user (in the example of FIG. 2, the first terminal 4) may be a target user terminal possessed by the target user. In one example, the use relationship between the first target and the second target may occur by data communication between the target user terminal and the load terminal with the mediation of a proxy user terminal possessed by the proxy user who acts as proxy for the target user.

Figure 16:
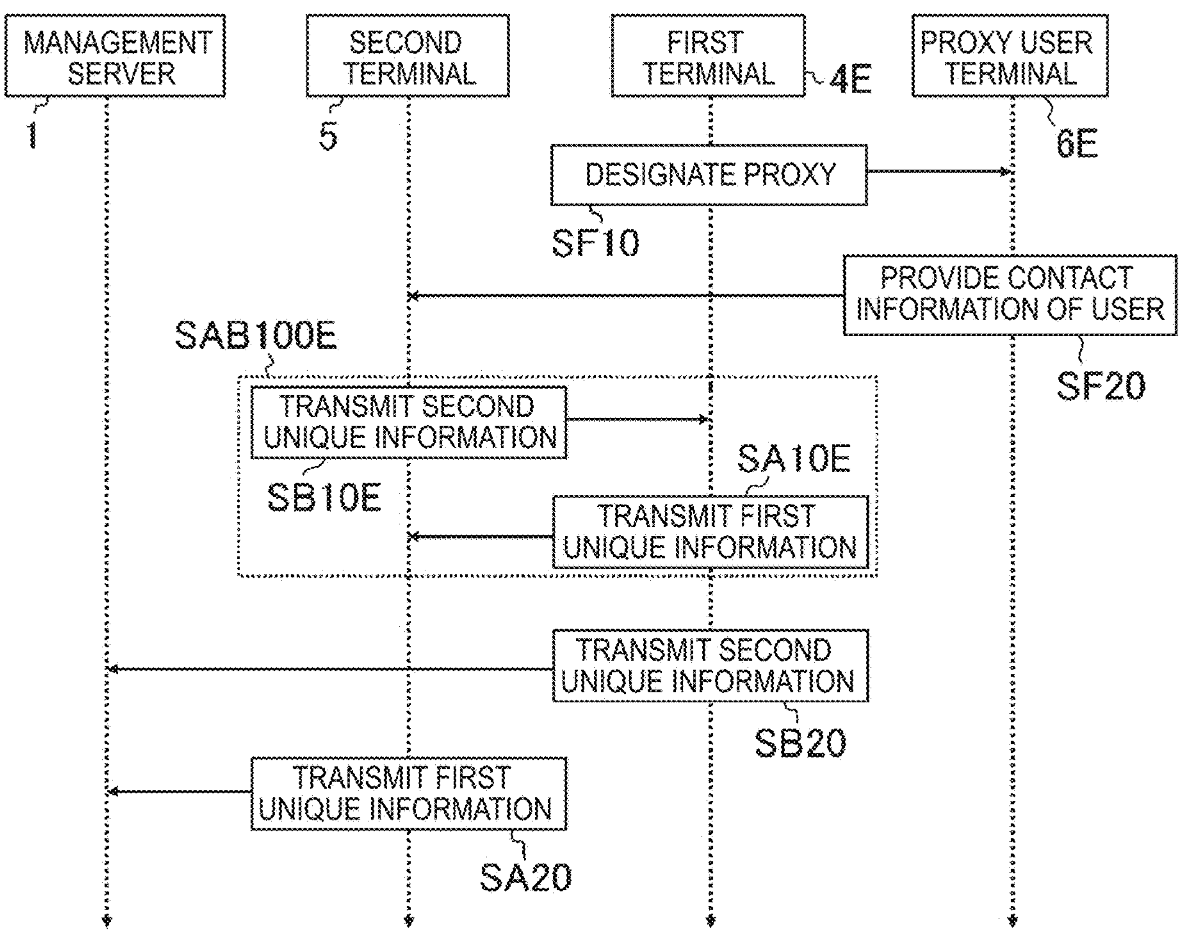
FIG. 16 shows an example of a processing procedure of the linkage setting in proxy pattern 2 according to the embodiment.

FIG. 15 schematically shows an example of the course of linkage setting in proxy pattern 2 according to the present embodiment. FIG. 16 shows an example of a processing procedure of the linkage setting in proxy pattern 2 according to the present embodiment. In FIGS. 15 and 16, the first target is a target user (proxy requester) who requests proxy. A first terminal 4E is a target user terminal and corresponds to the first terminal 4 in the examples of FIGS. 2 and 5 of the above embodiment. A proxy user terminal 6E is a terminal possessed by a proxy user. The proxy user is an example of the proxy individual, and the target user (proxy requester) is an example of the proxy requesting individual (target individual). The hardware configurations of the first terminal 4E and the proxy user terminal 6E may be similar to that of the first terminal 4 etc. in the above embodiment. In the example of FIGS. 15 and 16, it is assumed that pattern 1 of split transmission is adopted as the transmission pattern of data to be used for authentication.

In step SF10, a control unit of the first terminal 4E first operates as a proxy designation unit to receive designation of a proxy user for the target user. The proxy user may be designated as in step SD10 etc. When the proxy user is designated, the control unit of the first terminal 4E operates as a notification unit to exchange data with the proxy user terminal 6E of the designated proxy user and give a notification about proxy authority investment. The proxy user terminal 6E receives the notification about the proxy authority investment from the first terminal 4E. In one example, this notification may include contact information of the target user. Similarly to the data exchange between the first terminal 4 and the second terminal 5, the data exchange between the proxy user terminal 6E and the first terminal 4E may be performed by wireless or wired data communication or by a method other than the data communication, such as reading a two-dimensional code. The first terminal 4E may give the notification about the proxy authority investment directly to the proxy user terminal 6E, or may transmit it indirectly via an external computer such as the first server 2. Thus, the first terminal 4E may cause the proxy user terminal 6E to execute a mediation process for data exchange with the second terminal 5.

In step SF20, a control unit of the proxy user terminal 6E operates as a data exchange unit to exchange data with the second terminal 5. The control unit 51 of the second terminal 5 operates as the data exchange unit 511 to exchange data with the proxy user terminal 6E. Similarly to the data exchange between the first terminal 4 and the second terminal 5, the data exchange between the proxy user terminal 6E and the second terminal 5 may be performed by wireless or wired data communication or by a method other than the data communication, such as reading a two-dimensional code. The control unit of the proxy user terminal 6E provides the contact information of the target user to the second terminal 5. Thus, the proxy user terminal 6E causes the second terminal 5 to start data exchange with the first terminal 4E, and to cooperate with the first terminal 4E and transmit a linkage setting request to the management server 1. The processes of steps SF10 and SF20 are examples of the mediation by the proxy user terminal possessed by the proxy user.

In step SAB100E, the control unit 51 of the second terminal 5 operates as the data exchange unit 511 to exchange data with the first terminal 4E by accessing the contact information received from the proxy user terminal 6E. The control unit of the first terminal 4E operates as a data exchange unit to exchange data with the second terminal 5 in response to the access from the second terminal 5. The data exchange between the first terminal 4E and the second terminal 5 may basically be performed by wireless or wired data communication. The data exchange in step SAB100E need not be performed by data communication. In another example, the data exchange between the first terminal 4E and the second terminal 5 may be performed by a method other than the data communication, such as reading a two-dimensional code. In this case, the contact information of the target user may be omitted from the data in steps SF10 and SF20. The process of step SF20 may be a mere trigger for the data exchange in step SAB100E.

Processes of steps SA10E and SB10E may be similar to steps SA10 and SB10 of the above embodiment. The authentication process for the user in step SA20 and subsequent steps and the authentication process for the use item in step SB20 and subsequent steps may be executed as in the above embodiment. As a result of the execution of the authentication processes, the management server 1 receives the authentication results for the user and the use item. Then, the management server 1 may execute the processes of step SC10 and subsequent steps as in the above embodiment. As a result of the execution, a correspondence between the target user and the use item is set when the target user and the use item are successfully authenticated. When the correspondence is set, the processing procedure of the linkage setting in proxy pattern 2 ends. While the correspondence is set, the proxy user can exercise the authority of the target user (proxy requester) via the use item.

The processing procedure of FIG. 16 is merely an example, and each step may be changed to the extent possible. Regarding the above processing procedure, any step can be omitted, replaced, or added as appropriate depending on embodiments. For example, when the data exchange between the first terminal 4E and the second terminal 5 is performed by data communication, the processes of steps SA10E and SA20 may be executed at any timing after the access from the second terminal 5. The processes of steps SA10E and SA20 may be executed at least partially in parallel with the processes of steps SB10E and SB20. The process of step SA20 may be executed before step SB20. When the first terminal 4E and the second terminal 5 are connected before the process of step SB10E, the processes of steps SA10E and SA20 may be executed before step SB10E.

The configuration of the above embodiment may be applied as appropriate to the configuration of proxy pattern 2 other than the above. For example, the transmission pattern of data to be used for authentication may be a pattern other than pattern 1 of split transmission among the above transmission patterns (pattern 2 to pattern 4 of split transmission, other split transmission, collective transmission). Accordingly, the processes of steps SA10E, SA20, SB10E, and SB20 may be changed as appropriate.

The configurations of proxy pattern 1-1 and proxy pattern 1-2 may be applied as appropriate to the configuration of proxy pattern 2 other than the above. For example, at least one of the effective period of proxy exercise and the authority to permit proxy exercise (enabling authority) may be designated also in proxy pattern 2. The management server 1 may generate the linkage information D10 including the proxy information. The management server 1 may generate the linkage information D10 including information indicating whether the correspondence is set by proxy linking. The proxy information may be provided from the proxy user terminal 6E to the first terminal 4E via the second terminal 5 in step SB10E. Thus, the first terminal 4E may check whether the access from the second terminal 5 is made through the mediation of the designated proxy user. The management server 1 may transmit a notification indicating the result of execution of the linkage setting to at least one of the first terminal 4E, the second terminal 5, and the proxy user terminal 6E. The set correspondence may be terminated by a method similar to that in proxy pattern 1-1. In another example, the management server 1 may be configured not to receive the termination request from the proxy user terminal 6E. In still another example, the management server 1 may be configured to receive the termination request from the proxy user terminal 6E via the first terminal 4E or the second terminal 5.

(3) Proxy Pattern 3

In proxy pattern 1 and proxy pattern 2, the proxy user can exercise the authority of the target user requesting proxy while the correspondence between the target user and the use item is set. As proxy pattern 3, the management system 100 may be configured such that the target user can exercise proxy authority invested by another user while the correspondence between the target user and the use item is set. That is, the management system 100 may be configured to link the proxy user and the use item instead of linking the proxy requester and the use item. In proxy pattern 3, the user terminal associated with the user (in the example of FIG. 2, the first terminal 4) may be a target user terminal possessed by the user. One of the first identifier I10 and the second identifier I20 that corresponds to the user (in the example of FIG. 2, the first identifier I10) may be associated with proxy authority of another user than the user.

Figure 17:
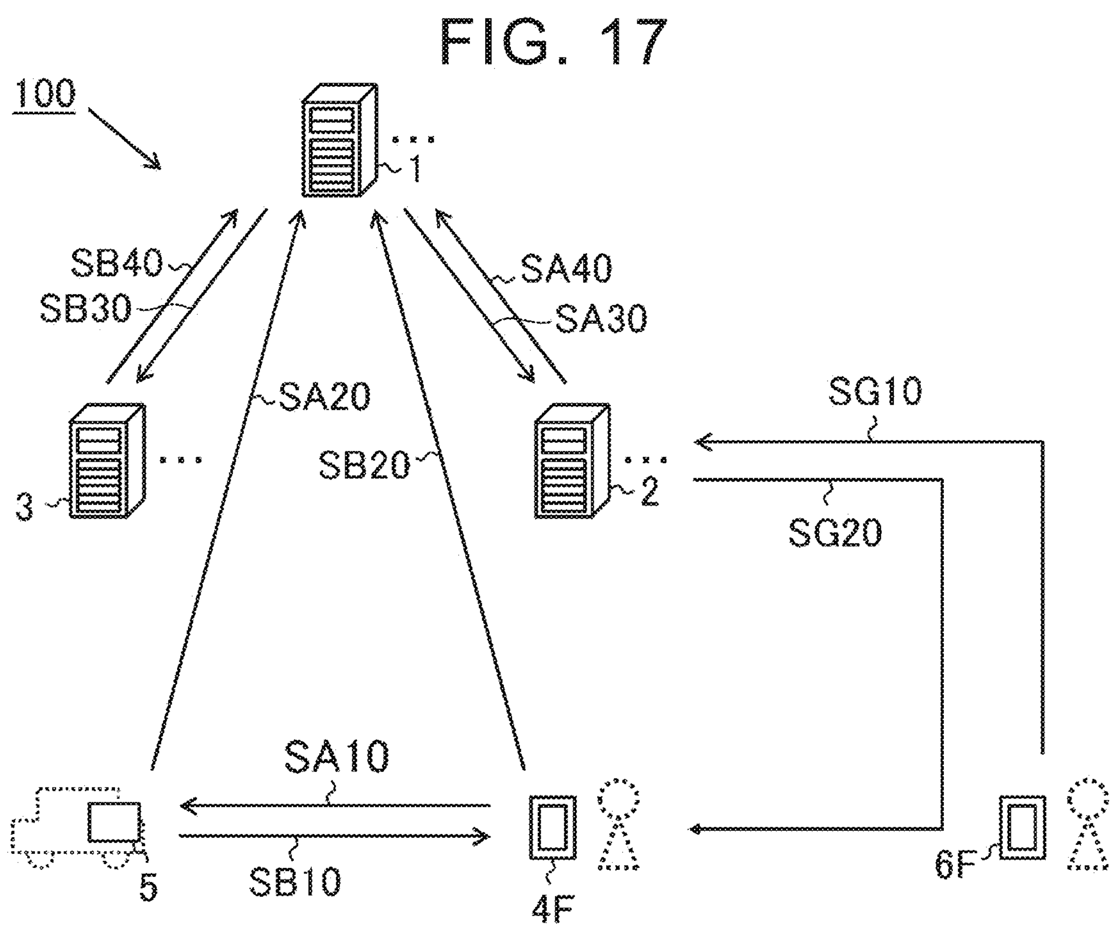
FIG. 17 schematically shows an example of the course of linkage setting in proxy pattern 3 according to the embodiment.
Figure 18:
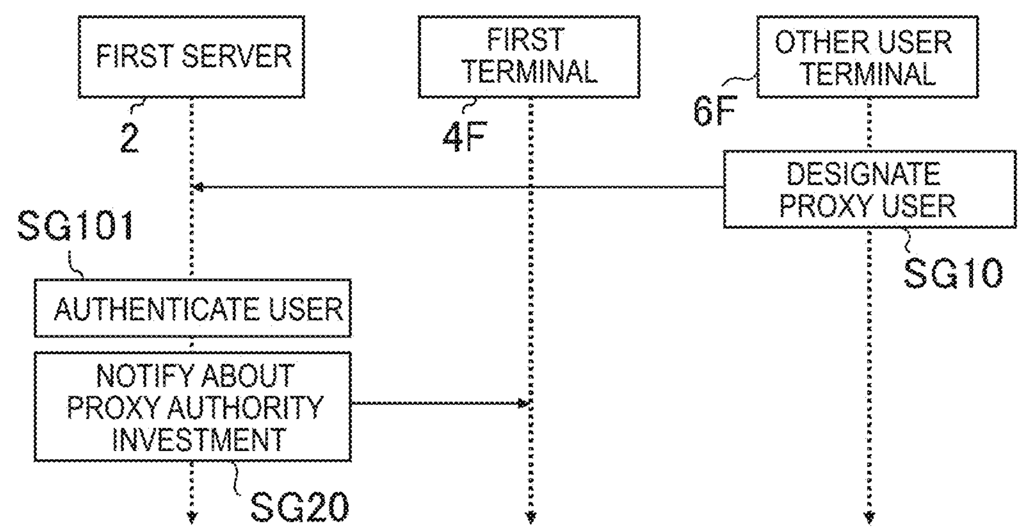
FIG. 18 shows an example of a processing procedure of proxy authority investment in proxy pattern 3 according to the embodiment.

FIG. 17 schematically shows an example of the course of linkage setting in proxy pattern 3 according to the present embodiment. FIG. 18 shows an example of a processing procedure of proxy authority investment in proxy pattern 3 according to the present embodiment. In FIGS. 17 and 18, the first target is a target user invested with proxy authority. A first terminal 4F is a target user terminal and corresponds to the first terminal 4 in the examples of FIGS. 2 and 5 of the above embodiment. Another user terminal 6F is a terminal possessed by another user (proxy requester) who requests the target user to act as proxy. The other user is typically a user who is different from the target user and has an account in the same service (first server 2) as that of the target user. The target user invested with the proxy authority is an example of the proxy individual, and the other user (proxy requester) is an example of the proxy requesting individual (other individual). The hardware configurations of the first terminal 4F and the other user terminal 6F may be similar to that of the first terminal 4 etc. in the above embodiment.

In step SG10, a control unit of the other user terminal 6F first operates as a proxy designation unit to receive designation of a proxy user for the proxy requester (other user). The proxy user may be designated as in step SD10 etc.

In step SG101, the control unit of the other user terminal 6F accesses the first server 2. The control unit 21 of the first server 2 operates as the authentication unit 211 to execute user authentication for the other user terminal 6F that has made access. The authentication in step SG101 may be similar to the authentication using the identifier and the unique information in steps SA301 and SB301. The authentication process in step SG101 is typically a login process. When the authentication is successful, the control unit 21 of the first server 2 invests proxy authority in the target user designated as the proxy user in response to a request from the other user terminal 6F. The proxy authority investment may be expressed in any data format. In one example, the control unit 21 may associate information on the proxy requester (e.g., an identifier of the proxy requester) with the user information O10A of the target user designated as the proxy user as the proxy authority investment process. The association of the information on the proxy requester with the user information O10A of the target user is an example of association of the proxy authority of the other user than the target user with the first identifier I10 of the target user. The management system 100 may be configured as appropriate such that the information on the proxy requester is associated and therefore the authority can be exercised in a proxy mode.

In step SG20, the control unit 21 of the first server 2 transmits a notification about the investment of the proxy authority of the other user to the first terminal 4F of the target user designated as the proxy user. The control unit 21 may transmit the notification about the proxy authority investment directly to the first terminal 4F or indirectly via an external computer such as the other user terminal 6F. When the notification about the proxy authority investment is completed, the processing procedure of the proxy authority investment in proxy pattern 3 ends. In one example, the first terminal 4F may execute, by the target user, the linking process for setting a correspondence with the use item regardless of the proxy authority investment process of FIG. 18. In another example, the notification about the proxy authority investment may trigger the linking process. The series of processes for setting the correspondence between the target user (first terminal 4F) and the use item (second terminal 5) may be similar to that in the above embodiment. As a result of the execution of the linking process, the correspondence between the target user and the use item is set when the target user and the use item are successfully authenticated. When the correspondence is set, the processing procedure of the linkage setting in proxy pattern 3 ends. While the correspondence is set, the target user (proxy user) can exercise the authority of the other user (proxy requester) via the use item.

The processing procedure of FIG. 18 is merely an example, and each step may be changed to the extent possible. Regarding the above processing procedure, any step can be omitted, replaced, or added as appropriate depending on embodiments. For example, when a list of users is held accessible to the first server 2 and a proxy user is designated on the first server 2, the process of step SG10 may be executed on the first server 2 via the other user terminal 6F after the other user terminal 6F has accessed the first server 2. In this case, the process of step SG101 may be executed before step SG10.

The configuration of proxy pattern 1-1 etc. may be applied as appropriate to the configuration of proxy pattern 3 other than the above. For example, the management server 1 may generate the linkage information D10 including the proxy information also in proxy pattern 3. At least one of the effective period of proxy exercise and the authority to permit proxy exercise (enabling authority) may be designated. In this case, the proxy authority invested by the other user may be extinguished when the designated effective period has come. The invested proxy authority may be extinguished by exercising the designated enabling authority. The first server 2 may delete the proxy authority invested by the other user (proxy requester) in response to a request from the other user.

Features

According to the present modification, each user can act as proxy to exercise the authority of the proxy requester via the use item. Thus, the extensibility of the exercise of the authority can be increased. For example, it is assumed that the authority information includes information on electronic prescription and the target authority is reception of medicines dispensed on the electronic prescription. In this case, the user need not go to receive the prescribed medicines, and can request another user such as a taxi driver to receive the prescribed medicines via the mobile body by investing the proxy authority in the other user.

5. Supplementary Description

The processes and means described in the present disclosure may be combined as desired as long as no technical contradiction occurs.

The process described as being executed by a single device may be executed by a plurality of devices in cooperation. Alternatively, the process described as being executed by different devices may be executed by a single device. In a computer system, the hardware configuration that implements functions can be changed flexibly.

The present disclosure can also be implemented by supplying computer programs implementing the functions described in the above embodiment to a computer and causing one or more processors of the computer to read and execute the computer programs. Such computer programs may be provided to the computer by a non-transitory computer-readable storage medium that can be connected to a system bus of the computer, or may be provided to the computer via a network. Examples of the non-transitory computer-readable storage medium include any types of disk or disc such as magnetic disks (e.g., a floppy (registered trademark) disk and a hard disk drive (HDD)) and optical discs (e.g., a CD-ROM, a DVD, and a Blu-ray disc), a read only memory (ROM), a random access memory (RAM), an erasable programmable ROM (EPROM), an electrically erasable programmable ROM (EEPROM), a magnetic card, a flash memory, an optical card, a semiconductor drive (e.g., a solid state drive), and any types of medium suitable to store electronic instructions.

What is claimed is:

1. A management server comprising a memory and at least one processor, wherein the processor is configured to perform operations of:

receiving, in response to occurrence of a physical use relationship between a first target and a second target for using the second target by the first target, a first identifier of the first target, first unique information of the first target, a second identifier of the second target, and second unique information of the second target from at least one of a first terminal of the first target and a second terminal of the second target;

requesting a first server to authenticate the first target by transmitting the received first identifier and the received first unique information to the first server;

receiving a result of authentication of the first target from the first server;

requesting a second server to authenticate the second target by transmitting the received second identifier and the received second unique information to the second server;

receiving a result of authentication of the second target from the second server;

setting a correspondence between the first identifier and the second identifier when the received results of the authentication show that both the first target and the second target have successfully been authenticated; and recording a time at which the correspondence is set as a starting time of the first target being linked with the second target, wherein the management server, the first terminal, the second terminal the first server, and the second server are separate and distinct from each other.

2. The management server according to claim 1, wherein the processor is further configured to terminate the correspondence in response to reception of a termination request from at least one of the first terminal and the second terminal or satisfaction of a predetermined termination condition.

3. The management server according to claim 1, wherein the receiving the first identifier, the first unique information, the second identifier, and the second unique information from at least one of the first terminal and the second terminal includes:

receiving the second identifier and the second unique information from the first terminal; and receiving the first identifier and the first unique information from the second terminal.

4. The management server according to claim 1, wherein the receiving the first identifier, the first unique information, the second identifier, and the second unique information from at least one of the first terminal and the second terminal includes:

receiving the first identifier and the second unique information from the first terminal; and receiving the second identifier and the first unique information from the second terminal.

5. The management server according to claim 1, wherein the receiving the first identifier, the first unique information, the second identifier, and the second unique information from at least one of the first terminal and the second terminal includes:

receiving the second identifier and the first unique information from the first terminal; and receiving the first identifier and the second unique information from the second terminal.

6. The management server according to claim 1, wherein the receiving the first identifier, the first unique information, the second identifier, and the second unique information from at least one of the first terminal and the second terminal includes receiving the first identifier, the first unique information, the second identifier, and the second unique information from one of the first terminal and the second terminal.

7. The management server according to claim 1, wherein:

the first target is a user;

the first terminal is a user terminal associated with the user;

the second target is a use item to be used by the user; and the second terminal is a load terminal to be loaded on the use item.

8. The management server according to claim 7, wherein the use item is a mobile body.

9. The management server according to claim 7, wherein the user terminal associated with the user is a proxy user terminal possessed by a proxy user who acts as proxy for the user.

10. The management server according to claim 9, wherein the physical use relationship between the first target and the second target occurs through data communication between a target user terminal possessed by the user and the proxy user terminal and data communication between the proxy user terminal and the load terminal.

11. The management server according to claim 7, wherein:

the user terminal associated with the user is a target user terminal possessed by the user; and the physical use relationship between the first target and the second target occurs by data communication between the target user terminal and the load terminal with mediation of a proxy user terminal possessed by a proxy user who acts as proxy for the user.

12. The management server according to claim 7, wherein:

the user terminal associated with the user is a target user terminal possessed by the user; and one identifier corresponding to the user out of the first identifier and the second identifier is associated with proxy authority of another user than the user.

13. A management method comprising executing, by a management server:

receiving, in response to occurrence of a physical use relationship between a first target and a second target for using the second target by the first target, a first identifier of the first target, first unique information of the first target, a second identifier of the second target, and second unique information of the second target from at least one of a first terminal of the first target and a second terminal of the second target;

requesting a first server to authenticate the first target by transmitting the received first identifier and the received first unique information to the first server;

receiving a result of authentication of the first target from the first server;

requesting a second server to authenticate the second target by transmitting the received second identifier and the received second unique information to the second server;

receiving a result of authentication of the second target from the second server; and setting a correspondence between the first identifier and the second identifier when the received results of the authentication show that both the first target and the second target have successfully been authenticated; and recording a time at which the correspondence is set as a starting time of the first target being linked with the second target, wherein the management server, the first terminal, the second terminal, the first server, and the second server are separate and distinct from each other.

14. The management method according to claim 13, wherein the management server is configured to further execute terminating the correspondence in response to reception of a termination request from at least the first terminal and the second terminal or satisfaction of a predetermined termination condition.

15. The management method according to claim 13, wherein the receiving the first identifier, the first unique information, the second identifier, and the second unique information from at least the first terminal and the second terminal includes:

receiving the second identifier and the second unique information from the first terminal; and receiving the first identifier and the first unique information from the second terminal.

16. The management method according to claim 13, wherein the receiving the first identifier, the first unique information, the second identifier, and the second unique information from at least the first terminal and the second terminal includes:

receiving the first identifier and the second unique information from the first terminal; and receiving the second identifier and the first unique information from the second terminal.

17. The management method according to claim 13, wherein the receiving the first identifier, the first unique information, the second identifier, and the second unique information from at least the first terminal and the second terminal includes:

receiving the second identifier and the first unique information from the first terminal; and receiving the first identifier and the second unique information from the second terminal.

18. The management method according to claim 13, wherein:

the first target is a user;

the first terminal is a user terminal associated with the user;

the second target is a use item to be used by the user; and the second terminal is a load terminal to be loaded on the use item.

19. The management method according to claim 18, wherein the use item is a mobile body.

20. A non-transitory computer-readable storage medium storing instructions that are executable by one or more processors and that cause the one or more processors to perform functions comprising:

receiving, in response to occurrence of a physical use relationship between a first target and a second target for using the second target by the first target, a first identifier of the first target, first unique information of the first target, a second identifier of the second target, and second unique information of the second target from at least one of a first terminal of the first target and a second terminal of the second target;

requesting a first server to authenticate the first target by transmitting the received first identifier and the received first unique information to the first server;

receiving a result of authentication of the first target from the first server;

requesting a second server to authenticate the second target by transmitting the received second identifier and the received second unique information to the second server;

receiving a result of authentication of the second target from the second server;

setting a correspondence between the first identifier and the second identifier when the received results of the authentication show that both the first target and the second target have successfully been authenticated; and recording a time at which the correspondence is set as a starting time of the first target being linked with the second target, wherein the management server, the first terminal, the second terminal, the first server, and the second server are separate and distinct from each other.

* * * * *